United States Patent
Huang et al.

(10) Patent No.: US 12,494,843 B2
(45) Date of Patent: Dec. 9, 2025

(54) CONNECTION SETUP IN OAM-BASED COMMUNICATION SYSTEM

(71) Applicant: QUALCOMM INCORPORATED, San Diego, CA (US)

(72) Inventors: Min Huang, Beijing (CN); Yu Zhang, San Diego, CA (US); Hao Xu, Beijing (CN); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 283 days.

(21) Appl. No.: 18/257,564

(22) PCT Filed: Mar. 4, 2022

(86) PCT No.: PCT/CN2022/079195
§ 371 (c)(1),
(2) Date: Jun. 14, 2023

(87) PCT Pub. No.: WO2022/184158
PCT Pub. Date: Sep. 9, 2022

(65) Prior Publication Data
US 2024/0113778 A1    Apr. 4, 2024

(30) Foreign Application Priority Data

Mar. 5, 2021 (WO) ................ PCT/CN2021/079274

(51) Int. Cl.
*H04B 10/11* (2013.01)
*H04B 7/08* (2006.01)
(Continued)

(52) U.S. Cl.
CPC ......... *H04B 10/1123* (2013.01); *H04B 7/086* (2013.01); *H04J 14/04* (2013.01);
(Continued)

(58) Field of Classification Search
CPC .... H04B 10/1123; H04B 7/086; H04B 10/11; H04B 10/112; H04B 10/1143;
(Continued)

(56) References Cited

U.S. PATENT DOCUMENTS 11,177,990 B1* 11/2021 Gil .................. H01Q 21/20
2013/0235744 A1* 9/2013 Chen .................. H04L 25/14
370/252

(Continued)

FOREIGN PATENT DOCUMENTS

CN  103986531 A  8/2014
CN  104601214 A  5/2015
(Continued)

OTHER PUBLICATIONS

Zhao et al, Distributed Antennas Scheme for Orbital Angular Momentum Long Distance Transmission, Feb. 2020, IEEE Antennas and Wireless Propagation Letters, vol. 19, No. 2, All Document. (Year: 2020).*

(Continued)

*Primary Examiner* — Dibson J Sanchez
(74) *Attorney, Agent, or Firm* — Holland & Hart LLP/Qualcomm Incorporated

(57) ABSTRACT

Methods, systems, and devices for connection setup in an orbital angular momentum (OAM)-based communication system are described. A first device and a second device may establish an OAM communications connection between the devices. The first device and the second device may exchange a series of messages over a downlink communications link and an uplink communications link according to an OAM mode. Based on OAM related parameters or OAM related information included in the messages, the first device and the second device may achieve a successful directional alignment (co-axial alignment) between the first device and (Continued)

the second device. The first device and the second device may determine one or more orbital angular momentum modes for communication between the first device and the second device based on the establishing the directional alignment.

30 Claims, 21 Drawing Sheets

(51) Int. Cl.
  *H04B 10/112* (2013.01)
  *H04J 14/00* (2006.01)
  *H04J 14/04* (2006.01)
  *H04B 10/114* (2013.01)
  *H04L 5/14* (2006.01)
  *H04W 76/10* (2018.01)

(52) U.S. Cl.
  CPC .............. *H04J 14/07* (2023.08); *H04B 10/11* (2013.01); *H04B 10/112* (2013.01); *H04B 10/1143* (2013.01); *H04J 14/00* (2013.01); *H04L 5/1438* (2013.01); *H04W 76/10* (2018.02)

(58) Field of Classification Search
  CPC . H04J 14/04; H04J 14/07; H04J 14/00; H04L 5/1438; H04L 27/32; H04L 5/04; H04L 5/0053; H04W 76/10
  USPC .................................... 398/43–103, 118–131
  See application file for complete search history.

(56) References Cited

U.S. PATENT DOCUMENTS

| | | | |
|---|---|---|---|
| 2015/0349910 A1* | 12/2015 | Huang | H04J 14/07 398/44 |
| 2016/0041523 A1* | 2/2016 | Ashrafi | G02B 26/0833 359/9 |
| 2016/0277173 A1* | 9/2016 | Dutronc | H04W 72/0446 |
| 2016/0301479 A1* | 10/2016 | Mary | H04L 25/03828 |
| 2017/0062910 A1* | 3/2017 | Iida | H01Q 13/08 |
| 2017/0163451 A1* | 6/2017 | Willner | H04B 7/0413 |
| 2017/0343750 A1 | 11/2017 | Ashrafi | |
| 2018/0287263 A1* | 10/2018 | Hirabe | H01Q 15/22 |
| 2019/0149251 A1* | 5/2019 | Zenkyu | H01Q 15/0013 375/262 |
| 2020/0228195 A1* | 7/2020 | Sasaki | H04B 7/0469 |
| 2020/0304180 A1* | 9/2020 | Lee | H04L 27/2602 |
| 2020/0407082 A1 | 12/2020 | Ashrafi | |
| 2021/0105049 A1* | 4/2021 | Zenkyu | H04B 7/0456 |
| 2021/0167495 A1* | 6/2021 | Hirabe | H01Q 3/18 |
| 2021/0211168 A1* | 7/2021 | Sasaki | H04B 10/112 |
| 2021/0288699 A1* | 9/2021 | Hirabe | H04B 7/0456 |
| 2021/0320707 A1* | 10/2021 | Kamiya | H04B 17/345 |
| 2022/0078780 A1* | 3/2022 | Choi | H04B 7/0456 |
| 2022/0247086 A1* | 8/2022 | Miyamoto | H01Q 19/104 |
| 2022/0271806 A1* | 8/2022 | Zhu | H04B 7/0456 |
| 2022/0278723 A1* | 9/2022 | Yu | H04B 7/0617 |
| 2022/0329293 A1* | 10/2022 | Tian | H04B 7/0417 |
| 2022/0360330 A1* | 11/2022 | Lee | H04B 10/2507 |
| 2023/0093039 A1* | 3/2023 | Lv | H04B 17/345 370/330 |
| 2023/0096819 A1* | 3/2023 | Ni | H04B 7/0639 343/702 |
| 2023/0412243 A1* | 12/2023 | Lee | H01Q 3/26 |

FOREIGN PATENT DOCUMENTS

| | | |
|---|---|---|
| CN | 105262527 A | 1/2016 |
| CN | 108566356 A | 9/2018 |
| CN | 110266354 A | 9/2019 |
| JP | 2019062297 A | 4/2019 |
| WO | WO-2016061114 A1 | 4/2016 |
| WO | WO-2020262744 A1 | 12/2020 |

OTHER PUBLICATIONS

Chen et al, Beam Steering for the Misalignment in UCA Based OAM Communication Systems, Aug. 2018, IEEE Wireless Communications Letters, vol. 7, No. 4, All Document. (Year: 2018).*
International Search Report and Written Opinion—PCT/CN2021/079274—ISA/EPO—Nov. 26, 2021.
International Search Report and Written Opinion—PCT/CN2022/079195—ISA/EPO—Apr. 27, 2022.
Sawant A., et al., "Orbital Angular Momentum Multiplexing for a Wireless Backhaul Communication System", IEEE, 4 Pages, Dec. 31, 2020 (Dec. 31, 2020) the whole document.
Zhou Y., et al., "Novel Method of Axis Alignment in Orbital Angular Momentum Wireless Communication", IEEE WCNC 2015, Dec. 31, 2015(Dec. 31, 2015), pp. 586-590, the whole document.
Ghadialy Z., "'Twisted Radio Waves': Could they be the way out of Spectrum Crunch?", Oct. 29, 2011, 1 Page.
Physik Instrumente: "Tip-Tilt Mirrors for Free Space Optical Communication and Astronomical Telescopes/Active Optics", Nov. 14, 2019, 15 Pages, http://photonic.ws/Free_Space_Optical_Communication_Tip-Tilt-Mirror_Brochure.pdf.
Sasaki H., et al., "Experiment on Over-100-Gbps Wireless Transmission with OAM-MIMO Multiplexing System in 28-GHz Band", NTT DoCoMo, 2018 IEEE Global Communications Conference, Dec. 9-13, 2018, 6 Pages.
Supplementary European Search Report—EP22762620—Search Authority—Munich—Dec. 23, 2024.
Zhou Y., et al., "Novel Method of Axis Alignment in Orbital Angular Momentum Wireless Communication", 2015 IEEE Wireless Communications and Networking Conference, IEEE, Mar. 9, 2015, pp. 586-590, XP032786716, section I, section III-A.

* cited by examiner

CONNECTION SETUP IN OAM-BASED COMMUNICATION SYSTEM

CROSS REFERENCES

The present application is a 371 national stage filing of International PCT Application No. PCT/CN2022/079195 by HUANG et al. entitled "CONNECTION SETUP IN OAM-BASED COMMUNICATION SYSTEM," filed Mar. 4, 2022; and claims priority to International Patent Application No. PCT/CN2021/079274 by HUANG et al. entitled "CONNECTION SETUP IN OAM-BASED COMMUNICATION SYSTEM," filed Mar. 5, 2021, each of which is assigned to the assignee hereof, and each of which is expressly incorporated by reference in its entirety herein.

FIELD OF TECHNOLOGY

The following relates to wireless communications, including connection setup in orbital angular momentum (OAM)-based communication systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include a number of network entities or network access nodes, each simultaneously supporting communication for multiple communication devices, which may be otherwise known as user equipment (UE). In some systems, such as in orbital angular momentum (OAM)-capable communications systems, wireless devices such as UEs and network entities may communicate using OAM beams.

SUMMARY

The described techniques relate to improved methods, systems, devices, and apparatuses that support connection setup in orbital angular momentum (OAM)-based communication systems. Generally, the described techniques provide for establishing an OAM-based communications connection between a transmitting device and a receiving device.

A method for wireless communication at a first device is described. The method may include transmitting a first message via a first orbital angular momentum mode, the first message including a synchronization signal and first positional information associated with a first orbital angular momentum circle center associated with the first device, receiving, via the first orbital angular momentum mode, a second message responsive to the first message, the second message including second positional information associated with a second orbital angular momentum circle center associated with a second device, transmitting, to the second device via the first orbital angular momentum mode, a third message based on the second message, the third message including directional alignment information associated with transmitting a signal, transmitting the signal to the second device based on the second positional information, and receiving, from the second device via the first orbital angular momentum mode, a fourth message based on transmitting the third message and the signal, the fourth message indicating whether the signal was successfully received by the second device.

An apparatus for wireless communication at a first device is described. The apparatus may include a memory, a transceiver, and at least one processor of a user equipment (UE), the at least one processor coupled with the memory and the transceiver. The at least one processor may be configured to cause the apparatus to transmit a first message via a first orbital angular momentum mode, the first message including a synchronization signal and first positional information associated with a first orbital angular momentum circle center associated with the first device, receive, via the first orbital angular momentum mode, a second message responsive to the first message, the second message including second positional information associated with a second orbital angular momentum circle center associated with a second device, transmit, to the second device via the first orbital angular momentum mode, a third message based on the second message, the third message including directional alignment information associated with transmitting a signal, transmit the signal to the second device based on the second positional information, and receive, from the second device via the first orbital angular momentum mode, a fourth message based on transmitting the third message and the signal, the fourth message indicating whether the signal was successfully received by the second device.

Another apparatus for wireless communication at a first device is described. The apparatus may include means for transmitting a first message via a first orbital angular momentum mode, the first message including a synchronization signal and first positional information associated with a first orbital angular momentum circle center associated with the first device, means for receiving, via the first orbital angular momentum mode, a second message responsive to the first message, the second message including second positional information associated with a second orbital angular momentum circle center associated with a second device, means for transmitting, to the second device via the first orbital angular momentum mode, a third message based on the second message, the third message including directional alignment information associated with transmitting a signal, means for transmitting the signal to the second device based on the second positional information, and means for receiving, from the second device via the first orbital angular momentum mode, a fourth message based on transmitting the third message and the signal, the fourth message indicating whether the signal was successfully received by the second device.

A non-transitory computer-readable medium storing code for wireless communication at a first device is described. The code may include instructions executable by a processor to transmit a first message via a first orbital angular momentum mode, the first message including a synchronization signal and first positional information associated with a first orbital angular momentum circle center associated with the first device, receive, via the first orbital angular momentum mode, a second message responsive to the first message, the second message including second positional information associated with a second orbital angular momentum circle center associated with a second device, transmit, to the second device via the first orbital angular momentum mode, a third message based on the second message, the third message including directional alignment information associated with transmitting a signal, transmit the signal to the second device based on the second positional information, and receive, from the second device via the first orbital angular momentum mode, a fourth message based on transmitting the third message and the signal, the fourth message indicating whether the signal was successfully received by the second device.

In some examples of the method, apparatuses, and non-transitory computer-readable medium described herein, a transmitter orbital angular momentum circle center associated with the first device, direction information associated with the transmitter orbital angular momentum circle center, a receiver orbital angular momentum circle center associated with the first device, direction information associated with the receiver orbital angular momentum circle center, or a combination thereof.

In some examples of the method, apparatuses, and non-transitory computer-readable medium described herein, a transmitter orbital angular momentum circle center associated with the second device, direction information associated with the transmitter orbital angular momentum circle center, a receiver orbital angular momentum circle center associated with the second device, direction information associated with the receiver orbital angular momentum circle center, or a combination thereof.

In some examples of the method, apparatuses, and non-transitory computer-readable medium described herein, the first message further includes a first set of orbital angular momentum parameters associated with transmissions by the first device.

In some examples of the method, apparatuses, and non-transitory computer-readable medium described herein, a list of candidate orbital angular momentum modes associated with the transmissions by the first device, a quantity of downlink transmitter circles associated with the first device, a radius associated with each of the downlink transmitter circles, a quantity of antenna elements associated with each of the downlink transmitter circles, a quantity of orbital angular momentum modes simultaneously used for one or more of the downlink transmitter circles, a quantity of uplink receiver circles associated with reception of the transmissions by the first device, a radius associated with each of the uplink receiver circles, a quantity of antenna elements associated with each of the uplink receiver circles, and a quantity of orbital angular momentum modes simultaneously used for one or more of the uplink receiver circles.

In some examples of the method, apparatuses, and non-transitory computer-readable medium described herein, the second message includes a second set of orbital angular momentum parameters associated with transmissions by the second device.

In some examples of the method, apparatuses, and non-transitory computer-readable medium described herein, a list of candidate orbital angular momentum modes associated with the transmissions by the second device, a quantity of uplink transmitter circles associated with the second device, a radius associated with each of the uplink transmitter circles, a quantity of antenna elements associated with each of the uplink transmitter circles, a quantity of orbital angular momentum modes simultaneously used for one or more of the uplink transmitter circles, a quantity of downlink receiver circles associated with the first device, a radius associated with each of the downlink receiver circles, a quantity of antenna elements associated with each of the downlink receiver circles, and a quantity of orbital angular momentum modes simultaneously used for one or more of the downlink receiver circles.

In some examples of the method, apparatuses, and non-transitory computer-readable medium described herein, the directional alignment information includes steering information associated with the signal, the steering information including a wavelength of the signal, a polarization of the signal, a laser mode associated with the signal, or a combination thereof.

In some examples of the method, apparatuses, and non-transitory computer-readable medium described herein, the fourth message further includes an indication of a successful alignment between the first device and the second device and the method, apparatuses, and non-transitory computer-readable medium may include further operations, features, means, or instructions for communicating one or more data transmissions with the second device according to a set of orbital angular momentum modes based on the successful alignment.

In some examples of the method, apparatuses, and non-transitory computer-readable medium described herein, communicating the one or more data transmissions may include operations, features, means, or instructions for transmitting, via the first orbital angular momentum mode, a configuration message associated with one or more downlink channel transmissions, the configuration message indicating a set of configured orbital angular momentum modes for the one or more downlink channel transmissions, where the set of configured orbital angular momentum modes includes two or more orbital angular momentum modes of the set of orbital angular momentum modes.

Some examples of the method, apparatuses, and non-transitory computer-readable medium described herein may further include operations, features, means, or instructions for identifying a set of parameters associated with transmitting the first message, the set of parameters including a periodicity associated with transmitting the first message.

In some examples of the method, apparatuses, and non-transitory computer-readable medium described herein, the first message indicates a set of resources allocated for receiving the second message, transmitting the third message, receiving the fourth message, or a combination thereof.

Some examples of the method, apparatuses, and non-transitory computer-readable medium described herein may further include operations, features, means, or instructions for receiving a configuration indicating a set of resources allocated for transmitting the first message, receiving the second message, transmitting the third message, receiving the fourth message, or a combination thereof.

Some examples of the method, apparatuses, and non-transitory computer-readable medium described herein may further include operations, features, means, or instructions for monitoring for a wake-up signal over a set of resources allocated for the wake-up signal, where the monitoring may be via the first orbital angular momentum mode and receiving the wake-up signal based on the monitoring, where transmitting the first message may be based on receiving the wake-up signal.

In some examples of the method, apparatuses, and non-transitory computer-readable medium described herein, the signal includes an optical signal.

In some examples of the method, apparatuses, and non-transitory computer-readable medium described herein, the signal includes a radio signal.

In some examples of the method, apparatuses, and non-transitory computer-readable medium described herein, the signal includes a directional signal associated with one or more beams.

In some examples of the method, apparatuses, and non-transitory computer-readable medium described herein, the signal includes an omnidirectional signal.

In some examples of the method, apparatuses, and non-transitory computer-readable medium described herein, the first orbital angular momentum mode includes orbital angular momentum mode.

Some examples of the method, apparatuses, and non-transitory computer-readable medium described herein may further include operations, features, means, or instructions for transmitting the first message, the third message, or both includes using a center radiator of one or more transmitter circles of the first device or one or more uniform circular array radiators of the one or more transmitter circles of the first device.

A method for wireless communication at a second device is described. The method may include receiving a first message via a first orbital angular momentum mode, the first message including a synchronization signal and first positional information associated with a first orbital angular momentum circle center associated with a first device, transmitting, via the first orbital angular momentum mode, a second message responsive to the first message, the second message including second positional information associated with a second orbital angular momentum circle center associated with the second device, receiving, from the first device via the first orbital angular momentum mode, a third message based on the second message, the third message including directional alignment information associated with transmitting a signal, receiving the signal from the first device based on the second positional information, and transmitting, to the first device via the first orbital angular momentum mode, a fourth message based on receiving the third message and the signal, the fourth message indicating whether the signal was successfully received by the second device.

An apparatus for wireless communication at a second device is described. The apparatus may include a memory, a transceiver, and at least one processor of a network entity, the at least one processor coupled with the memory and the transceiver. The at least one process may be configured to cause the apparatus to receive a first message via a first orbital angular momentum mode, the first message including a synchronization signal and first positional information associated with a first orbital angular momentum circle center associated with a first device, transmit, via the first orbital angular momentum mode, a second message responsive to the first message, the second message including second positional information associated with a second orbital angular momentum circle center associated with the second device, receive, from the first device via the first orbital angular momentum mode, a third message based on the second message, the third message including directional alignment information associated with transmitting a signal, receive the signal from the first device based on the second positional information, and transmit, to the first device via the first orbital angular momentum mode, a fourth message based on receiving the third message and the signal, the fourth message indicating whether the signal was successfully received by the second device.

Another apparatus for wireless communication at a second device is described. The apparatus may include means for receiving a first message via a first orbital angular momentum mode, the first message including a synchronization signal and first positional information associated with a first orbital angular momentum circle center associated with a first device, means for transmitting, via the first orbital angular momentum mode, a second message responsive to the first message, the second message including second positional information associated with a second orbital angular momentum circle center associated with the second device, means for receiving, from the first device via the first orbital angular momentum mode, a third message based on the second message, the third message including directional alignment information associated with transmitting a signal, means for receiving the signal from the first device based on the second positional information, and means for transmitting, to the first device via the first orbital angular momentum mode, a fourth message based on receiving the third message and the signal, the fourth message indicating whether the signal was successfully received by the second device.

A non-transitory computer-readable medium storing code for wireless communication at a second device is described. The code may include instructions executable by a processor to receive a first message via a first orbital angular momentum mode, the first message including a synchronization signal and first positional information associated with a first orbital angular momentum circle center associated with a first device, transmit, via the first orbital angular momentum mode, a second message responsive to the first message, the second message including second positional information associated with a second orbital angular momentum circle center associated with the second device, receive, from the first device via the first orbital angular momentum mode, a third message based on the second message, the third message including directional alignment information associated with transmitting a signal, receive the signal from the first device based on the second positional information, and transmit, to the first device via the first orbital angular momentum mode, a fourth message based on receiving the third message and the signal, the fourth message indicating whether the signal was successfully received by the second device.

In some examples of the method, apparatuses, and non-transitory computer-readable medium described herein, a transmitter orbital angular momentum circle center associated with the first device, direction information associated with the transmitter orbital angular momentum circle center, a receiver orbital angular momentum circle center associated with the first device, direction information associated with the receiver orbital angular momentum circle center, or a combination thereof.

In some examples of the method, apparatuses, and non-transitory computer-readable medium described herein, a transmitter orbital angular momentum circle center associated with the second device, direction information associated with the transmitter orbital angular momentum circle center, a receiver orbital angular momentum circle center associated with the second device, direction information associated with the receiver orbital angular momentum circle center, or a combination thereof.

In some examples of the method, apparatuses, and non-transitory computer-readable medium described herein, the first message further includes a first set of orbital angular momentum parameters associated with transmissions by the first device.

In some examples of the method, apparatuses, and non-transitory computer-readable medium described herein, the signal includes an optical signal.

In some examples of the method, apparatuses, and non-transitory computer-readable medium described herein, the signal includes a radio signal.

In some examples of the method, apparatuses, and non-transitory computer-readable medium described herein, the signal includes a directional signal associated with one or more beams.

In some examples of the method, apparatuses, and non-transitory computer-readable medium described herein, the signal includes an omnidirectional signal.

DETAILED DESCRIPTION

Figure 1:
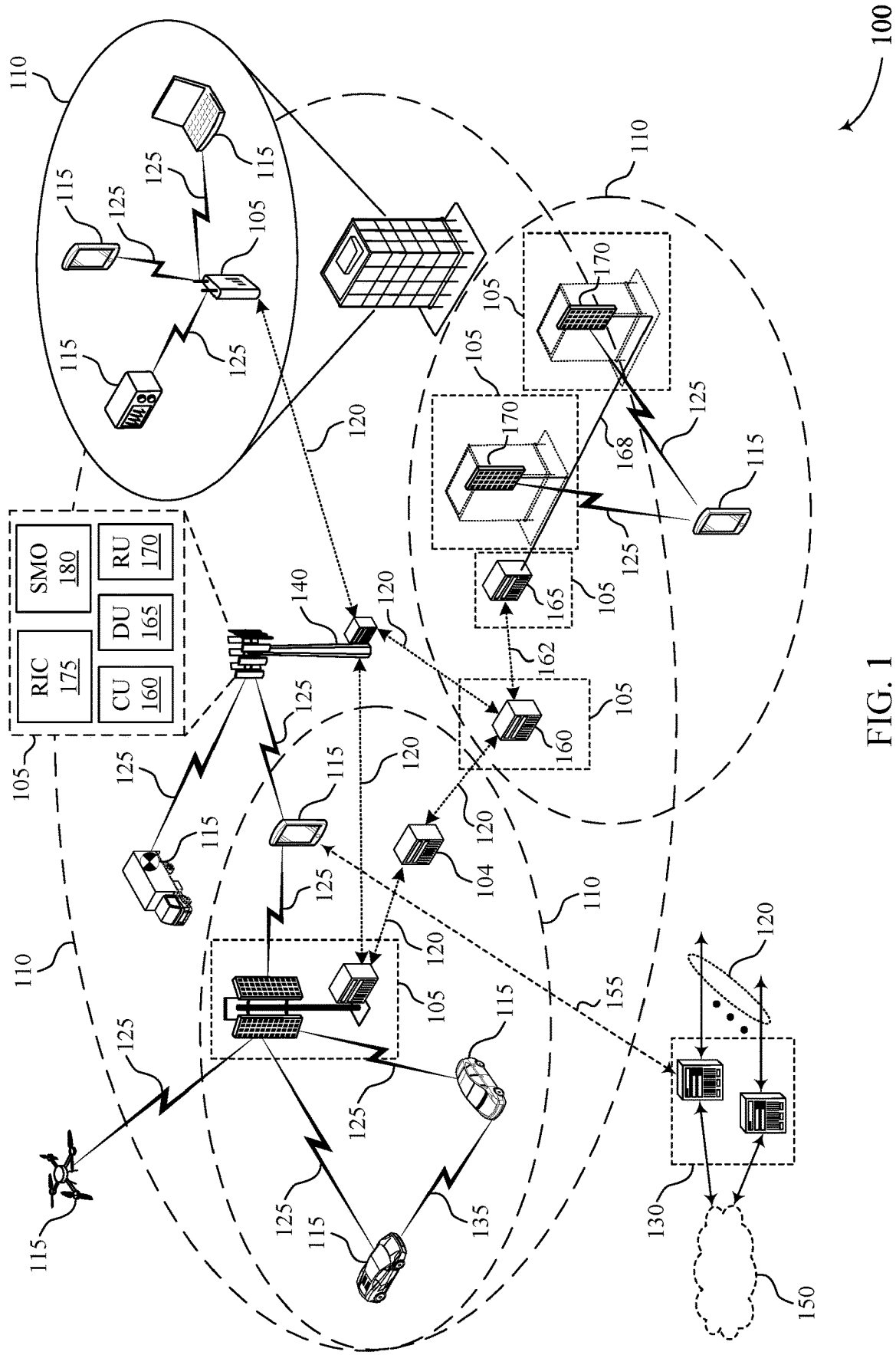
FIG. 1 illustrates an example of a wireless communications system that supports connection setup in orbital angular moment (OAM)-based communication system in accordance with aspects of the present disclosure.

In some wireless communications systems, wireless devices, such as network entities or user equipment (UEs), or both, may communicate directionally, for example, using beams to orient communication signals over one or more directions. In some systems, such as in orbital angular momentum (OAM)-capable communications systems, the wireless devices may communicate using OAM signals (e.g., beams), which, in addition to providing signal directionality, may also provide an additional dimension for signal or channel multiplexing. In some aspects, for example, such additional dimensions may include a state or a mode of the OAM signal, where different states or modes of OAM signals may be orthogonal to each other. As such, different OAM states or modes may be multiplexed together (also referred to herein as OAM multiplexing) to increase the capacity of an OAM link. In some cases, a wireless device may use spiral phase plate (SPP) or uniform circular array (UCA) based methodologies to generate an OAM beam. Additionally, another additional dimension may include polarization. Since any OAM mode can be one of two polarizations (e.g., two linear polarizations (e.g., one horizontal and one vertical) or two circular and elliptical polarizations (e.g., clockwise and counter-clockwise)), polarization and OAM mode may be two independent properties of electromagnetic waves and two independent sources of degrees of freedom. In some cases, using a combination of different polarizations and multiple OAM modes may support an increased number (e.g., double) of data streams in OAM-based communications in MIMO compared to OAM-based communications that do not exploit polarization.

In some cases, a transmitting device and a receiving device may each be equipped with one or more antenna circles (e.g., uniform circular arrays (UCA)) that may allow the transmitting device and the receiving device to communicate according to one or more OAM modes. In an OAM-based communication system in which a transmitting device, or a receiving device, or both are each equipped with multiple antenna circles, the efficiency of each antenna circle (e.g., channel gains of each antenna circle) may be different for each OAM mode. For example, a signal produced by a first antenna circle according to a first OAM mode may have a different channel gain than a signal produced by a second antenna circle according to the first OAM mode. To increase efficiency and throughput in the OAM-communications system, a transmitting device (e.g., a user equipment (UE), network entity, integrated access and backhaul (IAB) node, relay node, etc.) or a receiving device (e.g., a UE, network entity, IAB node, relay node, etc.), or both may determine a transmission scheme for the transmitting device to use for transmitting messages (e.g., data messages, control messages) to the receiving device. For example, the transmitting device, or the receiving device, or both may be configured to determine which antenna circle of the transmitting device (e.g., transmitter circle) to use for each OAM mode so as to optimize data throughput of each OAM mode.

In some cases, a transmitting device and a receiving device may fail to identify respective axial directions of the other device. For example, the transmitting device may fail to identify an axial direction of an antenna circle (e.g., UCA)

of the receiving device. In some examples, the receiving device may fail to identify an axial direction of an antenna circle (e.g., UCA) of the transmitting device.

Accordingly, during some initial connection setup procedures for establishing a connection between the transmitting device and receiving device, a transmitting device and a receiving device may be unable to exchange information and context with respect to respective axial directions. In some cases, without the exchange of such information and context, the transmitting device and the receiving device may be unable to obtain or maintain co-axiality between the devices. In an example, the devices may thereby be unable to obtain or maintain inter-mode orthogonality among signals of different OAM modes. In some cases, without co-axiality between the devices, utilizing spatial multiplexing via multiple OAM modes may be impacted by severe mutual interference (e.g., mutual interference above a threshold).

Further, OAM modes may each have a respective channel gain determined by system parameters such as communication distance between the devices, respective radii of transmitter circles or receiver circles of the devices, and carrier wavelengths. In some OAM-based communications systems, the transmitting device and the receiving device may fail to identify such parameters, and therefore may select an OAM mode for communication between the devices that is less efficient or less optimal (e.g., according to a metric) than at least one other OAM mode.

According to example aspects of the present disclosure, a first device and a second device may establish an OAM communications connection between the first device and the second device. For example, the first device and the second device may exchange a series of messages (e.g., four messages) over a communications link (e.g., an uplink communications link, a downlink communications link) according to an OAM mode (e.g., OAM mode 0). Based on OAM related parameters or OAM related information included in the messages, the first device and the second device may achieve a successful directional alignment (co-axial alignment) between the first device and the second device. The first device and the second device may determine one or more orbital angular momentum modes (e.g., orbital angular momentum mode 1, 2, etc.) for communication between the first device and the second device based on the establishing the directional alignment.

Aspects of the disclosure are initially described in the context of a wireless communications system. Examples of processes and signaling exchanges that support connection setup in an OAM-based communications system are then described. Aspects of the disclosure are further illustrated by and described with reference to apparatus diagrams, system diagrams, and flowcharts that relate to connection setup in an OAM-based communications system.

FIG. 1 illustrates an example of a wireless communications system 100 that supports connection setup in OAM-based communication system in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support connection setup in OAM-based communication system as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some wireless communications systems, such as wireless communications systems 100, a first device, such as a transmitting device, and a second device, such as a receiving device, may each be equipped with one or more antenna circles (e.g., UCAs) that may allow the first device and the second device to communicate according to one or more OAM modes over one or more antenna circles. In some aspects, the first device may be a UE 115, network entity 105, integrated access and backhaul (IAB) node, relay node, etc., and the second device may be a UE 115, network entity 105, IAB node, relay node, etc.

According to example aspects of the present disclosure, the first device and the second device may establish an OAM communications connection between the first device and the second device. For example, the first device and the second device may exchange a series of messages (e.g., four messages) over a communications link (e.g., an uplink communications link) and another communications link (e.g., a downlink communications link) according to an OAM mode (e.g., OAM mode 0). Based on OAM related parameters or OAM related information included in the messages, the first device and the second device may achieve a successful directional alignment (co-axial alignment) between the first device and the second device. The first device and the second device may determine one or more OAM modes (e.g., OAM mode 1, 2, etc.) for communication between the first device and the second device based on the establishing the directional alignment.

For example, the first device may transmit a first message to the second device via an OAM mode (e.g., OAM mode 0). The first message may be, for example, a system information and synchronization message. In an example, the first device may transmit the first message to the second device via a communications link (e.g., a downlink communications link). In some examples, the first device may transmit the first message to the second device in response to receiving a wake-up signal from the second device. In some other examples, the first device may transmit the first message periodically (e.g., according to a set of parameters including a periodicity).

In some aspects, the first message may include a synchronization signal. In some other aspects, the first message may include first positional information (e.g., global positioning system (GPS) positioning information, a global navigation satellite system (GNSS) positioning information) associated with a first OAM circle center associated with the first device. In some examples, the first message may include a list of OAM parameters (e.g., including candidate OAM modes) associated with transmissions (e.g., downlink transmissions) by the first device.

The first device may receive a second message from the second device, via the OAM mode (e.g., OAM mode 0). The second message may be, for example, a connection request message. In some aspects, the second device may transmit (and the first device may receive) the second message in response to the first message. In an example, the second device may transmit the second message to the first device via another communications link (e.g., an uplink communications link).

In some aspects, the second message may include second positional information (e.g., GPS positioning information, GNSS positioning information) associated with an OAM circle center associated with the second device. In some other aspects, the second message may include a list of OAM parameters (e.g., including candidate OAM modes) associated with transmissions (e.g., uplink transmissions) by the second device. In some aspects, the candidate OAM modes indicated in the second message may include a subset of the candidate OAM modes indicated in the first message.

The first device may transmit a third message to the second device based on the second message. The third message may be, for example, a directional alignment request message. In some aspects, the third message may include directional alignment information associated with transmitting a signal (e.g., an optical signal, a radio signal, a directional signal associated with one or more beams, an omnidirectional signal). In an example, the directional alignment information may include steering information associated with the signal. In some examples, the steering information may include a wavelength of the signal, a polarization of the signal, a laser mode associated with the signal, or a combination thereof.

Based on the second positional information of the second device, the first device may transmit the signal to the second device. In some aspects, based on the first positional information associated with a first OAM circle center associated with the first device (e.g., as included in the first message) and the directional alignment information (e.g., as included in the third message), the second device may attempt to align the second OAM circle center associated with the second device with the first OAM circle center associated with the first device. In an example, the second device may rotate the axial direction of OAM circles of the second device towards the position of the first device.

The second device may transmit (and the first device may receive) a fourth message indicating whether the signal was successfully received by the second device. The fourth message may be, for example, a directional alignment response message. In some aspects, the fourth message may include an indication of successful alignment between the first device and the second device. In some examples, the fourth message may include an indication of an unsuccessful alignment between the first device and the second device.

In some aspects, based on a successful alignment between the first device and the second device, the first device and the second device may communicate (e.g., transmit and receive) signaling messages and data transmissions according to a set of OAM modes. For example, the first device may transmit, via the OAM mode (e.g., OAM mode 0) used for communicating the first message through the fourth message, a configuration message (e.g., a physical downlink shared channel (PDSCH) configuration message) for one or more downlink channel transmissions (e.g., PDSCH transmissions). In some aspects, the configuration message (e.g., PDSCH configuration message) may indicate a set of configured OAM modes (e.g., multiple OAM modes) for the one or more downlink channel transmissions (e.g., PDSCH transmissions).

Figure 2:
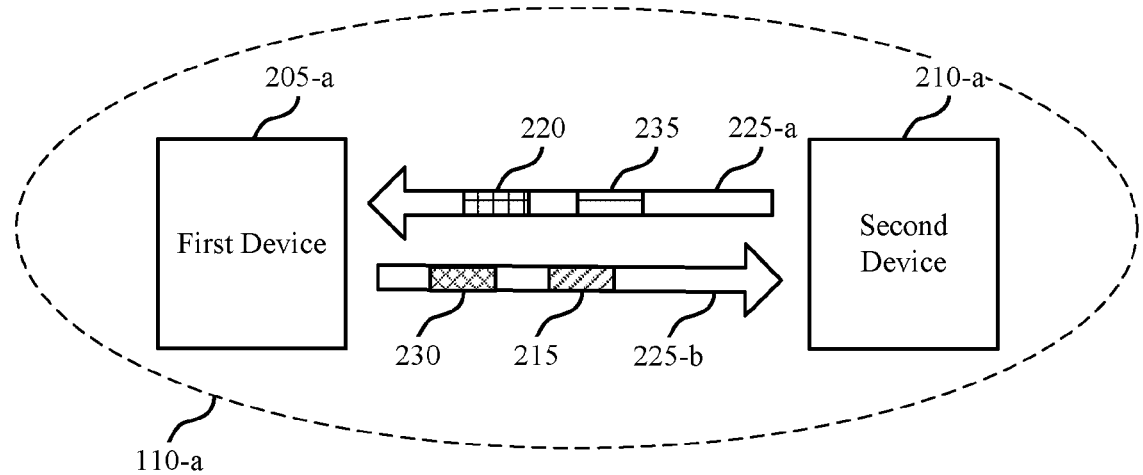
FIG. 2 illustrates an example of a wireless communications system that supports connection setup in OAM-based communication system in accordance with aspects of the present disclosure.
Figure 2:
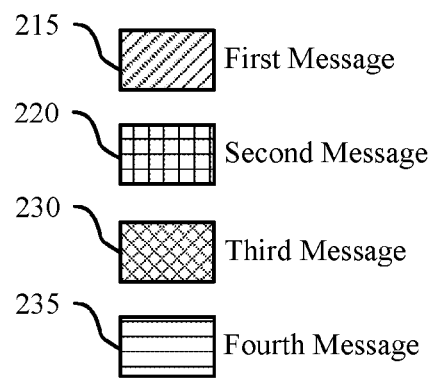
Figure 2:

FIG. 2 illustrates an example of a wireless communications system 200 that supports connection setup in an OAM-based communication system in accordance with aspects of the present disclosure. In some examples, wireless communications system 200 may implement aspects of wireless communications system 100. The wireless communications system 200 may illustrate communication between a first device 205-a and a second device 210-a, where the first device 205-a and the second device 210-a may be the same type of device or may be different types of devices. The first device 205-a and the second device 210-a may each be a UE, a network entity, an IAB node, etc. The first device 205-a and the second device 210-a may be examples of corresponding devices described herein.

In some cases, the first device 205-a or the second device 210-a may serve geographic coverage area 110-a. In some examples, the wireless communications system 200 (which may be an example of a sixth generation (6G) system, a fifth generation (5G) system, or other generation of system) may support OAM-based communications. The first device 205-a and the second device 210-a may transmit or receive OAM beams, or OAM-related signals over communications links 225 within a geographic coverage area 110-a.

For example, the first device 205-a or the second device 210-a may support OAM-based communication by using the OAM of electromagnetic waves to distinguish between different signals. The OAM of electromagnetic waves may be different than the spin angular momentum (SAM) of electromagnetic waves, and both may contribute to the overall angular momentum of an electromagnetic wave as defined in quantum mechanics by Equation 1, shown below.

$$J = \iiint r \times S dx dy dz = \Sigma + L \quad (1)$$

As shown in Equation 1, J is equal to the angular momentum of the electromagnetic wave, r is a position vector, $S=E \times H$ and is equal to the Poynting flux, where E is equal to the electric field vector and H is equal to the magnetic field's auxiliary field vector, $\Sigma$ is equal to the SAM of the electromagnetic wave (and is sometimes alternatively denoted as S), and L is equal to the OAM of the electromagnetic wave. In some cases, the SAM of the electromagnetic wave may be associated with the polarization of the electromagnetic wave. For example, an electromagnetic wave may be associated with different polarizations (e.g., circular polarizations), such as left and right. Accordingly, the SAM of the electromagnetic wave may have multiple (e.g., two) degrees of freedom.

In some cases, the OAM of the electromagnetic wave may be associated with a field spatial distribution of the electromagnetic wave, which may be in the form of a helical or twisted wavefront shape (e.g., in examples in which a light beam can be associated with a helical or twisted wavefront).

For example, an electromagnetic wave (e.g., a light beam, an optical beam, a radio signal, a directional beam, an omni-directional signal) may be in a helical mode (which may also be referred to as an OAM mode) and such helical modes may be characterized by a wavefront that is shaped as a helix with an optical vortex in the center (e.g., at the beam axis), where each helical mode is associated with a different helical wavefront structure. The helical modes (e.g., OAM modes, which may also be referred to as OAM states) may be defined or referred to by a mode index l, where a sign of the mode index l corresponds to a "handedness" (e.g., left or right) of the helix (or helices) and a magnitude of the mode index l (e.g., |l|) corresponds to a quantity of distinct but interleaved helices of the electromagnetic wave.

For example, for an electromagnetic wave associated with an OAM mode index of l=0, the electromagnetic wave is not helical and the wavefronts of the electromagnetic wave are multiple disconnected surfaces (e.g., the electromagnetic wave is a sequence of parallel planes). For an electromagnetic wave associated with an OAM mode index of l=+1, the electromagnetic wave may propagate in a right-handed sense (e.g., has a right circular polarization or may be understood as having a clockwise circular polarization) and the wavefront of the electromagnetic wave may be shaped as a single helical surface with a step length equal to a wavelength A of the electromagnetic wave. Likewise, the phase delay over one revolution of the electromagnetic wave may be equal to $2\pi$. Similarly, for an OAM mode index of l=-1, the electromagnetic wave may propagate in a left-handed sense (e.g., has a left circular polarization or may be understood as having a counter-clockwise circular polarization) and the wavefront of the electromagnetic wave may be also be shaped as a single helical surface with a step length equal to the wavelength A of the electromagnetic wave. Likewise, the phase delay over one revolution of the electromagnetic wave may be equal to $-2\pi$.

For further example, for an OAM mode index of l=±2, the electromagnetic wave may propagate in either a right-handed sense (if +2) or in a left-handed sense (if -2) and the wavefront of the electromagnetic wave may include two distinct but interleaved helical surfaces. In such examples, the step length of each helical surface may be equal to $\lambda/2$. Likewise, the phase delay over one revolution of the electromagnetic wave may be equal to $\pm 4\pi$. In general terms, a mode-l electromagnetic wave may propagate in either a right-handed sense or a left-handed sense (depending on the sign of l) and may include l distinct but interleaved helical surfaces with a step length of each helical surface equal to $\lambda/|l|$. Likewise, the phase delay over one revolution of the electromagnetic wave may be equal to $2\pi$. In some examples, an electromagnetic wave may be indefinitely extended to provide for an infinite number of degrees of freedom of the OAM of the electromagnetic wave (e.g., l=-∞, ..., -2, -1, 0, +1, +2, ..., +∞). As such, the OAM of the electromagnetic wave (e.g., L as defined in Equation 1) may be associated with infinite degrees of freedom.

In some examples, the OAM mode index l of an electromagnetic wave may correspond to or otherwise function as (e.g., be defined as) an additional dimension for signal or channel multiplexing. For example, each OAM mode or state (of which there may be infinite), may function similarly (e.g., or equivalently) to a communication channel, such as a sub-channel. In other words, an OAM mode or state may correspond to a communication channel, and vice versa. For instance, the first device 205-a or the second device 210-a may communicate separate signals using electromagnetic waves having different OAM modes or states similarly to how the first device 205-*a* or the second device 210-*a* may transmit separate signals over different communication channels. In some aspects, such use of the OAM modes or states of an electromagnetic wave to carry different signals may be referred to as the use of OAM beams.

Additionally, in some examples, electromagnetic waves with different OAM modes (e.g., OAM states) may be mutually orthogonal to each other (e.g., in a Hilbert sense, in which a space may include an infinite set of axes and sequences may become infinite by way of always having another coordinate direction in which next elements of the sequence can go). Likewise, in a Hilbert sense, orthogonal OAM modes or states may correspond to orthogonal communication channels (e.g., orthogonal sequences transmitted over a communication channel) and, based on the potentially infinite number of OAM modes or states, the wireless communications system 200 employing the use of OAM beams may theoretically achieve infinite capacity. For example, in theory, an infinite number of OAM states or modes may be twisted together for multiplexing and the capacity of the OAM link can approach infinity while preserving orthogonality between signals carried by different OAM modes (e.g., indices). In practice, however, due to non-ideal factors (e.g., Tx/Rx axial or position placement error, propagation divergence, and the like), crosstalk among OAM modes at the receiver may result, and thus a reduced number of concurrent OAM modes may be implemented between wireless devices (e.g., two or four concurrent OAM modes). In some cases, the first device 205-*a* or the second device 210-*a* may generate such OAM beams using SPP or UCA methodologies, such as discussed with reference to FIGS. 3 and 4.

Figure 4:
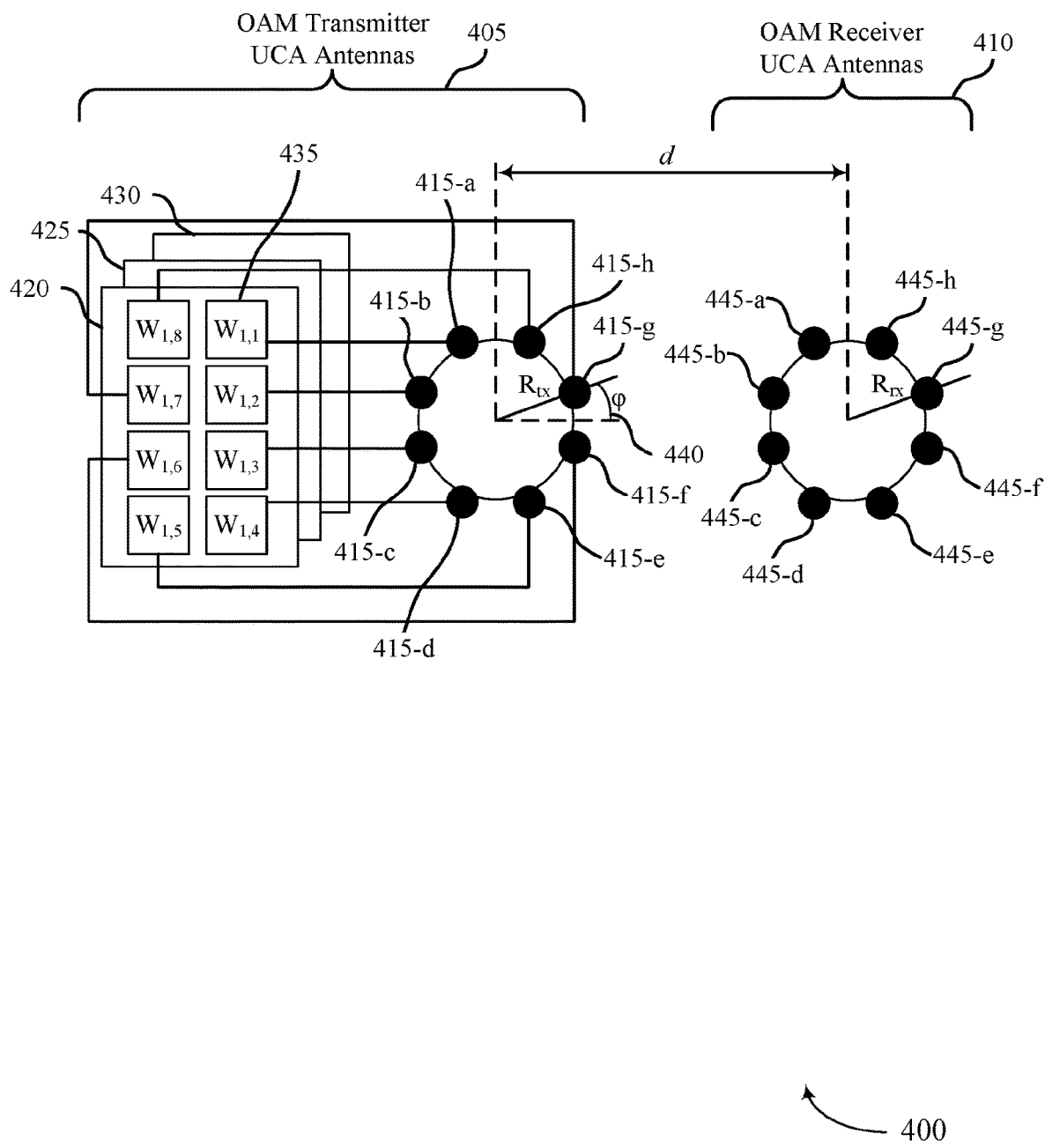
FIG. 4 illustrates an example of a uniform circular array orbital angular momentum configuration that supports connection setup in OAM-based communication system in accordance with aspects of the present disclosure.

In some aspects, an as described with respect to FIG. 4, the first device 205-*a*, or the second device 210-*a*, or both may be configured with a set of antennas configured in a circle, such as a UCA antenna circle (e.g., antenna circle, transmitter circle). In some cases, the first device 205-*a* and the second device 210-*a* may each be equipped with one or more UCA circles that the first device 205-*a* and the second device 210-*a* may use to communicate according to one or more OAM modes. In scenarios in which the first device 205-*a*, or the second device 210-*a*, or both each are equipped with multiple UCA circles, the efficiency of each UCA circle (e.g., the channel gain of signals from each UCA circle) may be different for each OAM mode. For example, a signal produced by a first antenna circle according to a first OAM mode may have a different channel gain than a signal produced by a second antenna circle according to the first OAM mode. In some aspects, a transmitting device (e.g., the first device 205-*a*, the second device 210-*a*) may radiate multiple coaxially propagating, spatially-overlapping waves (OAM mode l=$-\infty$, . . . , $-2$, $-1$, 0, $+1$, $+2$, . . . , $+\infty$) each carrying a data stream through a pair of apertures or an array of apertures.

According to example aspects of the present disclosure, the first device 205-*a* and the second device 210-*a* may establish an OAM communications connection between the first device 205-*a* and the second device 210-*a*. For example, the first device 205-*a* and the second device 210-*a* may exchange a series of messages (e.g., four messages) over a communications link 225-*a* (e.g., an uplink communications link) and a communications link 225-*b* (e.g., a downlink communications link) according to an OAM mode (e.g., OAM mode 0). Based on OAM related parameters or OAM related information included in the messages, the first device 205-*a* and the second device 210-*a* may achieve a successful directional alignment (co-axial alignment) between the first device 205-*a* and the second device 210-*a*. The first device 205-*a* and the second device 210-*a* may determine one or more OAM modes (e.g., OAM mode 1, 2, etc.) for communication between the first device 205-*a* and the second device 210-*a* based on the establishing the directional alignment.

For example, the first device 205-*a* may transmit a first message 215 to the second device 210-*a* via an OAM mode (e.g., OAM mode 0). The first message 215 may be, for example, a system information and synchronization message. In an example, the first device 205-*a* may transmit the first message 215 to the second device 210-*a* via communications link 225-*b* (e.g., a downlink communications link). In some examples, the first device 205-*a* may transmit the first message 215 to the second device 210-*a* in response to receiving a wake-up signal from the second device 210-*a*. In some other examples, the first device 205-*a* may transmit the first message 215 periodically (e.g., according to a set of parameters including a periodicity).

In some aspects, the first message 215 may include a synchronization signal. In some other aspects, the first message 215 may include first positional information (e.g., GPS positioning information, GNSS positioning information) associated with a first OAM circle center associated with the first device 205-*a*. In some examples, the first message 215 may include a list of OAM parameters (e.g., including candidate OAM modes) associated with transmissions (e.g., downlink transmissions) by the first device 205-*a*.

The first device 205-*a* may receive a second message 220 from the second device 210-*a*, via the OAM mode (e.g., OAM mode 0). The second message 220 may be, for example, a connection request message. In some aspects, the second device 210-*a* may transmit (and the first device 205-*a* may receive) the second message 220 in response to the first message 215. In an example, the second device 210-*a* may transmit the second message 220 to the first device 205-*a* via communications link 225-*a* (e.g., an uplink communications link).

In some aspects, the second message 220 may include second positional information (e.g., GPS positioning information, GNSS positioning information) associated with an OAM circle center associated with the second device 210-*a*. In some other aspects, the second message 220 may include a list of OAM parameters (e.g., including candidate OAM modes) associated with transmissions (e.g., uplink transmissions) by the second device 210-*a*. In some aspects, the candidate OAM modes indicated in the second message 220 may include a subset of the candidate OAM modes indicated in the first message 215.

The first device 205-*a* may transmit a third message 230 to the second device 210-*a* based on the second message 220. The third message 230 may be, for example, a directional alignment request message. In some aspects, the third message 230 may include directional alignment information associated with transmitting a signal (e.g., an optical beam, a radio signal, a directional signal associated with one or more beams, an omnidirectional signal). In an example, the directional alignment information may include steering information associated with the signal. In some examples, the steering information may include a wavelength of the signal, a polarization of the signal, a laser mode associated with the signal, or a combination thereof.

Based on the second positional information of the second device 210-*a*, the first device 205-*a* may transmit the signal to the second device 210-*a*. In some aspects, based on the first positional information associated with a first OAM circle center associated with the first device 205-*a* (e.g., as included in the first message 215) and the directional alignment information (e.g., as included in the third message 230), the second device 210-*a* may attempt to align the second OAM circle center associated with the second device 210-*a* with the first OAM circle center associated with the first device 205-*a*. In an example, the second device 210-*a* may rotate the axial direction of OAM circles of the second device 210-*a* towards the position of the first device 205-*a*.

The second device 210-*a* may transmit (and the first device 205-*a* may receive) a fourth message 235 indicating whether the signal was successfully received by the second device 210-*a*. The fourth message 235 may be, for example, a directional alignment response message. In some aspects, the fourth message 235 may include an indication of successful alignment between the first device 205-*a* and the second device 210-*a*. In some examples, the fourth message 235 may include an indication of an unsuccessful alignment between the first device 205-*a* and the second device 210-*a*.

In some aspects, based on a successful alignment between the first device 205-*a* and the second device 210-*a*, the first device 205-*a* and the second device 210-*a* may communicate (e.g., transmit and receive) signaling messages and data transmissions according to a set of OAM modes. For example, the first device 205-*a* may transmit, via the OAM mode (e.g., OAM mode 0) used for communicating the first message 215 through the fourth message 235, a configuration message (e.g., a PDSCH configuration message) for one or more downlink channel transmissions (e.g., PDSCH transmissions). In some aspects, the configuration message (e.g., PDSCH configuration message) may indicate a set of configured OAM modes (e.g., multiple OAM modes) for the one or more downlink channel transmissions (e.g., PDSCH transmissions).

Figure 6:
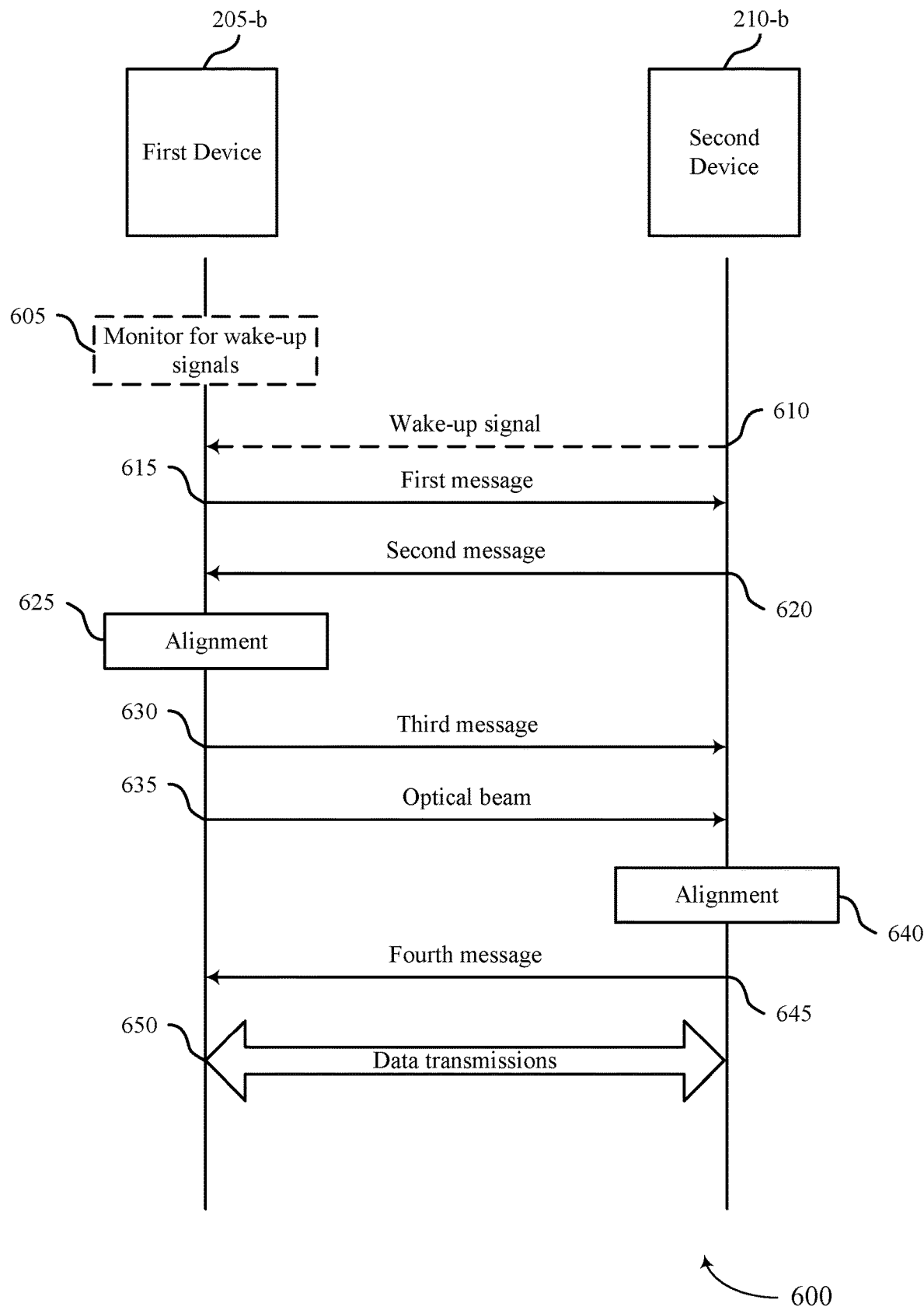
FIG. 6 illustrates an example of a process flow that supports connection setup in OAM-based communication system in accordance with aspects of the present disclosure.
Figure 7:
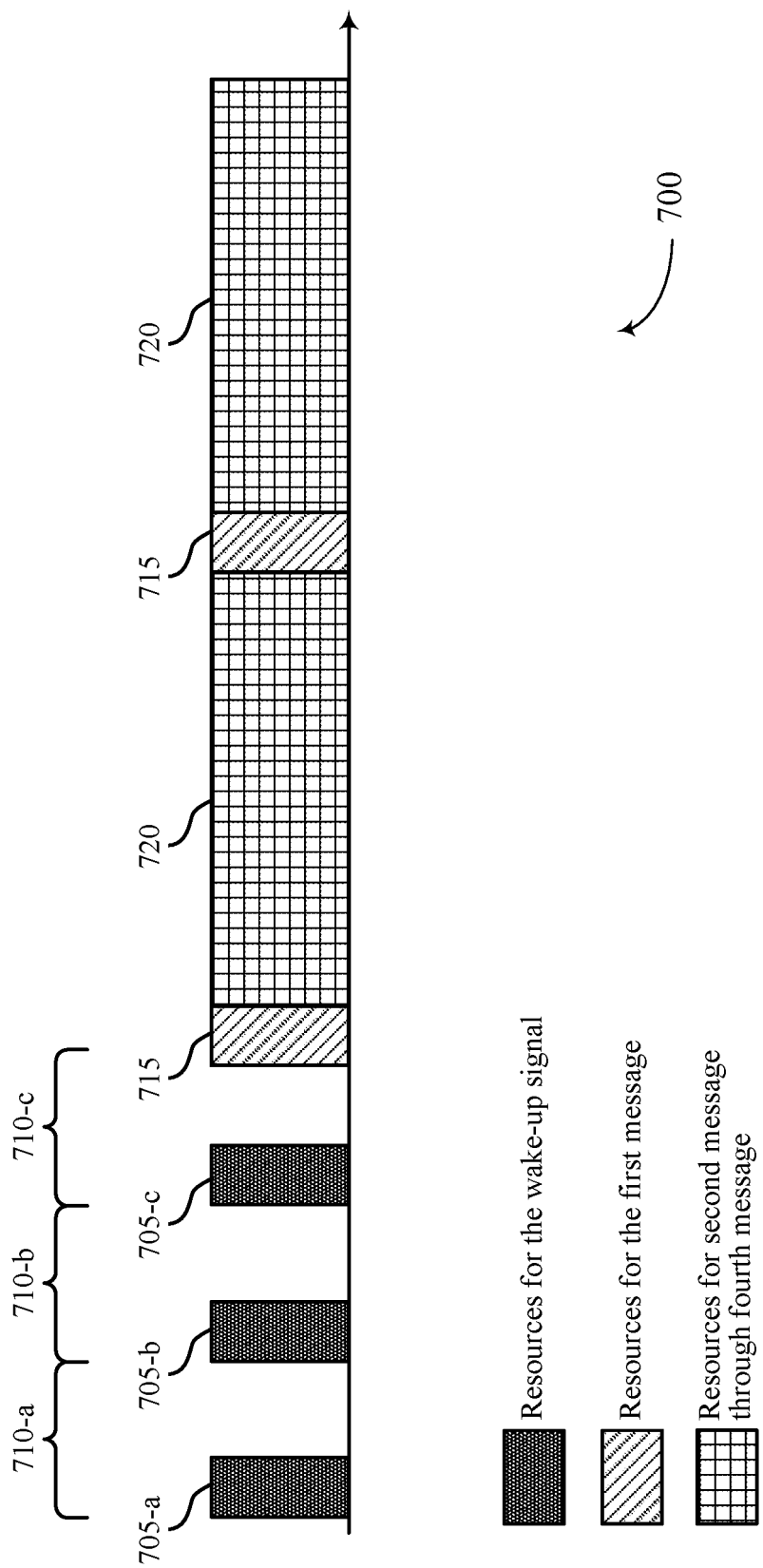
FIG. 7 illustrates an example of an example of a frame structure and wake-up signaling that supports connection setup in OAM-based communication system in accordance with aspects of the present disclosure.

Examples of aspects of the message exchanges between the first device and the second device and contents of the messages are described herein, for instance with reference to FIGS. 6 and 7.

Although the present example describes first device 205-*a* transmitting the first message 215 and the third message 230 and second device 210-*a* transmitting the second message 220 and the fourth message 235 there may be examples where first device 205-*a* transmits the first message 215 and the third message 230 to second device 210-*a*. Additionally or alternatively, there may be examples where second device 210-*a* transmits the second message 220 and the fourth message 235 to first device 205-*a*.

Figure 3:
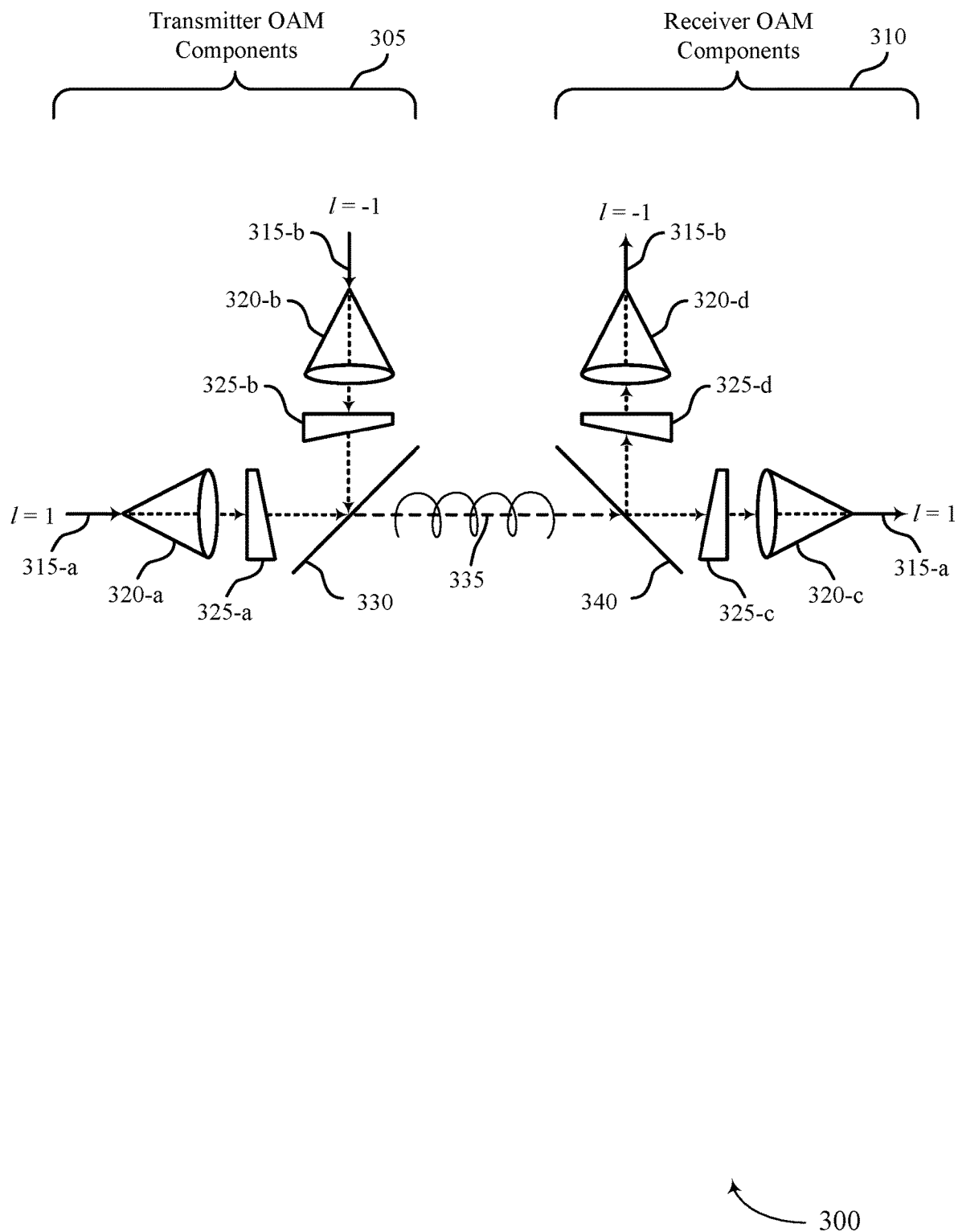
FIG. 3 illustrates an example of a spiral phase plate orbital angular momentum configuration that supports connection setup in OAM-based communication system in accordance with aspects of the present disclosure.

FIG. 3 illustrates an example of an SPP OAM configuration 300 that supports connection setup in an OAM-based communication system in accordance with aspects of the present disclosure. In some examples, SPP OAM configuration 300 may implement aspects of wireless communications system 100 or 200. In this example, a transmitting device (e.g., UE or network entity) may include transmitter OAM components 305 and a receiving device (e.g., UE or network entity) may include receiver OAM components 310.

In cases in which the wireless devices use an SPP methodology, the transmitting device may convert an electromagnetic wave 315 associated with an OAM mode index l=0 (e.g., a non-helical electromagnetic wave associated with mode-zero OAM) into an electromagnetic wave associated with an OAM mode index l≠0 (e.g., a helical electromagnetic wave associated with non-zero OAM mode) based on passing the electromagnetic wave through an aperture 320 and an SPP 325. Such an SPP 325 may be associated with geometric constraints and may be able to generate an electromagnetic wave associated with a single OAM mode. Thus, the wireless device may use one SPP 325 to generate one OAM mode of an OAM beam 335. As such, a wireless device may implement a different SPP 325 for each OAM mode of an OAM beam 335.

The example of FIG. 3 illustrates the use of two OAM modes (e.g., l=+1 and −1). In the transmitter OAM components, a first electromagnetic wave 315-*a* may be provided to a first aperture 320-*a* and a first SPP 325-*a* (also referred to herein as a transmitter aperture and a transmitter SPP), and a second electromagnetic wave 315-*b* may be provided to a second aperture 320-*b* and a second SPP 325-*b* (also referred to herein as a transmitter aperture and a transmitter SPP). A beam splitter/combiner 330 may combine the output of the first SPP 325-*a* and the second SPP 325-*b* to generate OAM beam 335. The receiver OAM components 310 may receive the OAM beam 335 at a beam splitter/combiner 340, which may provide instances of the OAM beam 335 to a third SPP 325-*c* and a fourth SPP 325-*d* (also referred to herein a receiver SPPs). The third SPP 325-*c* and the fourth SPP 325-*d* may provide output to a first receiver aperture 320-*c* and a second receiver aperture 320-*d* (also referred to herein as a receiver apertures), respectively.

The third SPP 325-*c* may have geometric constraints corresponding to the first SPP 325-*a* and thus the output of the first receiver aperture 320-*c* may correspond to the first electromagnetic wave 315-*a* (e.g., for OAM Mode l=1). Likewise, the fourth SPP 325-*d* may have geometric constraints corresponding to the second SPP 325-*b* and thus the output of the second receiver aperture 320-*d* may correspond to the second electromagnetic wave 315-*b* (e.g., for OAM Mode l=2). In devices that use SPP methodology, separate SPPs 325 may be used for each OAM mode, and the number of usable OAM modes may correspond to the number of SPPs 325 at a device. As discussed, wireless devices may also use a UCA methodology for OAM communications, an example of which is discussed with reference to FIG. 4.

FIG. 4 illustrates an example of a UCA OAM configuration 400 that supports connection setup in an OAM-based communication system in accordance with aspects of the present disclosure. In some examples, UCA OAM configuration 400 may implement aspects of wireless communications system 100 or 200. In this example, a transmitting device (e.g., UE or network entity) may include OAM transmitter UCA antennas 405 and a receiving device (e.g., UE or network entity) may include OAM receiver UCA antennas 410.

In some aspects, one or both of the OAM transmitter UCA antennas 405 or the OAM receiver UCA antennas 410 may be implemented as a planar array of antenna elements which may be an example of or otherwise function as a (massive or holographic) MIMO array or an intelligent surface. In some cases, the transmitting device may identify a set of antenna elements 415 of the planar array that form a transmitter UCA, and a receiving device may identify a set of antenna elements 445 of the planar array that form a receiver UCA.

Upon selecting the set of antenna elements from the planar array, the OAM transmitter may apply a weight 435 to each of the selected antenna elements 415 based on the OAM mode index l of the transmitted OAM beam and one or more spatial parameters associated with each antenna element. In cases in which UCA methodology is used to generate an OAM beam, the transmitting device may identify the set of antenna elements 415 on a circular array of antenna elements and may load a first set of weights 420 to each of the identified antenna elements based on a first OAM mode index (e.g., l=0). Further, for other OAM mode indices, other weights may be used for the set of antenna elements 415, such as a second OAM mode index (e.g., l=+1) that may use a second set of weights 425 and a third OAM mode index (e.g., l=−1) that may use a third set of weights 430.

For example, to generate an OAM beam with an OAM mode index (e.g., l=0), the OAM transmitter may load a weight 435 to each antenna element 415 on the UCA based on an angle 440 measured between a reference line on the UCA (e.g., the x-axis of the plane on which the UCA is located, where the origin is at the center of the UCA) and the antenna element, the OAM mode index l, and i (e.g., for complex-valued weights, which may alternatively be denoted as j in some cases). In some cases, for instance, the weight for an antenna element n may be proportional to $e^{i*l*\varphi_n}$, where $\varphi_n$ is equal to the angle 440 measured between the reference line on the UCA and the antenna element n. By multiplying respective beamforming weights 435 of each set of weights 420 through 430 (e.g., for the first set of weights 420, $w_1[w_{1,1}, w_{1,2}, \ldots, w_{1,8}]^T$) onto each antenna, a signal port (also referred to herein as an OAM-formed port) may be generated. If the weight 435 of each antenna element 415 is equal to $e^{i\varphi l}$, where $\varphi$ is the angle of antenna element 415 in the circle (e.g., angle 440 for antenna element 415-*g*), and l is the OAM mode index, then each set of weights 420 through 430 provides a beamformed port that is equivalent OAM mode l. By using different beamforming weights $e^{i\varphi l'}$, where l'≠l, multiple OAM modes may be generated.

At the OAM receiver UCA antennas 410, the receiving device may include antenna elements 445 (also referred to herein as receive antenna elements) equipped in a circle. The channel matrix may be denoted from each transmit antenna to each receive antenna as H, and for the beamformed channel matrix $\tilde{H}=H\cdot[w_1, w_2, \ldots, w_L]$, any two columns of H are orthogonal which means the beamformed ports have no crosstalk.

Accordingly, OAM-based communication may realize a high-level spatial multiplexing degree efficiently. Further, the eigen-based transmit precoding weights and receive combining weights of UCA-based OAM are constantly equal to a discrete Fourier transform (DFT) matrix, which is irrelevant to communication parameters (e.g., distance, aperture size and carrier frequency), and thus UCA-based OAM may be implemented at relatively low cost.

In some systems, for single-circle UCA-based OAM performance, performance parameters such as OAM multiplexing degree and throughput may be based on parameter settings associated with the UCA, such as a radius of a UCA and an operating frequency. For example, a larger radius may support a relatively higher OAM multiplexing degree. In some examples, a higher operating frequency may support a relatively higher OAM multiplexing degree. In some cases, parameter settings such as a relatively large radius and high frequency may support a relatively large number of concurrent OAM modes (e.g., multiple tens).

Figure 5:
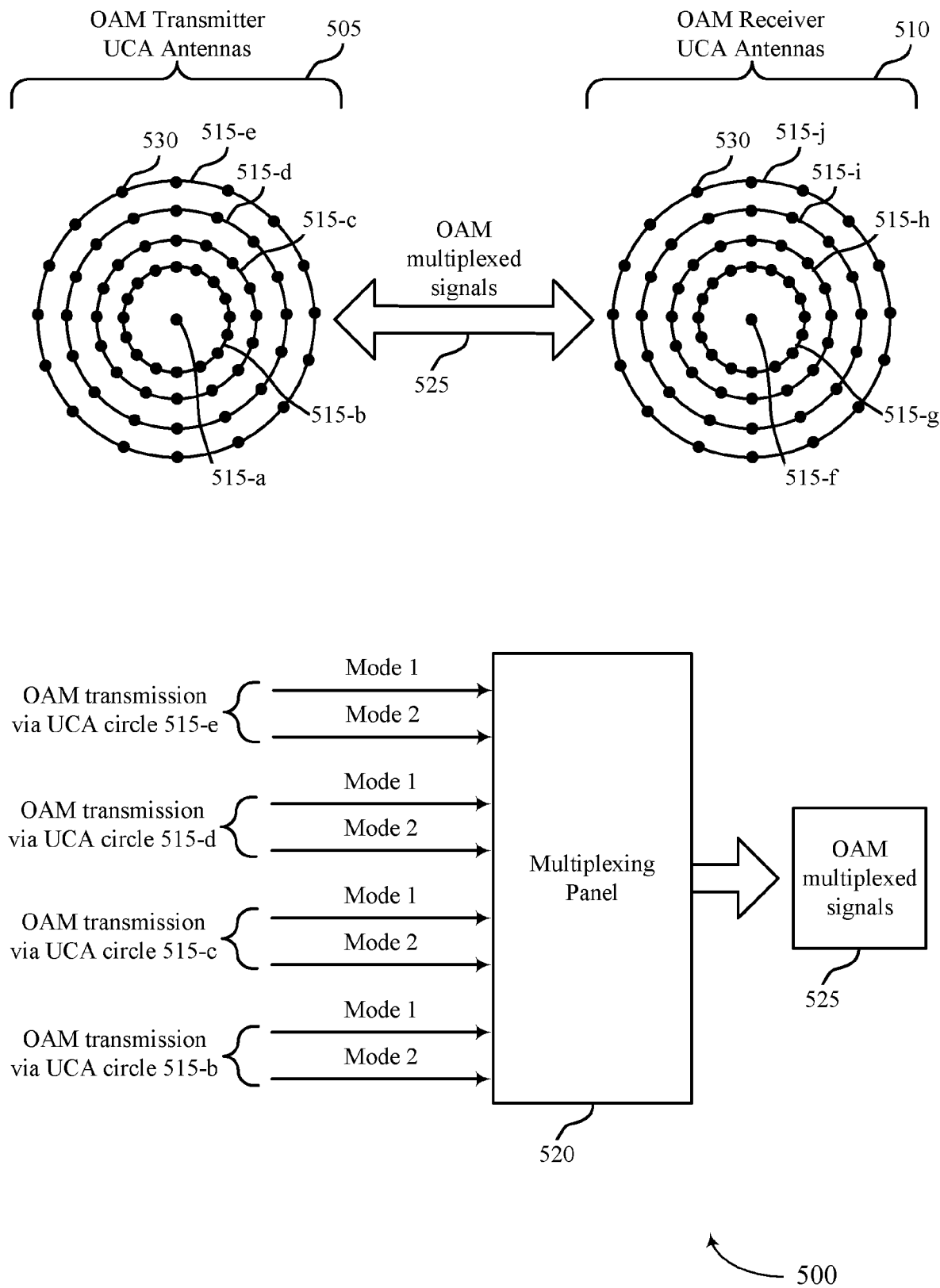
FIG. 5 illustrates an example of a multi-circle uniform circular array-based orbital angular momentum configuration that supports connection setup in OAM-based communication system in accordance with aspects of the present disclosure.

FIG. 5 illustrates an example of a multi-circle UCA-based OAM configuration 500 that supports connection setup in an OAM-based communication system in accordance with aspects of the present disclosure. In some examples, multi-circle UCA-based OAM configuration 500 may implement aspects of wireless communications system 100 or 200. In this example, a transmitting device (e.g., UE, network entity, a first device) may include OAM transmitter UCA antennas 505 and a receiving device (e.g., UE, network entity, a second device) may include OAM receiver UCA antennas 510.

As described with reference to FIG. 4, device may be configured with a UCA antenna to realize OAM-based communications. In some implementations, a device may be configured with multiple UCA antenna circles 515 (also referred to herein as UCA circles 515). For example, a transmitting device and a receiving device may each be configured with multiple co-axis UCA antenna circles 515 (also referred to herein as UCA circles 515). A transmitting device may be configured with OAM transmitter UCA antennas 505 and a receiving device may be configured with OAM receiver UCA antennas 510. A transmitting device and a receiving device may be configured with the same number of UCA circles 515, or a different number of UCA circles. In the example depicted by FIG. 5, a transmitting device and a receiving device may each be configured with five antenna circles, where each antenna circle may include one or more antenna elements 530. Each UCA circle 515 may include any number of antenna elements 530.

Further a device may be configured with UCA circles 515 (e.g., UCA circles 515-*a* through 515-*e*) at a transmitter of the device, and the same device may be configured with UCA circles 515 (e.g., UCA circles 515-*f* through 515-*j*) at a receiver of the device. For example, a transmitting device (e.g., first device 205-*a* or second device 210-*a* as described with reference to FIG. 2) may be configured with UCA circles 515-*a*, 515-*b*, 515-*c*, 515-*d*, and 515-*e* (also referred to herein as downlink transmitter circles of the transmitting device), and the receiving device (e.g., first device 205-*a* or second device 210-*a* as described with reference to FIG. 2) may be configured with UCA circles 515-*f* through 515-*j* (also referred to herein as downlink receiver circles of the receiving device) at a receiver of the receiving device. In some examples, UCA circles 515-*a*, 515-*b*, 515-*c*, 515-*d*, and 515-*e* may be configured to receive transmissions (e.g., uplink transmissions), and UCA circles 515-*f* through 515-*j* may be configured to transmit transmissions (e.g., uplink transmissions).

For example, a transmitting device may be configured with UCA circles 515-*a*, 515-*b*, 515-*c*, 515-*d*, and 515-*e* (also referred to herein as downlink transmitter circles), where the number of antenna elements 530 included on each UCA circle 515 may be the same, different, or partially the same. In some examples, the receiving device may be configured with UCA circles 515-*f*, 515-*g*, 515-*h*, 515-*i*, and 515-*j* (also referred to herein as downlink receiver circles), where the number of antenna elements 530 included on each of the UCA circles 515-*f*, 515-*g*, 515-*h*, 515-*i*, and 515-*j* may be the same, different, or partially the same.

For example, all UCA circles 515 may include the same number of antenna elements 530, or each UCA circle 515 may include a different number of antenna elements 530, or a subset of the UCA circles 515 may include the same number of antenna elements 530. In some cases, the number of antenna elements 530 included on each UCA circle 515 may be based on the radius of the UCA circle 515. Each of the UCA circles 515 that a device is configured with may have the same radius, or different radii, or some may be the same and some may be different. The UCA circles 515 a device is configured with may be configured in any orientation. For example, the UCA circles may each have a different radius and be interlaid, such that one UCA circle 515 sits inside another UCA circle 515, and so on, as depicted in FIG. 5.

In some cases, intra-circle OAM transmissions (e.g., OAM signals, OAM streams) may be orthogonal to each other, such that OAM transmissions from the same UCA circle 515 may not interfere with one another. As such, OAM transmissions from the same UCA circle 515 of different OAM states or modes may be multiplexed together to increase the capacity of an OAM link. In some cases, inter-circle OAM transmissions (e.g., OAM signals, OAM streams) may be orthogonal with different OAM modes, such that OAM transmissions from different UCA circles 515 transmitted according to different OAM modes may be orthogonal to one another. Inter-circle OAM transmissions may be non-orthogonal with OAM transmissions of the same OAM mode, such that OAM transmissions from different UCA circles 515 transmitted according to the same OAM mode may be non-orthogonal to one other (e.g., cause interference to another other, cause cross-talk). For each OAM mode, inter-circle interference may exist where the OAM transmissions stream from one UCA circle 515 is mutually interfered with the OAM transmission stream transmitted from another UCA circle 515, where the two OAM transmission streams have the same OAM mode.

For example, multiple OAM transmissions may be transmitted from each UCA circle 515, where the intra-circle transmissions may be multiplexed if the intra-circle transmissions are associated with different modes. For example, a transmitting device may transmit a first OAM transmission according to OAM mode 1 via UCA circle 515-e, and a second OAM transmission according to OAM mode 2 via UCA circle 515-e. The transmitting device may transmit a third OAM transmission according to OAM mode 1 via UCA circle 515-d, a fourth OAM transmission according to OAM mode 2 via UCA circle 515-d, a fifth OAM transmission according to OAM mode 1 via UCA circle 515-c, a sixth OAM transmission according to OAM mode 2 via UCA circle 515-c, a seventh OAM transmission according to OAM mode 1 via UCA circle 515-b, and an eighth OAM transmission according to OAM mode 2 via UCA circle 515-b. The transmitting device may transmit one or more OAM transmissions according to one or more OAM modes via UCA circle 515-a.

In some aspects, the transmitting device may transmit an OAM transmission according to an OAM mode 0, for example, by using the same weight (e.g., a weight of one) for all antenna elements 530 of a UCA circle 515 (e.g., UCA circle 515-b) of the transmitting device. In some other aspects, the transmitting device may transmit an OAM transmission according to OAM mode 0 by using the same weight (e.g., a weight of one) for all antenna elements 530 of multiple UCA circles (e.g., UCA circle 515-b and UCA circle 515-c) of the transmitting device.

In some aspects, the transmitting device may transmit an OAM transmission according to OAM mode 0 (also referred to herein as OAM order 0) via the center antenna (e.g., UCA circle 515-a) of the transmitting device. In some aspects, the transmitting device may generate a signal of OAM mode 0 via any of the UCA circles 515 (e.g., UCA circle 515-b through UCA circle 515-e).

In some examples, multiple OAM transmissions may be received by each UCA circle 515, where the intra-circle transmissions may be demultiplexed if the intra-circle transmissions are associated with different modes. For example, a receiving device may receive a first OAM transmission according to OAM mode 1 via UCA circle 515-j, and a second OAM transmission according to OAM mode 2 via UCA circle 515-j. The receiving device may receive a third OAM transmission according to OAM mode 1 via UCA circle 515-i, a fourth OAM transmission according to OAM mode 2 via UCA circle 515-i, a fifth OAM transmission according to OAM mode 1 via UCA circle 515-h, a sixth OAM transmission according to OAM mode 2 via UCA circle 515-h, a seventh OAM transmission according to OAM mode 1 via UCA circle 515-g, and an eighth OAM transmission according to OAM mode 2 via UCA circle 515-g. The receiving device may receive one or more OAM transmissions according to one or more OAM modes (e.g., the null mode, mode 0) via UCA circle 515-f.

In some aspects, the receiving device may receive an OAM transmission according to OAM mode 0, for example, by using the same weight (e.g., a weight of one) for all antenna elements 530 of a UCA circle 515 (e.g., UCA circle 515-g) of the receiving device. In some other aspects, the receiving device may receive an OAM transmission according to OAM mode 0 by using the same weight (e.g., a weight of one) for all antenna elements 530 of multiple UCA circles (e.g., UCA circle 515-g and UCA circle 515-h) of the receiving device.

In some aspects, the receiving device may receive an OAM transmission according to OAM mode 0 (also referred to herein as OAM order 0) via the center antenna (e.g., UCA circle 515-f) of the receiving device. In some other aspects, the receiving device may receive a signal of OAM mode 0 via any of the UCA circles 515 (e.g., UCA circle 515-f through UCA circle 515-j).

As described herein, intra-circle OAM transmissions may be orthogonal. As such, the first and second OAM transmissions may be orthogonal to one another, and may, in some cases, be multiplexed. Similarly, the third and fourth transmissions may be orthogonal to one another, the fifth and sixth transmissions may be orthogonal to one another, and the seventh and the eighth transmission may be orthogonal to one another. Further, as described herein, inter-circle OAM transmissions transmitted via different OAM mode may be orthogonal. As such, the first transmission may be orthogonal with the fourth transmission, the sixth transmission, and the eight transmission, for example. Further, as described herein, inter-circle OAM transmissions transmitted via the same OAM mode may be non-orthogonal. As such, the first transmission may be non-orthogonal with the third transmission, the fifth transmission, and the seventh transmission, for example.

In some cases, a transmitting device may transmit the first transmission through the eighth transmissions, as described herein, simultaneously. As such, the first transmission through the eighth transmission may be transmitted via a multi-circle UCA panel, such as multiplexing panel 520 that may multiplex one or more of the transmissions into OAM multiplexed signals 525. For example, the intra-circle transmission may be multiplexed with each other, such as the first transmission and the second transmission. In another example, each of the first transmission through the eighth transmission may be multiplexed using different UCA circles or OAM modes. The transmitting device may transmit the one or more OAM multiplexed signals 525 to a receiving device, where the OAM receiver UCA antennas 510 of the receiving device may spread the one or more OAM multiplexed signals.

Further, although shown in the example depicted in FIG. 5 as two modes (a first and a second mode) being transmitted by each UCA circle 515, each UCA circle 515 may transmit any number of OAM transmissions according to any number of OAM modes. The number of OAM transmissions from each UCA circle 515 may be the same, different, or partially the same, such that all UCA circles 515 at a device may transmit the same number of transmissions, a different number of transmissions, or some UCA circles 515 may transmit the same number of transmissions while other UCA circles may transmit a different number of transmissions. Further, although each device is depicted in FIG. 5 as being configured with 5 UCA circles 515, a device may be configured with any number of UCA circles 515.

In some cases, as inter-circle OAM transmissions of the same mode may interfere with one another, a transmitting device may be configured to transmit a particular mode via a particular UCA circle 515 so as to mitigate interference caused by inter-circle OAM transmissions of the same mode. A transmitting device, or a receiving device, or both may be configured to determine a transmission scheme for the transmitting device that indicates which UCA circle 515 should be used to transmit which OAM mode. In some implementations, the channel gains of OAM transmission streams may be different from each UCA circle 515 for each OAM mode for a set of parameters. The parameters may include system parameters such as a communication distance between a transmitting device and a receiving device, the radius of each transmitter UCA circle 515, the radius of each receiver UCA circle 515, carrier frequency, number of antenna elements 530 in each UCA circle 515. For example, for a set of system parameters (in which the parameters are held constant), an OAM mode of 2 or –2 may have a largest channel gain when transmitted via a UCA transmitter circle radius of 0.8 meters. In another example, for the same set of system parameters, an OAM mode of 1 or –1 may have a largest channel gain when transmitted via a UCA transmitter circle radius of 0.6 meters. In another example, for the same set of system parameters, an OAM mode of 0 may have a largest channel gain when transmitted via a UCA transmitter circle radius of 0.2 meters. Therefore, to achieve high data throughput, a transmitting device may be configured to transmit an OAM transmission via an OAM mode-UCA circle pairing that results in a large (or largest) channel gain.

As described with reference to FIGS. 2 and 6, a transmitting device and a receiving device may establish an OAM communications connection by exchanging messages over communications links (e.g., communications link 225-a and a communications link 225-b as described with reference to FIG. 2) according to any OAM mode. In an example, the transmitting device and the receiving device may exchange messages using OAM mode 0, where OAM mode 0 may correspond to a UCA circle 515. In some cases, when transmitting signals based on a configured set of system parameters, a signal transmitted using OAM mode 0 may have the relatively smallest power dispersion with respect to wireless propagation of the signal, for example, compared to signals that are transmitted using other OAM modes (e.g., OAM mode 1, OAM mode 2, etc.).

Based on establishing the OAM communications connection using the OAM mode 0, the transmitting device and the receiving device may communicate one or more data transmissions according to a set of OAM modes (e.g., where the OAM modes correspond to respective a UCA circle 515).

FIG. 6 illustrates an example of a process flow 600 that supports connection setup in an OAM-based communication system in accordance with aspects of the present disclosure. The process flow 600 may illustrate an example message and signal exchange supportive of establishing an OAM communications connection according to aspects of the present disclosure.

The first device 205-b and the second device 210-b may be examples of the corresponding devices (e.g., wireless devices) described with reference to FIGS. 1 through 5, where the first device 205-b and the second device 210-b may be the same device or may be different devices. The first device 205-b and the second device 210-b may each be a UE, a network entity, an IAB node, etc. Alternative examples of the following may be implemented, where some steps are performed in a different order than described or are not performed at all. In some cases, steps may include additional features not mentioned below, or further steps may be added.

According to example aspects of the present disclosure, the first device 205-b and the second device 210-b may establish an OAM communications connection between the first device 205-b and the second device 210-b. For example, the first device 205-b and the second device 210-b may exchange messages (e.g., four messages) over an uplink communications link (e.g., communications link 225-a described with reference to FIG. 2) and a downlink communications link (e.g., a communications link 225-b described with reference to FIG. 2) according to an OAM mode (e.g., OAM mode 0). Based on OAM related parameters or OAM related information included in the messages, the first device 205-b and the second device 210-b may achieve a successful directional alignment (co-axial alignment) between the first device 205-b and the second device 210-b. The first device 205-b and the second device 210-b may determine one or more OAM modes (e.g., OAM mode 1, 2, etc.) for communication between the first device 205-b and the second device 210-b based on the establishing the directional alignment.

At 605, the first device 205-b may monitor for wake-up signals over a set of resources allocated for wake-up signals. In some examples, the first device 205-b may monitor for the wake-up signal via an OAM mode (e.g., OAM mode 0). For example, the first device 205-b may enter a standby or sleep state to maintain low power consumption, and the first device 205-b may exit the standby or sleep state based on receiving a wake-up signal from the second device 210-b. In some aspects, the first device 205-b may monitor for wake-up signals over a set of time and frequency resources allocated for transmitting and receiving wake-up signals. Example aspects of the wake-up signal are described with reference to FIG. 7.

At 610, the first device 205-b may receive a wake-up signal from the second device 210-b via the OAM mode (e.g., OAM mode 0). In some aspects, the first device 205-b may receive the wake-up signal via an uplink communications link.

At 615, the first device 205-b may transmit a first message to the second device 210-b via the OAM mode (e.g., OAM mode 0). The first message may be, for example, a system information and synchronization message. In an example, the first device 205-b may transmit the first message to the second device 210-b via a downlink communications link.

The first message may include a synchronization signal. In some cases, the synchronization signal may be a timing synchronization signal. For example, based on the synchronization signal, the first device 205-b and the second device 210-b may synchronize timing for exchanging of subsequent messages (e.g., second through fourth messages described herein) between the first device 205-b and the second device 210-b.

In some aspects, the first message may include first positional information associated with downlink transmissions by the first device 205-b. In an example, the first positional information may include GPS positioning information or GNSS positioning information associated with the first device 205-b. In some examples, the first positional information may include an OAM circle center (e.g., UCA circle 515-*a* described with reference to FIG. 5) of the first device 205-*b*. In some aspects, the OAM circle center (e.g., UCA circle 515-*a* described with reference to FIG. 5) of the first device 205-*b* may be for transmitting the first message, and the OAM circle center may be referred to as a transmitter OAM circle center of the first device 205-*b*. In some aspects, the first positional information may include direction information associated with the OAM circle center of the first device 205-*b*.

In some other aspects, the first positional information included in the first message may include positional information of the first device 205-*b*.

In an example, the first positional information included in the first message may include an OAM circle center of the first device 205-*b* (e.g., UCA circle 515-*a* or UCA circle 515-*f* described with reference to FIG. 5) for transmission or reception by the first device 205-*b*. In some aspects, the first positional information may include direction information associated with the OAM circle center of the first device 205-*b*. In some cases, the first positional information included in the first message may include a request for positional information of the second device 210-*b*. For example, the requested positional information of the second device 210-*b* may include an OAM circle center (e.g., UCA circle 515-*a* or UCA circle 515-*f* described with reference to FIG. 5) of the second device 210-*b*. In some aspects, the requested positional information of the second device 210-*b* may include direction information associated with the OAM circle center of the second device 210-*b*.

In some examples, the first message may include a set (or list) of OAM parameters associated with transmissions (e.g., downlink transmissions) by the first device 205-*b*. For example, the OAM parameters may include a list of candidate OAM modes associated with the first device 205-*b*. The candidate OAM modes may correspond to, for example, UCA circles (e.g., UCA circles 515-*b* through 515-*e* described with reference to FIG. 5) of the first device 205-*b*.

In some examples, the OAM parameters may include a quantity of downlink transmitter circles associated with the first device 205-*b*. For example, the OAM parameters may indicate a quantity of four downlink transmitter circles (e.g., UCA circles 515-*b* through 515-*e* described with reference to FIG. 5) of the first device 205-*b*. In some aspects, the OAM parameters may indicate a radius associated with each of the downlink transmitter circles (e.g., UCA circles 515-*b* through 515-*e* described with reference to FIG. 5). In some other aspects, the OAM parameters may include a quantity of antenna elements (e.g., antenna elements 530) associated with each of the downlink transmitter circles.

In some examples, the OAM parameters may include a quantity of OAM modes simultaneously used for each of the downlink transmitter circles (e.g., UCA circles 515-*b* through 515-*e* described with reference to FIG. 5) of the first device 205-*b*. For example, the OAM parameters may indicate that the first device 205-*b* supports transmitting (or has transmitted) a first quantity of OAM modes simultaneously via a first UCA circle (e.g., UCA circle 515-*e* as described with reference to FIG. 5) and a second quantity of OAM modes simultaneously via a second UCA circle (e.g., UCA circle 515-*e* as described with reference to FIG. 5).

In some examples, the OAM parameters may include a quantity of uplink receiver circles associated with the first device 205-*b*. For example, the OAM parameters may indicate a quantity of four uplink receiver circles (e.g., UCA circles 515-*f* through 515-*j* described with reference to FIG. 5) of the first device 205-*b*. In some aspects, the OAM parameters may indicate a radius associated with each of the uplink receiver circles. In some other aspects, the OAM parameters may include a quantity of antenna elements (e.g., antenna elements 530) associated with each of the uplink receiver circles.

In some examples, the OAM parameters may include a quantity of OAM modes simultaneously used for each of the uplink receiver circles (e.g., UCA circles 515-*f* through 515-*j* described with reference to FIG. 5) of the first device 205-*b*. For example, the OAM parameters may indicate that the first device 205-*b* supports receiving a first quantity of OAM modes simultaneously via a first UCA circle (e.g., UCA circle 515-*f* as described with reference to FIG. 5) and a second quantity of OAM modes simultaneously via a second UCA circle (e.g., UCA circle 515-*g* as described with reference to FIG. 5).

In some aspects, the first device 205-*b* may transmit the first message to the second device 210-*b* based on (e.g., in response to) receiving the wake-up signal from the second device 210-*b*. For example, the first device 205-*b* may refrain from procedures for establishing an OAM communications link with the second device 210-*b* (e.g., refrain from exchanging messages over the uplink communications link and the downlink communications link) until the first device 205-*b* receives a wake-up signal. Additionally, or alternatively, the first device 205-*b* may the transmit first message to the second device 210-*b* independent of monitoring for (or receiving) a wake-up signal from the second device 210-*b*.

In some aspects, the first device 205-*b* may transmit the first message according to a set of parameters associated with transmitting the first message. In an example, the parameters may include a periodicity or interval for transmitting the first message, and the first device 205-*b* may transmit the first message periodically based on the periodicity or interval. In some examples, the first device 205-*b* may transmit the first message over a set of time and frequency resources (e.g., radio resources) allocated for transmitting the message.

Additionally, or alternatively, the first message may indicate a set of time and frequency resources for communicating additional (e.g., subsequent) messages between the first device 205-*b* and the second device 210-*b*. For example, the first message may indicate a set of time and frequency resources for communicating any one or more of a second message, a third message, or a fourth message between the first device 205-*b* and the second device 210-*b* as described herein. Example aspects of the periodicity and resources associated with transmitting the first message, and examples of resources indicated by the first message, are described with reference to FIG. 7.

In some aspects, the first device 205-*b* may transmit the first message using a center radiator of one or more transmitter circles (e.g., UCA circles) of the first device 205-*b*. For example, the first device 205-*b* may transmit the first message using a center antenna (e.g., UCA circle 515-*a* described with reference to FIG. 5) of the first device 205-*b*. In some aspects, the first device 205-*b* may transmit the first message using a quantity of radiators of one or more transmitter circles (e.g., UCA circles) of the first device 205-*b*. For example, the first device 205-*b* may transmit the first message using each of the antennas (e.g., each of the antennas in one or more of UCA circle 515-*b* through 515-*e* described with reference to FIG. 5) of the first device 205-*b*.

At 620, the first device 205-*b* may receive a second message from the second device 210-*b*, via the OAM mode (e.g., OAM mode 0). The second message may be, for example, a connection request message. In some aspects, the second device 210-*b* may transmit (and the first device 205-*b* may receive) the second message in response to the first message. In an example, the second device 210-*b* may transmit the second message to the first device 205-*b* via an uplink communications link (e.g., communications link 225-*a* described with reference to FIG. 2).

In some aspects, the second message may include second positional information associated with uplink transmissions by the second device 210-*b*. In an example, the second positional information may include GPS positioning information or GNSS positioning information associated with the second device 210-*b*. In some examples, the second positional information may include an OAM circle center of the second device 210-*b* (e.g., UCA circle 515-*a* described with reference to FIG. 5) for transmission by the second device 210-*b*. In some aspects, the OAM circle center (e.g., UCA circle 515-*a* described with reference to FIG. 5) of the second device 210-*b* may be for transmitting the second message, and the OAM circle center may be referred to as a transmitter OAM circle center of the second device 210-*b*. In some aspects, the second positional information may include direction information associated with the transmitter OAM circle center of the second device 210-*b*.

In some examples, the second positional information may include an OAM circle center of the second device 210-*b* (e.g., UCA circle 515-*f* described with reference to FIG. 5) for reception by the second device 210-*b*. In some aspects, the OAM circle center (e.g., UCA circle 515-*f* described with reference to FIG. 5) of the second device 210-*b* for receiving transmissions may be referred to as a receiver OAM circle center associated with the second device 210-*b*). In some aspects, the second positional information may include direction information associated with the OAM circle center of the second device 210-*b*. In some aspects, the second positional information may include direction information associated with the receiver OAM circle center of the second device 210-*b*.

In some examples, the second message may include a set (or list) of OAM parameters associated with transmissions or receptions (e.g., uplink transmissions, downlink reception) by the second device 210-*b*. For example, the OAM parameters may include a list of candidate OAM modes associated with the second device 210-*b*. The candidate OAM modes may correspond to, for example, UCA circles (e.g., UCA circles 515-*b* through 515-*e*, described with reference to FIG. 5) of the second device 210-*b*.

In some examples, the OAM parameters may include a quantity of uplink transmitter circles associated with the second device 210-*b*. For example, the OAM parameters may indicate a quantity of four uplink transmitter circles (e.g., UCA circles 515-*b* through 515-*e* described with reference to FIG. 5) of the second device 210-*b*. In some aspects, the OAM parameters may indicate a radius associated with each of the uplink transmitter circles (e.g., UCA circles 515-*b* through 515-*e* described with reference to FIG. 5). In some other aspects, the OAM parameters may include a quantity of antenna elements (e.g., antenna elements 530) associated with each of the uplink transmitter circles.

In some examples, the OAM parameters may include a quantity of OAM modes simultaneously used for each of the uplink transmitter circles (e.g., UCA circles 515-*b* through 515-*e* described with reference to FIG. 5) of the second device 210-*b*. For example, the OAM parameters may indicate that the second device 210-*b* supports transmitting (or has transmitted) a first quantity of OAM modes simultaneously via a first UCA circle (e.g., UCA circle 515-*d* as described with reference to FIG. 5) and a second quantity of OAM modes simultaneously via a second UCA circle (e.g., UCA circle 515-*e* as described with reference to FIG. 5).

In some examples, the OAM parameters may include a quantity of downlink receiver circles associated with the second device 210-*b*. For example, the OAM parameters may indicate a quantity of four downlink receiver circles (e.g., UCA circles 515-*f* through 515-*j* described with reference to FIG. 5) of the second device 210-*b*. In some aspects, the OAM parameters may indicate a radius associated with each of the downlink receiver circles. In some other aspects, the OAM parameters may include a quantity of antenna elements (e.g., antenna elements 530) associated with each of the downlink receiver circles.

In some examples, the OAM parameters may include a quantity of OAM modes simultaneously used for each of the downlink receiver circles (e.g., UCA circles 515-*f* through 515-*j* described with reference to FIG. 5) of the second device 210-*b*. For example, the OAM parameters may indicate that the second device 210-*b* supports receiving a first quantity of OAM modes simultaneously via a first UCA circle (e.g., UCA circle 515-*f* as described with reference to FIG. 5) and a second quantity of OAM modes simultaneously via a second UCA circle (e.g., UCA circle 515-*g* as described with reference to FIG. 5).

In some aspects, the second device 210-*b* may transmit the second message using a center radiator of one or more transmitter circles (e.g., UCA circles) of the second device 210-*b*. For example, the second device 210-*b* may transmit the second message using a center antenna (e.g., UCA circle 515-*a* described with reference to FIG. 5) of the second device 210-*b*. In some aspects, the second device 210 *b* may transmit the second message using a quantity of radiators of one or more transmitter circles (e.g., UCA circles) of the second device 210-*b*. For example, the second device 210 *b* may transmit the second message using each of the antennas (e.g., each of the antennas in one or more of UCA circle 515 *b* through 515 *e* described with reference to FIG. 5) of the second device 210 *b*.

At 625, the first device 205-*b* may align the transmitter OAM circle center associated with the first device 205-*b* (e.g., UCA circle 515-*a* described with reference to FIG. 5) with the receiver OAM circle center associated with the second device 210-*b* (e.g., UCA circle 515-*f* described with reference to FIG. 5). In an example, the first device 205-*b* may align the OAM circle centers based on a combination of the first positional information associated with the transmitter OAM circle center of the first device 205-*b* (e.g., as communicated to the second device 210-*b* using the first message), the receiver OAM circle center of the second device 210-*b* (e.g., as indicated by the second device 210-*b* in the second message), and directional alignment information (e.g., as communicated to the second device 210-*b* in the third message).

In an example, the first device 205-*b* may rotate or position an OAM transmitter of the first device 205-*b* to realize co-axial alignment with an OAM receiver of the second device 210-*b*. For example, the first device 205-*b* may rotate or position UCA antennas of the first device 205-*b* (e.g., UCA circles 515-*a* through 515-*e*) to realize co-axial alignment with one or more UCA antennas of the second device 210-*b* (e.g., UCA circles 515-*f* through 515-*j*). In some aspects, the first device 205-*b* may rotate the axial direction of OAM circles of the first device 205-*b* (e.g., UCA circles 515-*a* through 515*e*) towards the position (coordinates) of the second device 210-*b*. In some aspects, co-axial alignment may include the OAM transmitter of the first device 205-*b* and the OAM receiver of the second device 210-*b* sharing a common axis. In some cases, the common axis may be an axis common to (e.g., intersecting) both the transmitter OAM circle center of the first device 205-*b* (e.g., UCA circle 515-*a* described with reference to FIG. 5) and the receiver OAM circle center of the second device 210-*b* (e.g., UCA circle 515-*f* described with reference to FIG. 5). For example, the common axis may be perpendicular to both a plane associated with the transmitter OAM circles of the first device 205-*b* and a plane associated with the receiver OAM circles of the second device 210-*b*.

At 630, the first device 205-*b* may transmit a third message to the second device 210-*b* based on the second message. The third message may be, for example, a directional alignment request message. In some aspects, the third message may include directional alignment information associated with transmitting a signal (e.g., an optical signal, a radio signal, a directional signal associated with one or more beams, an omnidirectional signal) from the first device 205-*b*. In an example, the directional alignment information may include steering information associated with the signal. In some examples, the steering information may include a wavelength of the signal, a polarization of the signal, a laser mode associated with the signal, or a combination thereof.

In some examples, the first device 205-*b* may transmit the third message using a center radiator of one or more transmitter circles (e.g., UCA circles) of the first device 205-*b*. For example, the first device 205-*b* may transmit the third message using a center antenna (e.g., UCA circle 515-*a* described with reference to FIG. 5) of the first device 205-*b*. In some aspects, the first device 205-*b* may transmit the third message using a quantity of radiators of one or more transmitter circles (e.g., UCA circles) of the first device 205-*b*. For example, the first device 205-*b* may transmit the third message using each of the antennas (e.g., each of the antennas in one or more of UCA circle 515-*b* through 515-*e* described with reference to FIG. 5) of the first device 205-*b*.

At 635, the first device 205-*b* may transmit a signal to the second device 210-*b*. In some aspects, the first device 205-*b* may transmit the signal based on the first positional information of the first device 205-*b*. In some aspects, the first device 205-*b* may transmit the signal based on the second positional information of the second device 210-*b*. For example, the first device 205-*b* may transmit the signal based on the transmitter OAM circle center associated with the first device 205-*b* (e.g., as communicated to the second device 210-*b* using the first message) and the receiver OAM circle center associated with the second device 210-*b* (e.g., as indicated by the second device 210-*b* in the second message).

At 640, the second device 210-*b* may align the receiver OAM circle center associated with the second device 210-*b* (e.g., UCA circle 515-*f* described with reference to FIG. 5) with the transmitter OAM circle center associated with the first device 205-*b* (e.g., UCA circle 515-*a* described with reference to FIG. 5). In an example, the second device 210-*b* may align the OAM circle centers based on a combination of the first positional information associated with the transmitter OAM circle center of the first device 205-*b* (e.g., as communicated to the second device 210-*b* using the first message), the receiver OAM circle center of the second device 210-*b* (e.g., as indicated by the second device 210-*b* in the second message), and the directional alignment information (e.g., as communicated to the second device 210-*b* in the third message).

In an example, the second device 210-*b* may rotate or position an OAM receiver of the second device 210-*b* to realize co-axial alignment with an OAM transmitter of the first device 205-*b*. For example, the second device 210-*b* may rotate or position UCA antennas of the second device 210-*b* (e.g., UCA circles 515-*f* through 515-*j*) to realize co-axial alignment with one or more UCA antennas of the first device 205-*b* (e.g., UCA circles 515-*a* through 515-*e*). In some aspects, the second device 210-*b* may rotate the axial direction of OAM circles of the second device 210-*b* (e.g., UCA circles 515-*f* through 515-*j*) towards the position (coordinates) of the first device 205-*b*. In some aspects, co-axial alignment may include the OAM transmitter of the first device 205-*b* and the OAM receiver of the second device 210-*b* sharing a common axis. In some cases, the common axis may be an axis common to both the transmitter OAM circle center of the first device 205-*b* (e.g., UCA circle 515-*a* described with reference to FIG. 5) and the receiver OAM circle center of the second device 210-*b* (e.g., UCA circle 515-*f* described with reference to FIG. 5).

At 645, the second device 210-*b* may transmit (and the first device 205-*b* may receive) a fourth message indicating whether the signal was successfully received by the second device 210-*b*. The fourth message may be, for example, a directional alignment response message. The second device 210-*b* may transmit the fourth message via the OAM mode (e.g., OAM mode 0). In some aspects, the fourth message may include an indication of successful alignment between the first device 205-*b* and the second device 210-*b*. In some examples, the fourth message may include an indication of an unsuccessful alignment between the first device 205-*b* and the second device 210-*b*.

In some examples, the second device 210-*b* may transmit the fourth message using a center radiator of one or more transmitter circles (e.g., UCA circles) of the second device 210-*b*. For example, the second device 210-*b* may transmit the fourth message using a center antenna (e.g., UCA circle 515-*a* described with reference to FIG. 5) of the second device 210-*b*. In some aspects, the second device 210-*b* may transmit the fourth message using a quantity of radiators of one or more transmitter circles (e.g., UCA circles) of the second device 210-*b*. For example, the second device 210-*b* may transmit the fourth message using each of the antennas (e.g., each of the antennas in one or more of UCA circle 515-*b* through 515-*e* described with reference to FIG. 5) of the second device 210-*b*.

According to example aspects of the present disclosure, the first device 205-*b* and the second device 210-*b* may communicate the first through fourth messages using time-domain multiplexing. In some cases, the first device 205-*b* and the second device 210-*b* may communicate the first through fourth messages using frequency-domain multiplexing. In some other cases, the first device 205-*b* and the second device 210-*b* may communicate the first through fourth messages using spatial-domain multiplexing.

In some cases, the first device 205-*b* and the second device 210-*b* may communicate the first through fourth messages using based on different polarizations (also referred to herein as dimensions), where the polarizations may correspond to SAM of electromagnetic waves. For example, the first device 205-*b* may perform any or all of transmitting the first message, receiving the second message, transmitting the third message, and receiving the fourth message based on a first polarization, a second polarization different from the first polarization, or both. For example, the first polarization or the second polarization may be applied to each transmission element of the first device 205-*b*. In some examples, the first polarization or the second polarization may be applied to one or more downlink transmitter circles of the first device 205-*b* (e.g., UCA circles 515-*a* through 515-*e* as described with reference to FIG. 5). In some aspects, the first polarization or the second polarization may be applied to one or more antenna elements of the first device 205-*b* (e.g., antenna elements 530 as described with reference to FIG. 5).

Although the present example describes first device 205-*b* transmitting the first message, the third message, and the signal and second device 210-*b* transmitting the second message, the fourth message, and, in some examples, the wake-up signal, there may be examples where first device 205-*b* may transmits the second message, the fourth message, and, in some examples, the wake-up signal to second device 210-*a*. Additionally or alternatively, there may be examples where second device 210-*b* transmits the first message, the third message, and the signal to first device 205-*b*.

In some cases, the polarizations may increase the number of different waveforms or signals that can be transmitted or received by a device (e.g., first device 205-*b*, second device 210-*b*). For example, the first device 205-*b* may generate a waveform using one of two polarizations. In another example, the first device 205-*b* may generate a waveform using the other of the two polarizations.

In some aspects, the first polarization of the first device 205-*b* may include a horizontal polarization with respect to a plane of the first device 205-*b*, and the second polarization of the first device 205-*b* may include a vertical polarization with respect to the plane. In some other aspects, the first polarization of the first device 205-*b* may include a first rotation direction (e.g., clockwise rotation direction) associated with a circular polarization with respect to a plane of the first device 205-*b*, and the second polarization of the first device 205-*b* may include a second rotation direction (e.g., counter-clockwise rotation direction) associated with the circular polarization. In some example aspects, the first polarization of the first device 205-*b* may include a first rotation direction (e.g., clockwise rotation direction) associated with an elliptical polarization with respect to a plane of the first device 205-*b*, and the second polarization of the first device 205-*b* may include a second rotation direction (e.g., counter-clockwise rotation direction) associated with the elliptical polarization.

Additionally, or alternatively, the second device 210-*b* may perform any of receiving the first message, transmitting the second message, receiving the third message, and transmitting the fourth message based on a first polarization, a second polarization, or both. In some aspects, the polarizations based on which the first device 205-*b* communicates messages (e.g., the first through fourth messages) and the polarizations based on which the second device 210-*b* communicates messages (e.g., the first through fourth messages) may be the same or different from one another. For example, the first polarization of the first device 205-*b* may be the same as the first polarization of the second device 210-*b*. In some other aspects, the first polarization of the first device 205-*b* may be different from the first polarization of the second device 210-*b*. In another example, the second polarization of the first device 205-*b* may be the same as the second polarization of the second device 210-*b*. In some other aspects, the second polarization of the first device 205-*b* may be different from the second polarization of the second device 210-*b*.

In an example, the first polarization and the second polarization associated with the second device 210-*b* may be applied to each transmission element of the second device 210-*b*. In some examples, the first polarization and the second polarization may be applied to one or more downlink receiver circles of the second device 210-*b* (e.g., UCA circles 515-*f* through 515-*j* as described with reference to FIG. 5). In some aspects, the first polarization and the second polarization may be applied to one or more antenna elements of the second device 210-*b* (e.g., antenna elements 530 as described with reference to FIG. 5).

In some aspects, the first polarization of the second device 210-*b* may include a horizontal polarization with respect to a plane of the second device 210-*b*, and the second polarization of the second device 210-*b* may include a vertical polarization with respect to the plane. In some other aspects, the first polarization of the second device 210-*b* may include a first rotation direction (e.g., clockwise rotation direction) associated with a circular polarization with respect to a plane of the second device 210-*b*, and the second polarization of the second device 210-*b* may include a second rotation direction (e.g., counter-clockwise rotation direction) associated with the circular polarization. In some example aspects, the first polarization of the second device 210-*b* may include a first rotation direction (e.g., clockwise rotation direction) associated with an elliptical polarization with respect to a plane of the second device 210-*b*, and the second polarization of the second device 210-*b* may include a second rotation direction (e.g., counter-clockwise rotation direction) associated with the elliptical polarization.

In some aspects, the different polarizations may be supported by antennas or antenna elements of each device. For example, each antenna of a transmitting device (e.g., first device 205-*b*) may be associated with a respective polarization. In some examples, each antenna of a receiving device (e.g., second device 210-*b*) may be associated with a respective polarization. Any antenna element (e.g., antenna elements 530 as described with reference to FIG. 5) of the first device 205-*b* or the second device 210-*b* may support the generation of linear polarization, circular polarization, or elliptical polarization.

At 645, the first device 205-*b* and the second device 210-*b* may communicate (e.g., transmit and receive) signaling messages and data transmissions according to a set of OAM modes. For example, the first device 205-*b* and the second device 210-*b* may communicate signaling messages and data transmissions using spatial multiplexing with multiple OAM modes. In some aspects, the first device 205-*b* and the second device 210-*b* may communicate signaling messages and data transmissions based on a successful alignment between the first device 205-*b* and the second device 210-*b* (e.g., based on the fourth message indicating a successful alignment). In some examples, the signaling messages and data transmissions may be communicated in one of the different polarizations (e.g., multiple signaling messages or data transmissions may be simultaneously communicated using different polarizations for one or more of the OAM modes).

For example, the first device 205-*b* may transmit, via the OAM mode (e.g., OAM mode 0) used for communicating the first message through the fourth message, a configuration message (e.g., a PDSCH configuration message) for one or more downlink channel transmissions (e.g., PDSCH transmissions). In some aspects, the configuration message (e.g., PDSCH configuration message) may indicate a set of configured OAM modes (e.g., multiple OAM modes, for example, different from OAM mode 0) for the one or more downlink channel transmissions (e.g., PDSCH transmissions).

In some aspects, multiple (e.g., two) polarizations may be applied to any or all of the OAM modes used for communicating the first message through the fourth message (e.g., OAM mode 0) and the OAM modes used for downlink channel transmissions following co-axial alignment. In an example, the polarizations may be implemented by a device (e.g., first device 205-*b*, second device 210-*b*) according to selection-based procedures. For example, the first device 205-*b* may select a first polarization (e.g., horizontal polarization, clockwise rotation direction with respect to a circular polarization) for communicating one or more initial messages (e.g., the first message). In some examples, the first device 205-*b* may select a second polarization (e.g., vertical polarization, counter-clockwise rotation direction with respect to the circular polarization) for communicating subsequent messages (e.g., the second message through the fourth message).

In another example, the polarizations may be implemented by a device (e.g., first device 205-*b*, second device 210-*b*) according to diversity-based procedures. For example, the first device 205-*b* may use both a first polarization (e.g., horizontal polarization, clockwise rotation direction with respect to a circular polarization) and a second polarization (e.g., vertical polarization, counter-clockwise rotation direction with respect to the circular polarization) with transmit-diversity for communicating (e.g., transmitting) the first message and the third message to the second device 210-*b*.

In some other examples, the polarizations may be implemented by a device (e.g., first device 205-*b*, second device 210-*b*) according to 2×2 MIMO techniques. For example, the first device 205-*b* and the second device 210-*b* may each use two antennas to establish up to two data streams between the devices. In some cases, the first device 205-*b* and the second device 210-*b* may use a first polarization (e.g., horizontal polarization, clockwise rotation direction with respect to a circular polarization) for respective antennas (e.g., a first antenna of the first device 205-*b*, a first antenna of the second device 210-*b*) associated with a first data stream. In some aspects, the first device 205-*b* and the second device 210-*b* may use a second polarization (e.g., vertical polarization, counter-clockwise rotation direction with respect to the circular polarization) for respective antennas (e.g., a second antenna of the first device 205-*b*, a second antenna of the second device 210-*b*) associated with a second data stream. In some cases, antennas of a receiving device (e.g., second device 210-*b*) may or may not be completely aligned or isolated from one another.

According to example aspects of the present disclosure, communication between wireless devices (e.g., first device 205-*b*, second device 210-*b*) using a combination of different polarizations and multiple OAM modes as described herein may provide for independent sources of degrees of freedom, as polarization (e.g., SAM) and OAM mode may be considered as two independent properties of electromagnetic waves. In some cases, using a combination of different polarizations and multiple OAM modes may support an increased number (e.g., double) of data streams in OAM-based communications in MIMO compared to OAM-based communications that do not exploit polarization.

FIG. 7 illustrates an example 700 of a frame structure and wake-up signaling that supports connection setup in an OAM-based communications system in accordance with aspects of the present disclosure. In some examples, the frame structure and wake-up signaling of UCA OAM configuration 400 may implement aspects of wireless communications systems 100, 200, or process flow 600 described with reference to FIGS. 1, 2, and 6. For example, the frame structure and wake-up signaling of UCA OAM configuration 400 may implement aspects of the message and signal exchange described with reference to process flow 600.

The frame structure and wake-up signaling may be implemented by a first device 205-*a*, a first device 205-*b*, a second device 210-*a*, or a second device 210-*b* described with reference to FIGS. 2 and 6. Any of the first device 205-*a*, the first device 205-*b*, the second device 210-*a*, or the second device 210-*b* may be a UE, a network entity, an IAB node, etc. as described herein.

For example, a first device (e.g., the first device 205-*a*, the first device 205-*b*) may monitor for wake-up signals over a set of resources 705 allocated for wake-up signals. In some aspects, the resources 705 may include a set of time and frequency resources allocated for transmitting and receiving wake-up signals. The resources 705 may be allocated for a wake-up signal period 710.

In some aspects, the wake-up signal period may be repeated periodically (e.g., according to an interval). For example, the resources 705 included in the wake-up signal period 710 may be allocated to a time and frequency position in the wake-up signal period 710 (e.g., according to a start point of the wake-up signal period 710, according to a start offset of the wake-up signal period 710). In some examples, the first device and the second device may communicate wake-up signals based on achieving a timing synchronization between the first device and the second device.

In some aspects, the first device and the second device may achieve the synchronization by synchronizing with a third device. For example, the third device may be a GNSS satellite or GPS satellite, and the first device and the second device may synchronize with a signal (e.g., a GNSS signal or a GPS signal) transmitted by the third device. In some cases, the signal may be a beacon based on which the first device and the second device may synchronize their timing for transmitting and receiving wake-up signals.

In an example of the repeating of wake-up signal periods 710 (and resources 705 included in the wake-up signal periods 710), a wake-up signal period 710-*a* may include a set of resources 705-*a* allocated for transmitting or receiving wake-up signals, a wake-up signal period 710-*b* may include a set of resources 705-*b* allocated for transmitting or receiving wake-up signals, and so on.

In some examples, the first device may monitor for the wake-up signal via an OAM mode (e.g., OAM mode 0). For example, the first device may enter a standby or sleep state to maintain low power consumption, and the first device may exit the standby or sleep state based on receiving a wake-up signal from a second device (e.g., second device 210-*a*, second device 210-*b*). In SPP OAM configuration 300, the first device may monitor for the wake-up signal during the wake-up signal periods 710-*a* through 710-*c*.

In some aspects, the first device 205-*b* may receive the wake-up signal via an uplink communications link. During the wake-up signal period 710-*c*, the first device may receive a wake-up signal within a duration corresponding to the resources 705-*c*. In some cases, the first device may receive the wake-up signal via an uplink communications link.

The first device may transmit a first message (e.g., a system information and synchronization message) to the second device via the OAM mode (e.g., OAM mode 0). an example, the first device 205-*b* may transmit the first message to the second device over resources 715 allocated for transmitting the first message. In some cases, the first device may transmit the first message via a downlink communications link. In some aspects, the first device may transmit the first message at a temporal instance that overlaps with a wake-up signal period (e.g., wake-up signal period 710-*c*) in which the first device successfully receives or detects a wake-up signal.

In an example, the first device may receive a configuration (e.g., from another device, such as a UE, a network entity, an IAB node, etc.) indicating the resources 715 allocated for transmitting the first message. In some cases, the configuration may indicate resources 720 (e.g., time and frequency resources) for receiving the second message, transmitting the third message, receiving the fourth message, or a combination thereof. In some aspects, the resources 715 and the resources 720 be repeat periodically (e.g., according to an interval).

Based on the configuration, the first device may determine the resources 715 over which to transmit the first message. In some examples, the first device may include, in the first message to the second device, an indication of the resources 720 allocated for receiving the second message, transmitting the third message, receiving the fourth message, or a combination thereof. Based on the first message 215, the second device may identify the resources 720 for receiving the second message, transmitting the third message, and receiving the fourth message.

Figure 8:
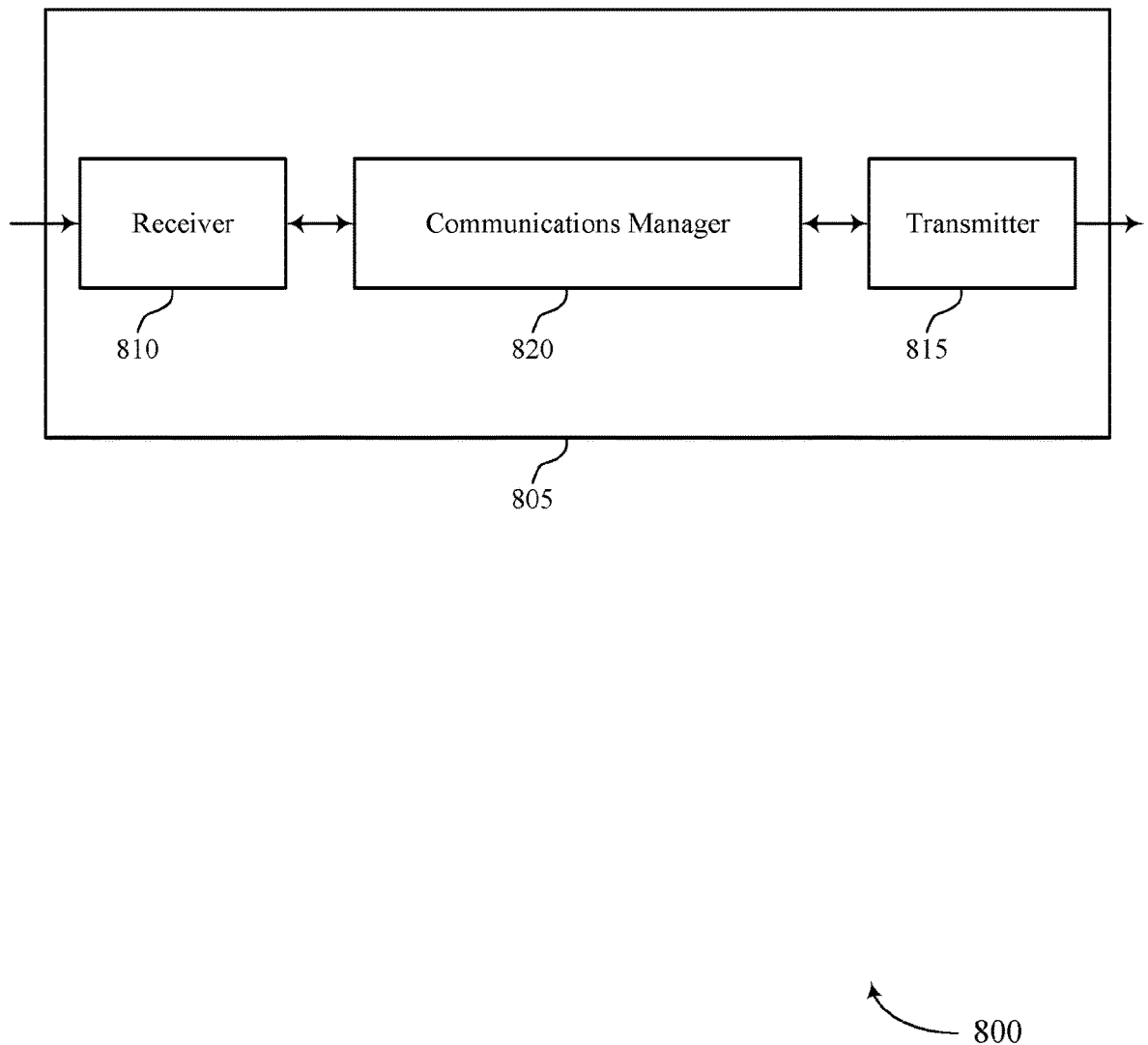
FIGS. 8 and 9 show block diagrams of devices that support connection setup in OAM-based communication system in accordance with aspects of the present disclosure.

FIG. 8 shows a block diagram 800 of a device 805 that supports connection setup in OAM-based communication system in accordance with one or more aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to connection setup in OAM-based communication system). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to connection setup in OAM-based communication system). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of connection setup in OAM-based communication system as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a first device in accordance with examples as disclosed herein. For example, the communications manager 820 may be configured as or otherwise support a means for transmitting a first message via a first orbital angular momentum mode, the first message including a synchronization signal and first positional information associated with a first orbital angular momentum circle center associated with the first device. The communications manager 820 may be configured as or otherwise support a means for receiving, via the first orbital angular momentum mode, a second message responsive to the first message, the second message including second positional information associated with a second orbital angular momentum circle center associated with a second device. The communications manager 820 may be configured as or otherwise support a means for transmitting, to the second device via the first orbital angular momentum mode, a third message based on the second message, the third message including directional alignment information associated with transmitting a signal. The communications manager 820 may be configured as or otherwise support a means for transmitting the signal to the second device based on the second positional information. The communications manager 820 may be configured as or otherwise support a means for receiving, from the second device via the first orbital angular momentum mode, a fourth message based on transmitting the third message and the signal, the fourth message indicating whether the signal was successfully received by the second device.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for devices (e.g., device 805 and another device) to successfully align with each other. Successful alignment may enable more efficient communications. For instance, a range of communications or a received power of a signal may increase when two devices are aligned with each other.

Figure 9:
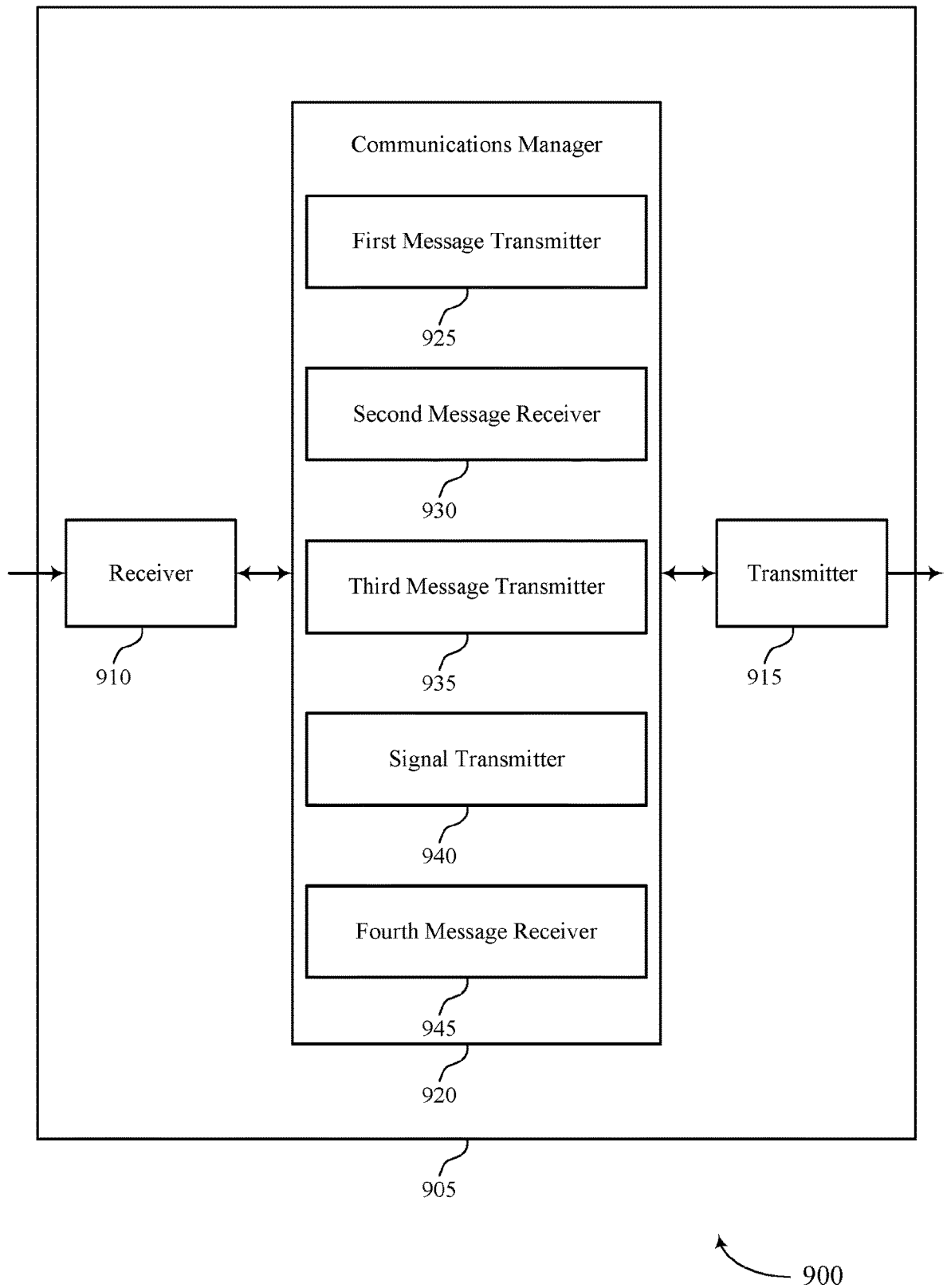

FIG. 9 shows a block diagram 900 of a device 905 that supports connection setup in OAM-based communication system in accordance with one or more aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to connection setup in OAM-based communication system). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to connection setup in OAM-based communication system). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of connection setup in OAM-based communication system as described herein. For example, the communications manager 920 may include a first message transmitter 925, a second message receiver 930, a third message transmitter 935, a signal transmitter 940, a fourth message receiver 945, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a first device in accordance with examples as disclosed herein. The first message transmitter 925 may be configured as or otherwise support a means for transmitting a first message via a first orbital angular momentum mode, the first message including a synchronization signal and first positional information associated with a first orbital angular momentum circle center associated with the first device. The second message receiver 930 may be configured as or otherwise support a means for receiving, via the first orbital angular momentum mode, a second message responsive to the first message, the second message including second positional information associated with a second orbital angular momentum circle center associated with a second device. The third message transmitter 935 may be configured as or otherwise support a means for transmitting, to the second device via the first orbital angular momentum mode, a third message based on the second message, the third message including directional alignment information associated with transmitting a signal. The signal transmitter 940 may be configured as or otherwise support a means for transmitting the signal to the second device based on the second positional information. The fourth message receiver 945 may be configured as or otherwise support a means for receiving, from the second device via the first orbital angular momentum mode, a fourth message based on transmitting the third message and the signal, the fourth message indicating whether the signal was successfully received by the second device.

Figure 10:
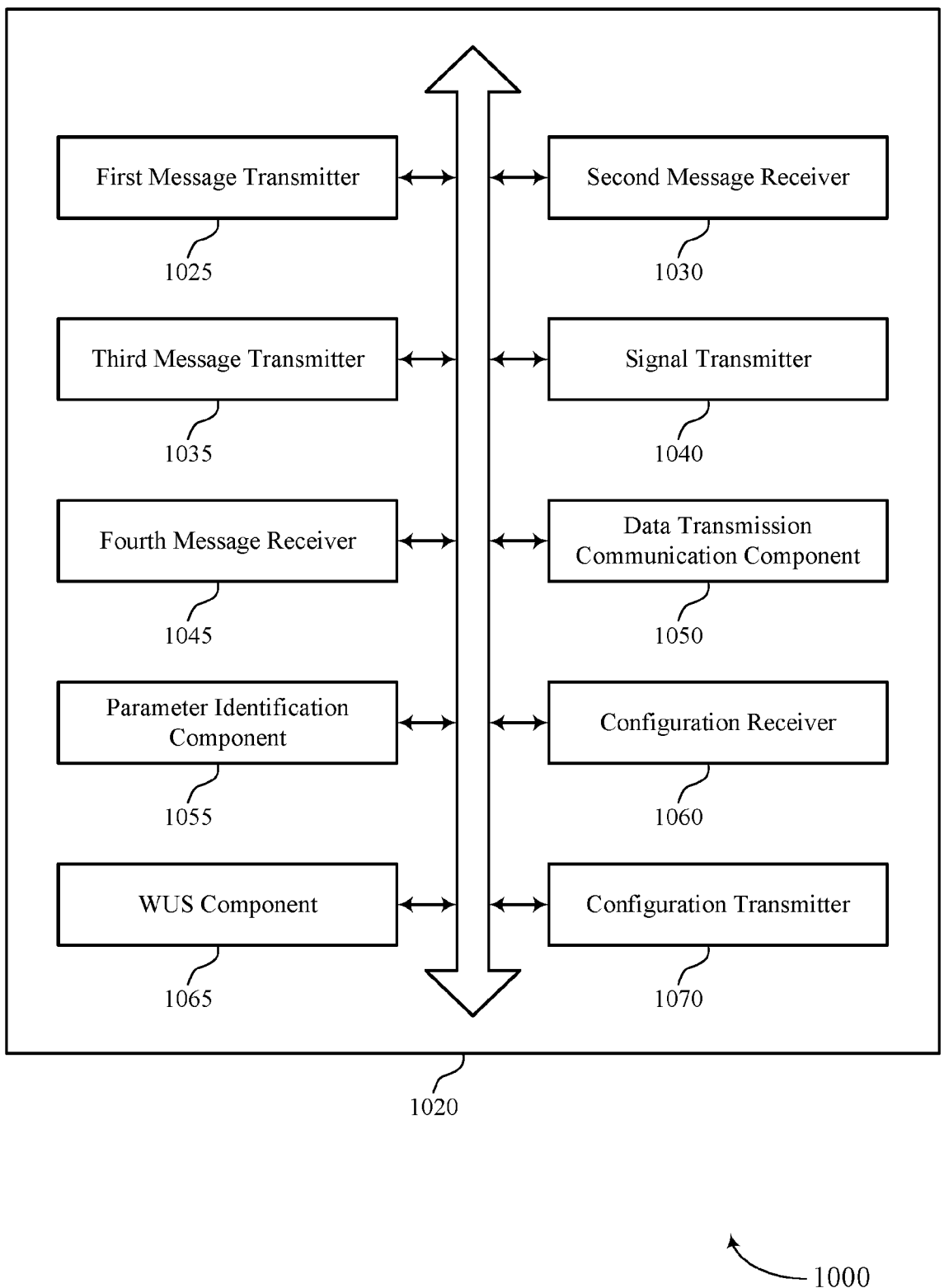
FIG. 10 shows a block diagram of a communications manager that supports connection setup in OAM-based communication system in accordance with aspects of the present disclosure.

FIG. 10 shows a block diagram 1000 of a communications manager 1020 that supports connection setup in OAM-based communication system in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of connection setup in OAM-based communication system as described herein. For example, the communications manager 1020 may include a first message transmitter 1025, a second message receiver 1030, a third message transmitter 1035, a signal transmitter 1040, a fourth message receiver 1045, a data transmission communication component 1050, a parameter identification component 1055, a configuration receiver 1060, a WUS component 1065, a configuration transmitter 1070, or any combination thereof. Each of these components may communicate, directly or indirectly, with one another (e.g., via one or more buses).

The communications manager 1020 may support wireless communication at a first device in accordance with examples as disclosed herein. The first message transmitter 1025 may be configured as or otherwise support a means for transmitting a first message via a first orbital angular momentum mode, the first message including a synchronization signal and first positional information associated with a first orbital angular momentum circle center associated with the first device. The second message receiver 1030 may be configured as or otherwise support a means for receiving, via the first orbital angular momentum mode, a second message responsive to the first message, the second message including second positional information associated with a second orbital angular momentum circle center associated with a second device. The third message transmitter 1035 may be configured as or otherwise support a means for transmitting, to the second device via the first orbital angular momentum mode, a third message based on the second message, the third message including directional alignment information associated with transmitting a signal. The signal transmitter 1040 may be configured as or otherwise support a means for transmitting the signal to the second device based on the second positional information. The fourth message receiver 1045 may be configured as or otherwise support a means for receiving, from the second device via the first orbital angular momentum mode, a fourth message based on transmitting the third message and the signal, the fourth message indicating whether the signal was successfully received by the second device.

In some examples, a transmitter orbital angular momentum circle center associated with the first device, direction information associated with the transmitter orbital angular momentum circle center, a receiver orbital angular momentum circle center associated with the first device, direction information associated with the receiver orbital angular momentum circle center, or a combination thereof.

In some examples, a transmitter orbital angular momentum circle center associated with the second device, direction information associated with the transmitter orbital angular momentum circle center, a receiver orbital angular momentum circle center associated with the second device, direction information associated with the receiver orbital angular momentum circle center, or a combination thereof.

In some examples, the first message further includes a first set of orbital angular momentum parameters associated with transmissions by the first device.

In some examples, a list of candidate orbital angular momentum modes associated with the transmissions by the first device. In some examples, a quantity of downlink transmitter circles associated with the first device. In some examples, a radius associated with each of the downlink transmitter circles. In some examples, a quantity of antenna elements associated with each of the downlink transmitter circles. In some examples, a quantity of orbital angular momentum modes simultaneously used for one or more of the downlink transmitter circles. In some examples, a quantity of uplink receiver circles associated with reception of the transmissions by the first device. In some examples, a radius associated with each of the uplink receiver circles. In some examples, a quantity of antenna elements associated with each of the uplink receiver circles. In some examples, a quantity of orbital angular momentum modes simultaneously used for one or more of the uplink receiver circles.

In some examples, the second message includes a second set of orbital angular momentum parameters associated with transmissions by the second device.

In some examples, a list of candidate orbital angular momentum modes associated with the transmissions by the second device. In some examples, a quantity of uplink transmitter circles associated with the second device. In some examples, a radius associated with each of the uplink transmitter circles. In some examples, a quantity of antenna elements associated with each of the uplink transmitter circles. In some examples, a quantity of orbital angular momentum modes simultaneously used for one or more of the uplink transmitter circles. In some examples, a quantity of downlink receiver circles associated with the first device. In some examples, a radius associated with each of the downlink receiver circles. In some examples, a quantity of antenna elements associated with each of the downlink receiver circles. In some examples, a quantity of orbital angular momentum modes simultaneously used for one or more of the downlink receiver circles.

In some examples, the directional alignment information includes steering information associated with the signal, the steering information including a wavelength of the signal, a polarization of the signal, a laser mode associated with the signal, or a combination thereof.

In some examples, the fourth message further includes an indication of a successful alignment between the first device and the second device, and the data transmission communication component 1050 may be configured as or otherwise support a means for communicating one or more data transmissions with the second device according to a set of orbital angular momentum modes based on the successful alignment.

In some examples, to support communicating the one or more data transmissions, the configuration transmitter 1070 may be configured as or otherwise support a means for transmitting, via the first orbital angular momentum mode, a configuration message associated with one or more downlink channel transmissions, the configuration message indicating a set of configured orbital angular momentum modes for the one or more downlink channel transmissions, where the set of configured orbital angular momentum modes includes two or more orbital angular momentum modes of the set of orbital angular momentum modes.

In some examples, the parameter identification component 1055 may be configured as or otherwise support a means for identifying a set of parameters associated with transmitting the first message, the set of parameters including a periodicity associated with transmitting the first message.

In some examples, the first message indicates a set of resources allocated for receiving the second message, transmitting the third message, receiving the fourth message, or a combination thereof.

In some examples, the configuration receiver 1060 may be configured as or otherwise support a means for receiving a configuration indicating a set of resources allocated for transmitting the first message, receiving the second message, transmitting the third message, receiving the fourth message, or a combination thereof.

In some examples, the WUS component 1065 may be configured as or otherwise support a means for monitoring for a wake-up signal over a set of resources allocated for the wake-up signal, where the monitoring is via the first orbital angular momentum mode. In some examples, the WUS component 1065 may be configured as or otherwise support a means for receiving the wake-up signal based on the monitoring, where transmitting the first message is based on receiving the wake-up signal.

In some examples, the signal includes an optical signal.

In some examples, the signal includes a radio signal.

In some examples, the signal includes a directional signal associated with one or more beams.

In some examples, the signal includes an omnidirectional signal.

In some examples, the first orbital angular momentum mode includes orbital angular momentum mode.

In some examples, transmitting the first message, the third message, or both includes using a center radiator of one or more transmitter circles of the first device or one or more uniform circular array radiators of the one or more transmitter circles of the first device.

Figure 11:
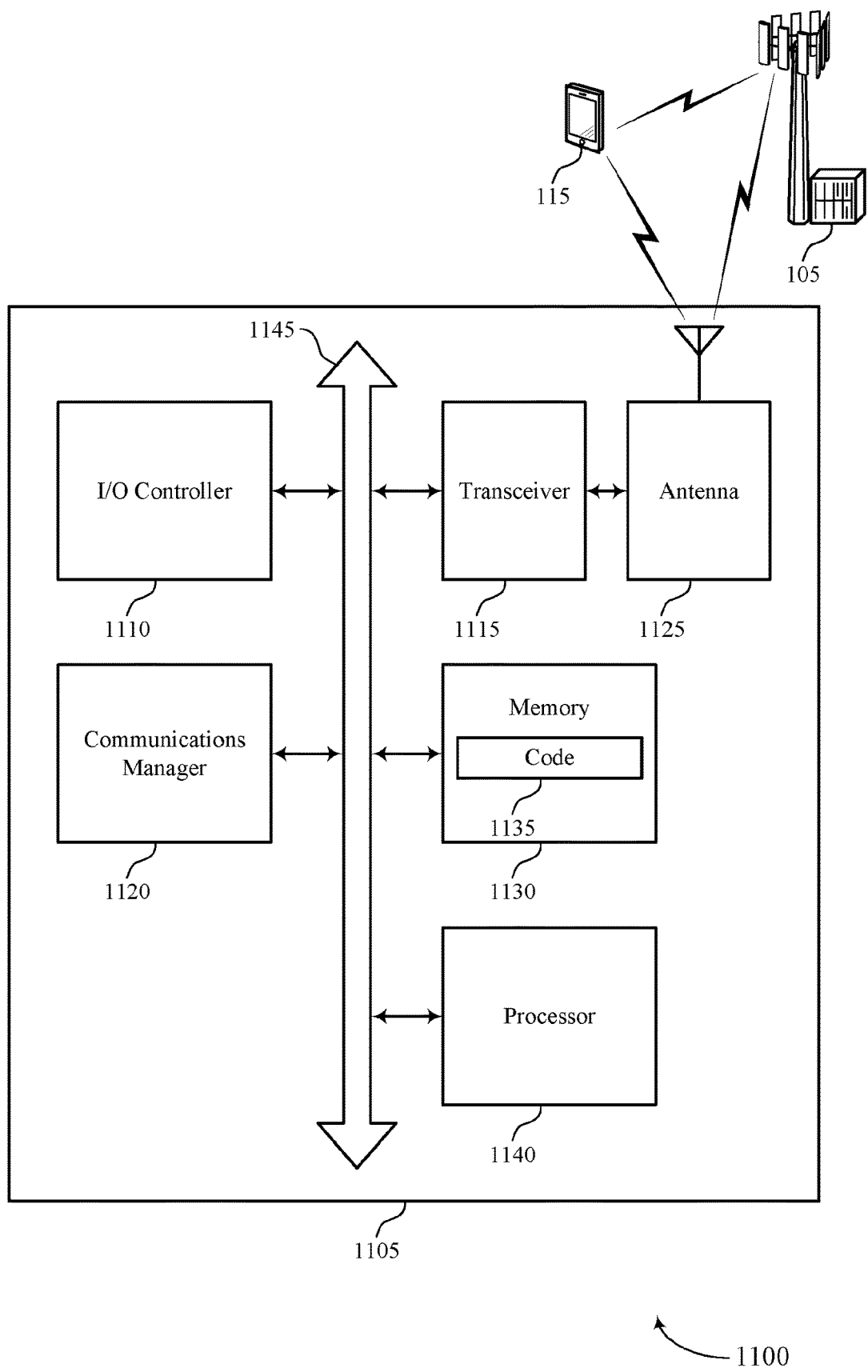
FIG. 11 shows a diagram of a system including a device that supports connection setup in OAM-based communication system in accordance with aspects of the present disclosure.

FIG. 11 shows a diagram of a system 1100 including a device 1105 that supports connection setup in OAM-based communication system in accordance with one or more aspects of the present disclosure. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting connection setup in OAM-based communication system). For example, the device 1105 or a component of the device 1105 may include a processor 1140 and memory 1130 coupled with or to the processor 1140, the processor 1140 and memory 1130 configured to perform various functions described herein.

The communications manager 1120 may support wireless communication at a first device in accordance with examples as disclosed herein. For example, the communications manager 1120 may be configured as or otherwise support a means for transmitting a first message via a first orbital angular momentum mode, the first message including a synchronization signal and first positional information associated with a first orbital angular momentum circle center associated with the first device. The communications manager 1120 may be configured as or otherwise support a means for receiving, via the first orbital angular momentum mode, a second message responsive to the first message, the second message including second positional information associated with a second orbital angular momentum circle center associated with a second device. The communications manager 1120 may be configured as or otherwise support a means for transmitting, to the second device via the first orbital angular momentum mode, a third message based on the second message, the third message including directional alignment information associated with transmitting a signal. The communications manager 1120 may be configured as or otherwise support a means for transmitting the signal to the second device based on the second positional information. The communications manager 1120 may be configured as or otherwise support a means for receiving, from the second device via the first orbital angular momentum mode, a fourth message based on transmitting the third message and the signal, the fourth message indicating whether the signal was successfully received by the second device.

By including or configuring the communications manager 1120 in accordance with examples as described herein, the device 1105 may support techniques for devices (e.g., device 1105 and another device) to successfully align with each other. Successful alignment may enable more efficient communications. For instance, a range of communications or a received power of a signal may increase when two devices are aligned with each other.

In some examples, the communications manager 1120 may be configured to perform various operations (e.g., receiving, monitoring, transmitting) using or otherwise in cooperation with the transceiver 1115, the one or more antennas 1125, or any combination thereof. For example, the communications manager 1120 may be configured to receive or transmit messages or other signals as described herein via the transceiver 1115. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of connection setup in OAM-based communication system as described herein, or the processor 1140 and the memory 1130 may be otherwise configured to perform or support such operations.

Figure 12:
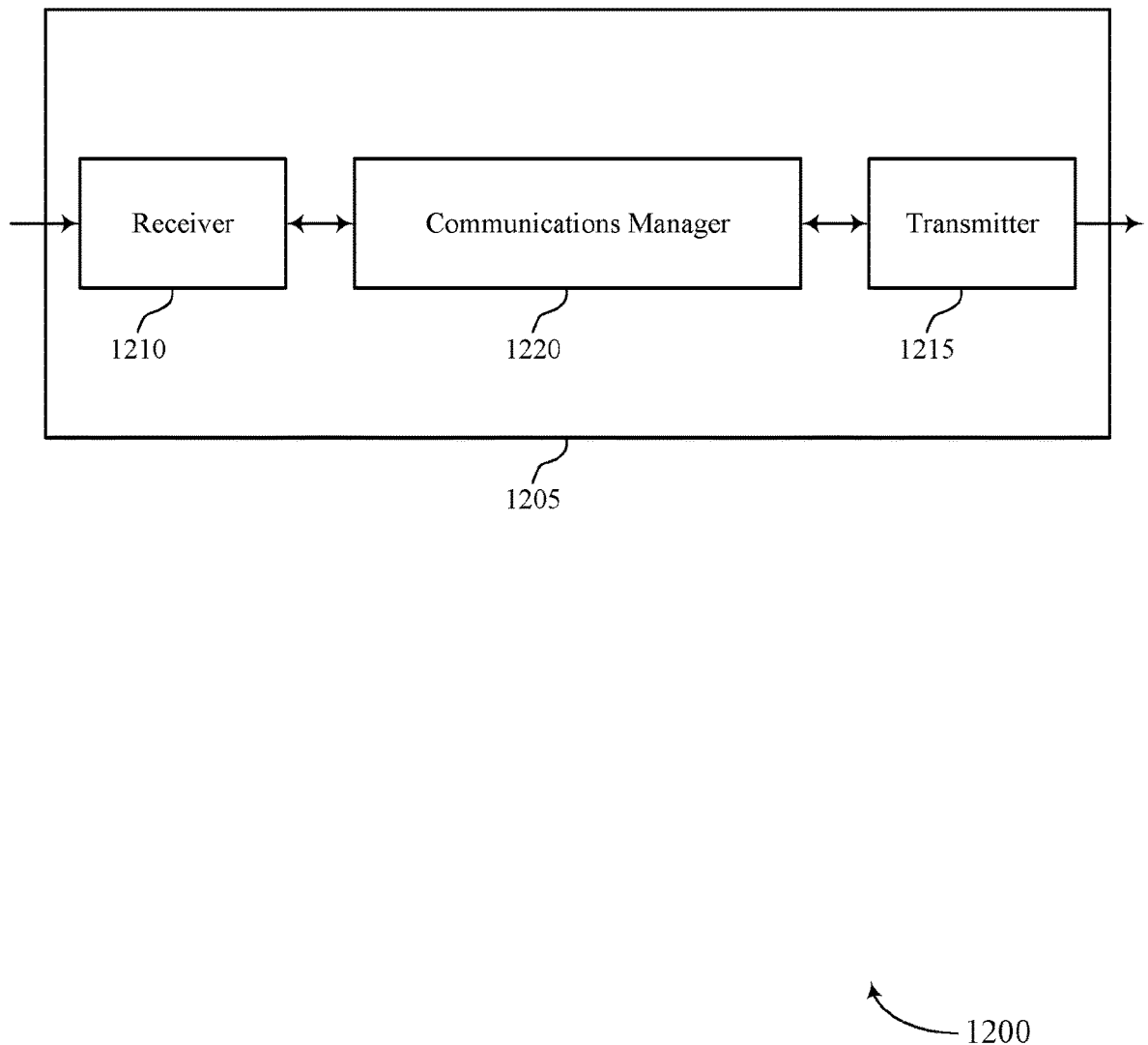
FIGS. 12 and 13 show block diagrams of devices that support connection setup in OAM-based communication system in accordance with aspects of the present disclosure.

FIG. 12 shows a block diagram 1200 of a device 1205 that supports connection setup in OAM-based communication system in accordance with one or more aspects of the present disclosure. The device 1205 may be an example of aspects of a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The communications manager 1220, the receiver 1210, the transmitter 1215, or various combinations thereof or various components thereof may be examples of means for performing various aspects of connection setup in OAM-based communication system as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1220 may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a second device in accordance with examples as disclosed herein. For example, the communications manager 1220 may be configured as or otherwise support a means for receiving a first message via a first orbital angular momentum mode, the first message including a synchronization signal and first positional information associated with a first orbital angular momentum circle center associated with a first device. The communications manager 1220 may be configured as or otherwise support a means for transmitting, via the first orbital angular momentum mode, a second message responsive to the first message, the second message including second positional information associated with a second orbital angular momentum circle center associated with the second device. The communications manager 1220 may be configured as or otherwise support a means for receiving, from the first device via the first orbital angular momentum mode, a third message based on the second message, the third message including directional alignment information associated with transmitting a signal. The communications manager 1220 may be configured as or otherwise support a means for receiving the signal from the first device based on the second positional information. The communications manager 1220 may be configured as or otherwise support a means for transmitting, to the first device via the first orbital angular momentum mode, a fourth message based on receiving the third message and the signal, the fourth message indicating whether the signal was successfully received by the second device.

By including or configuring the communications manager 1220 in accordance with examples as described herein, the device 1205 (e.g., a processor controlling or otherwise coupled with the receiver 1210, the transmitter 1215, the communications manager 1220, or a combination thereof) may support techniques for devices (e.g., device 1205 and another device) to successfully align with each other. Successful alignment may enable more efficient communications. For instance, a range of communications or a received power of a signal may increase when two devices are aligned with each other.

Figure 13:
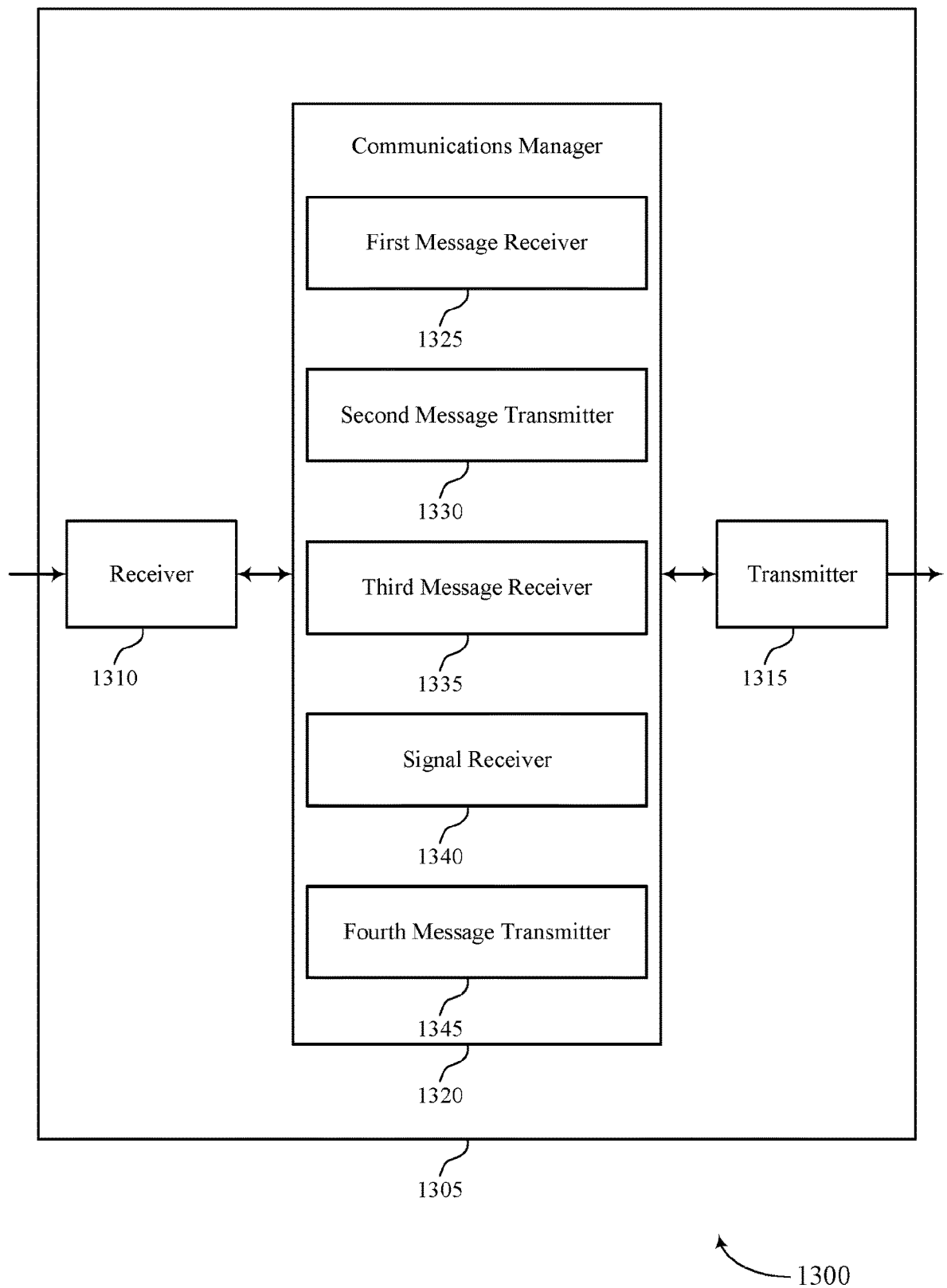

FIG. 13 shows a block diagram 1300 of a device 1305 that supports connection setup in OAM-based communication system in accordance with one or more aspects of the present disclosure. The device 1305 may be an example of aspects of a device 1205 or a network entity 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The device 1305, or various components thereof, may be an example of means for performing various aspects of connection setup in OAM-based communication system as described herein. For example, the communications manager 1320 may include a first message receiver 1325, a second message transmitter 1330, a third message receiver 1335, a signal receiver 1340, a fourth message transmitter 1345, or any combination thereof. The communications manager 1320 may be an example of aspects of a communications manager 1220 as described herein. In some examples, the communications manager 1320, or various components thereof, may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication at a second device in accordance with examples as disclosed herein. The first message receiver 1325 may be configured as or otherwise support a means for receiving a first message via a first orbital angular momentum mode, the first message including a synchronization signal and first positional information associated with a first orbital angular momentum circle center associated with a first device. The second message transmitter 1330 may be configured as or otherwise support a means for transmitting, via the first orbital angular momentum mode, a second message responsive to the first message, the second message including second positional information associated with a second orbital angular momentum circle center associated with the second device. The third message receiver 1335 may be configured as or otherwise support a means for receiving, from the first device via the first orbital angular momentum mode, a third message based on the second message, the third message including directional alignment information associated with transmitting a signal. The signal receiver 1340 may be configured as or otherwise support a means for receiving the signal from the first device based on the second positional information. The fourth message transmitter 1345 may be configured as or otherwise support a means for transmitting, to the first device via the first orbital angular momentum mode, a fourth message based on receiving the third message and the signal, the fourth message indicating whether the signal was successfully received by the second device.

Figure 14:
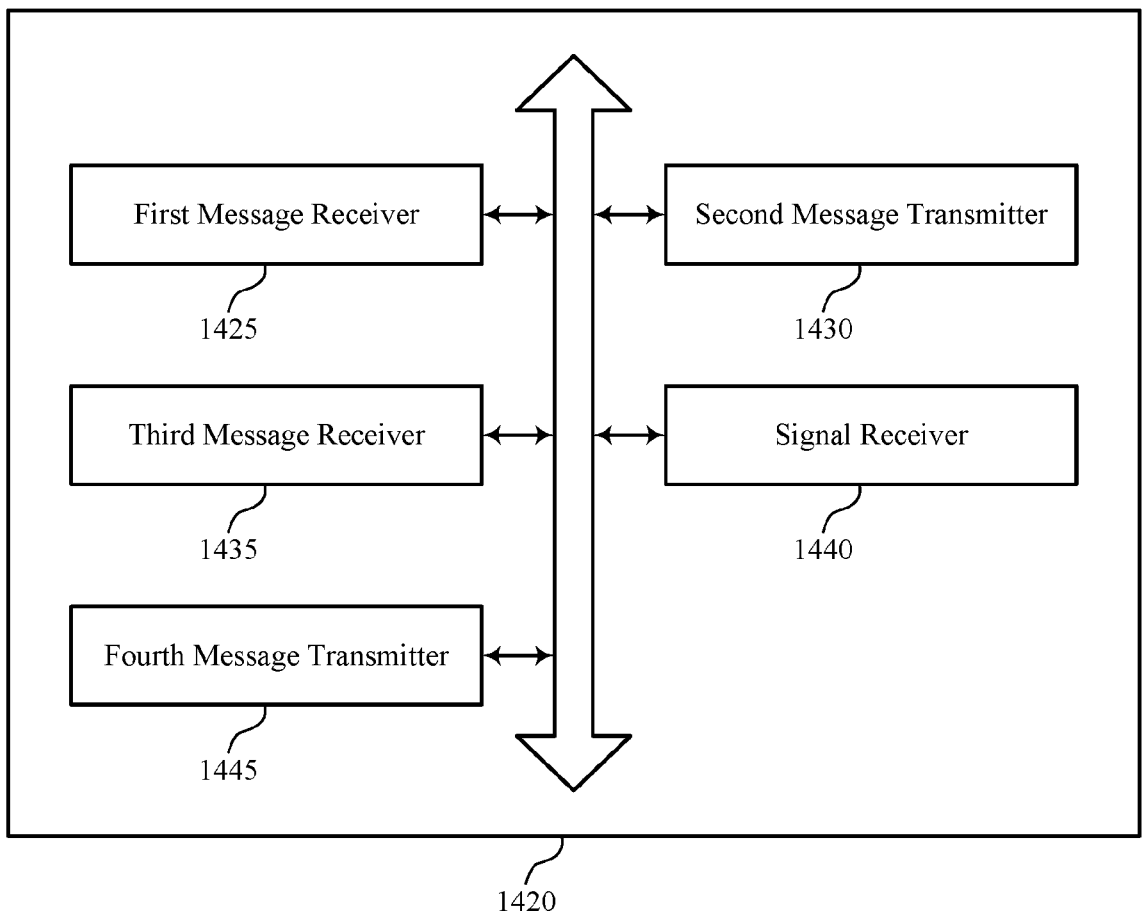
FIG. 14 shows a block diagram of a communications manager that supports connection setup in OAM-based communication system in accordance with aspects of the present disclosure.

FIG. 14 shows a block diagram 1400 of a communications manager 1420 that supports connection setup in OAM-based communication system in accordance with one or more aspects of the present disclosure. The communications manager 1420 may be an example of aspects of a communications manager 1220, a communications manager 1320, or both, as described herein. The communications manager 1420, or various components thereof, may be an example of means for performing various aspects of connection setup in OAM-based communication system as described herein. For example, the communications manager 1420 may include a first message receiver 1425, a second message transmitter 1430, a third message receiver 1435, a signal receiver 1440, a fourth message transmitter 1445, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1420 may support wireless communication at a second device in accordance with examples as disclosed herein. The first message receiver 1425 may be configured as or otherwise support a means for receiving a first message via a first orbital angular momentum mode, the first message including a synchronization signal and first positional information associated with a first orbital angular momentum circle center associated with a first device. The second message transmitter 1430 may be configured as or otherwise support a means for transmitting, via the first orbital angular momentum mode, a second message responsive to the first message, the second message including second positional information associated with a second orbital angular momentum circle center associated with the second device. The third message receiver 1435 may be configured as or otherwise support a means for receiving, from the first device via the first orbital angular momentum mode, a third message based on the second message, the third message including directional alignment information associated with transmitting a signal. The signal receiver 1440 may be configured as or otherwise support a means for receiving the signal from the first device based on the second positional information. The fourth message transmitter 1445 may be configured as or otherwise support a means for transmitting, to the first device via the first orbital angular momentum mode, a fourth message based on receiving the third message and the signal, the fourth message indicating whether the signal was successfully received by the second device.

In some examples, a transmitter orbital angular momentum circle center associated with the first device, direction information associated with the transmitter orbital angular momentum circle center, a receiver orbital angular momentum circle center associated with the first device, direction information associated with the receiver orbital angular momentum circle center, or a combination thereof.

In some examples, a transmitter orbital angular momentum circle center associated with the second device, direction information associated with the transmitter orbital angular momentum circle center, a receiver orbital angular momentum circle center associated with the second device, direction information associated with the receiver orbital angular momentum circle center, or a combination thereof.

In some examples, the first message further includes a first set of orbital angular momentum parameters associated with transmissions by the first device.

In some examples, the signal includes an optical signal.

In some examples, the signal includes a radio signal.

In some examples, the signal includes a directional signal associated with one or more beams.

In some examples, the signal includes an omnidirectional signal.

Figure 15:
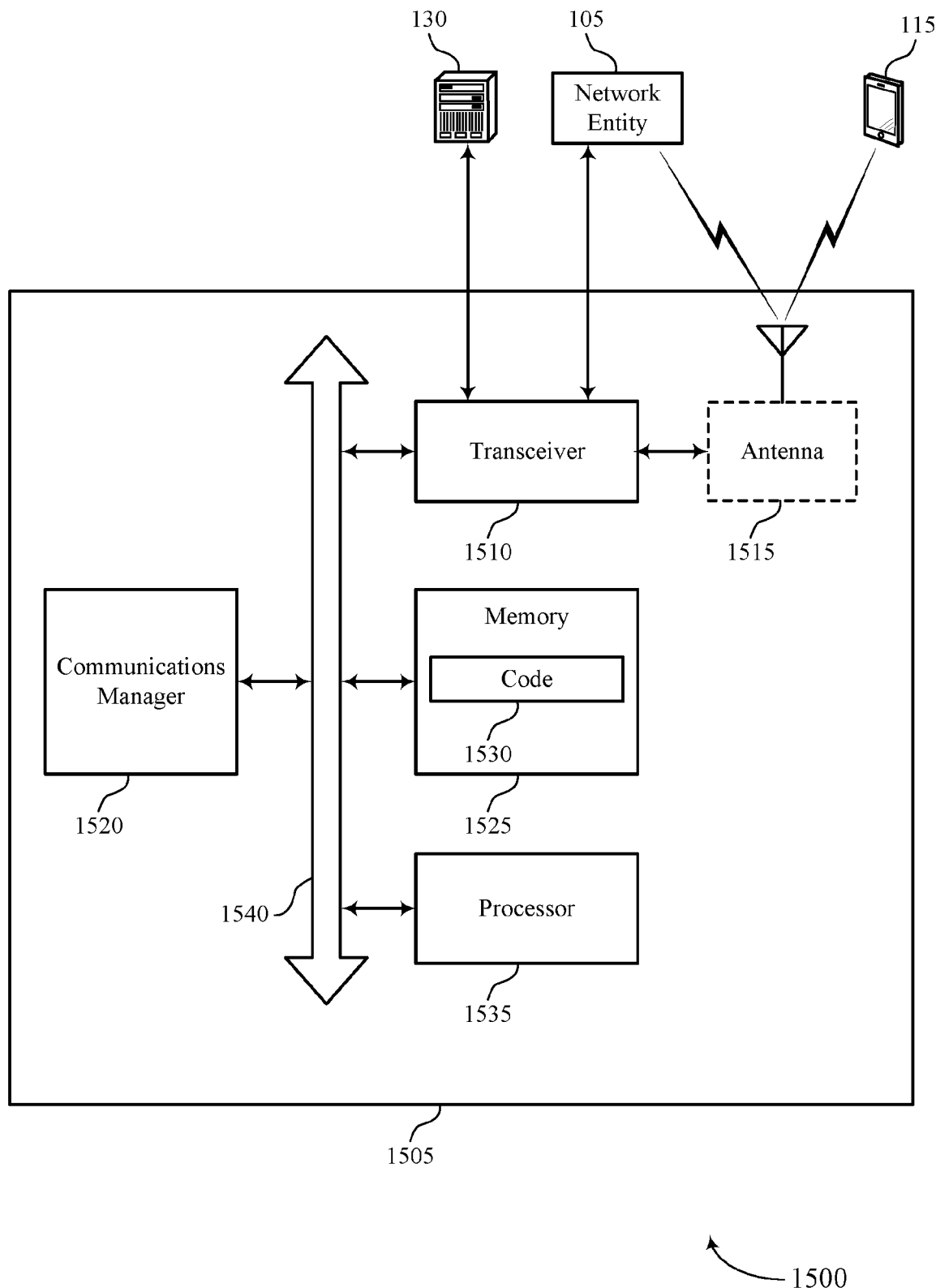
FIG. 15 shows a diagram of a system including a device that supports connection setup in OAM-based communication system in accordance with aspects of the present disclosure.

FIG. 15 shows a diagram of a system 1500 including a device 1505 that supports connection setup in OAM-based communication system in accordance with one or more aspects of the present disclosure. The device 1505 may be an example of or include the components of a device 1205, a device 1305, or a network entity 105 as described herein. The device 1505 may communicate with one or more network entities 105, one or more UEs 115, or any combination thereof, which may include communications over one or more wired interfaces, over one or more wireless interfaces, or any combination thereof. The device 1505 may include components that support outputting and obtaining communications, such as a communications manager 1520, a transceiver 1510, an antenna 1515, a memory 1525, code 1530, and a processor 1535. These components may be in electronic communication or otherwise coupled (e.g., operatively, communicatively, functionally, electronically, electrically) via one or more buses (e.g., a bus 1540).

The transceiver 1510 may support bi-directional communications via wired links, wireless links, or both as described herein. In some examples, the transceiver 1510 may include a wired transceiver and may communicate bi-directionally with another wired transceiver. Additionally, or alternatively, in some examples, the transceiver 1510 may include a wireless transceiver and may communicate bi-directionally with another wireless transceiver. In some examples, the device 1505 may include one or more antennas 1515, which may be capable of transmitting or receiving wireless transmissions (e.g., concurrently). The transceiver 1510 may also include a modem to modulate signals, to provide the modulated signals for transmission (e.g., by one or more antennas 1515, by a wired transmitter), to receive modulated signals (e.g., from one or more antennas 1515, from a wired receiver), and to demodulate signals. The transceiver 1510, or the transceiver 1510 and one or more antennas 1515 or wired interfaces, where applicable, may be an example of a transmitter 1215, a transmitter 1315, a receiver 1210, a receiver 1310, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1525 may include RAM and ROM. The memory 1525 may store computer-readable, computer-executable code 1530 including instructions that, when executed by the processor 1535, cause the device 1505 to perform various functions described herein. The code 1530 may be stored in a non-transitory computer-readable medium such as system memory or another type of memory. In some cases, the code 1530 may not be directly executable by the processor 1535 but may cause a computer (e.g., when compiled and executed) to perform functions described herein. In some cases, the memory 1525 may contain, among other things, a BIOS which may control basic hardware or software operation such as the interaction with peripheral components or devices.

The processor 1535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1535 may be configured to operate a memory array using a memory controller. In some other cases, a memory controller may be integrated into the processor 1535. The processor 1535 may be configured to execute computer-readable instructions stored in a memory (e.g., the memory 1525) to cause the device 1505 to perform various functions (e.g., functions or tasks supporting connection setup in OAM-based communication system). For example, the device 1505 or a component of the device 1505 may include a processor 1535 and memory 1525 coupled with the processor 1535, the processor 1535 and memory 1525 configured to perform various functions described herein. The processor 1535 may be an example of a cloud-computing platform (e.g., one or more physical nodes and supporting software such as operating systems, virtual machines, or container instances) that may host the functions (e.g., by executing code 1530) to perform the functions of the device 1505.

In some examples, a bus 1540 may support communications of (e.g., within) a protocol layer of a protocol stack. In some examples, a bus 1540 may support communications associated with a logical channel of a protocol stack (e.g., between protocol layers of a protocol stack), which may include communications performed within a component of the device 1505, or between different components of the device 1505 that may be co-located or located in different locations (e.g., where the device 1505 may refer to a system in which one or more of the communications manager 1520, the transceiver 1510, the memory 1525, the code 1530, and the processor 1535 may be located in one of the different components or divided between different components).

In some examples, the communications manager 1520 may manage aspects of communications with a core network 130 (e.g., via one or more wired or wireless backhaul links). For example, the communications manager 1520 may manage the transfer of data communications for client devices, such as one or more UEs 115. In some examples, the communications manager 1520 may manage communications with other network entities 105, and may include a controller or scheduler for controlling communications with UEs 115 in cooperation with other network entities 105. In some examples, the communications manager 1520 may support an X2 interface within an LTE/LTE-A wireless communications network technology to provide communication between network entities 105.

The communications manager 1520 may support wireless communication at a second device in accordance with examples as disclosed herein. For example, the communications manager 1520 may be configured as or otherwise support a means for receiving a first message via a first orbital angular momentum mode, the first message including a synchronization signal and first positional information associated with a first orbital angular momentum circle center associated with a first device. The communications manager 1520 may be configured as or otherwise support a means for transmitting, via the first orbital angular momentum mode, a second message responsive to the first message, the second message including second positional information associated with a second orbital angular momentum circle center associated with the second device. The communications manager 1520 may be configured as or otherwise support a means for receiving, from the first device via the first orbital angular momentum mode, a third message based on the second message, the third message including directional alignment information associated with transmitting a signal. The communications manager 1520 may be configured as or otherwise support a means for receiving the signal from the first device based on the second positional information. The communications manager 1520 may be configured as or otherwise support a means for transmitting, to the first device via the first orbital angular momentum mode, a fourth message based on receiving the third message and the signal, the fourth message indicating whether the signal was successfully received by the second device.

By including or configuring the communications manager 1520 in accordance with examples as described herein, the device 1505 may support techniques for devices (e.g., device 1505 and another device) to successfully align with each other. Successful alignment may enable more efficient communications. For instance, a range of communications or a received power of a signal may increase when two devices are aligned with each other.

In some examples, the communications manager 1520 may be configured to perform various operations (e.g., receiving, obtaining, monitoring, outputting, transmitting) using or otherwise in cooperation with the transceiver 1510, the one or more antennas 1515 (e.g., where applicable), or any combination thereof. Although the communications manager 1520 is illustrated as a separate component, in some examples, one or more functions described with reference to the communications manager 1520 may be supported by or performed by the processor 1535, the memory 1525, the code 1530, the transceiver 1510, or any combination thereof. For example, the code 1530 may include instructions executable by the processor 1535 to cause the device 1505 to perform various aspects of connection setup in OAM-based communication system as described herein, or the processor 1535 and the memory 1525 may be otherwise configured to perform or support such operations.

Figure 16:
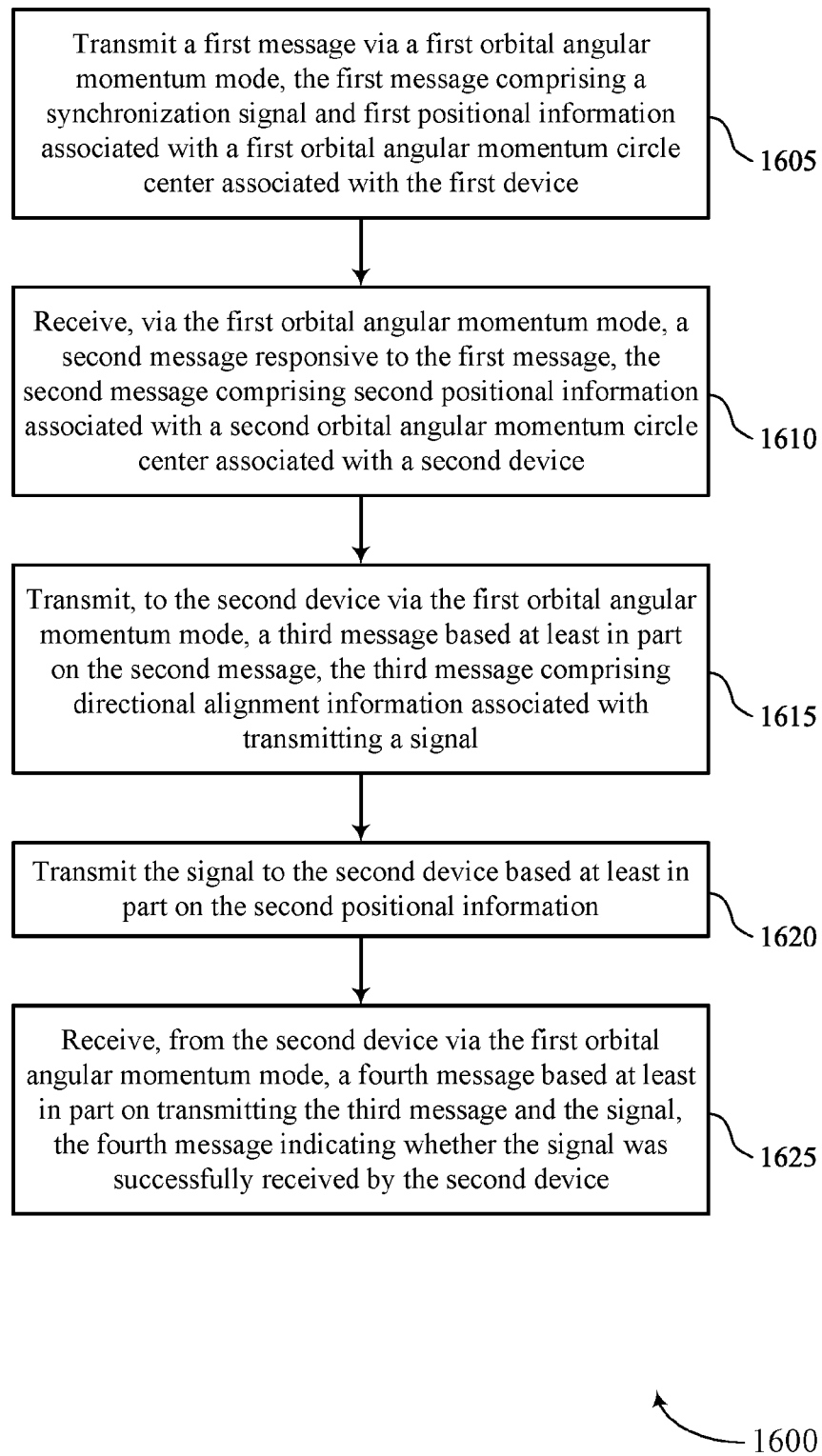
FIGS. 16 through 21 show flowcharts illustrating methods that support connection setup in OAM-based communication system in accordance with aspects of the present disclosure.

FIG. 16 shows a flowchart illustrating a method 1600 that supports connection setup in OAM-based communication system in accordance with one or more aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include transmitting a first message via a first orbital angular momentum mode, the first message including a synchronization signal and first positional information associated with a first orbital angular momentum circle center associated with the first device. The operations of 1605 may be performed in accordance with examples as disclosed herein. In some examples, aspects of the operations of 1605 may be performed by a first message transmitter 1025 as described with reference to FIG. 10.

At 1610, the method may include receiving, via the first orbital angular momentum mode, a second message responsive to the first message, the second message including second positional information associated with a second orbital angular momentum circle center associated with a second device. The operations of 1610 may be performed in accordance with examples as disclosed herein. In some examples, aspects of the operations of 1610 may be performed by a second message receiver 1030 as described with reference to FIG. 10.

At 1615, the method may include transmitting, to the second device via the first orbital angular momentum mode, a third message based on the second message, the third message including directional alignment information associated with transmitting a signal. The operations of 1615 may be performed in accordance with examples as disclosed herein. In some examples, aspects of the operations of 1615 may be performed by a third message transmitter 1035 as described with reference to FIG. 10.

At 1620, the method may include transmitting the signal to the second device based on the second positional information. The operations of 1620 may be performed in accordance with examples as disclosed herein. In some examples, aspects of the operations of 1620 may be performed by a signal transmitter 1040 as described with reference to FIG. 10.

At 1625, the method may include receiving, from the second device via the first orbital angular momentum mode, a fourth message based on transmitting the third message and the signal, the fourth message indicating whether the signal was successfully received by the second device. The operations of 1625 may be performed in accordance with examples as disclosed herein. In some examples, aspects of the operations of 1625 may be performed by a fourth message receiver 1045 as described with reference to FIG. 10.

Figure 17:
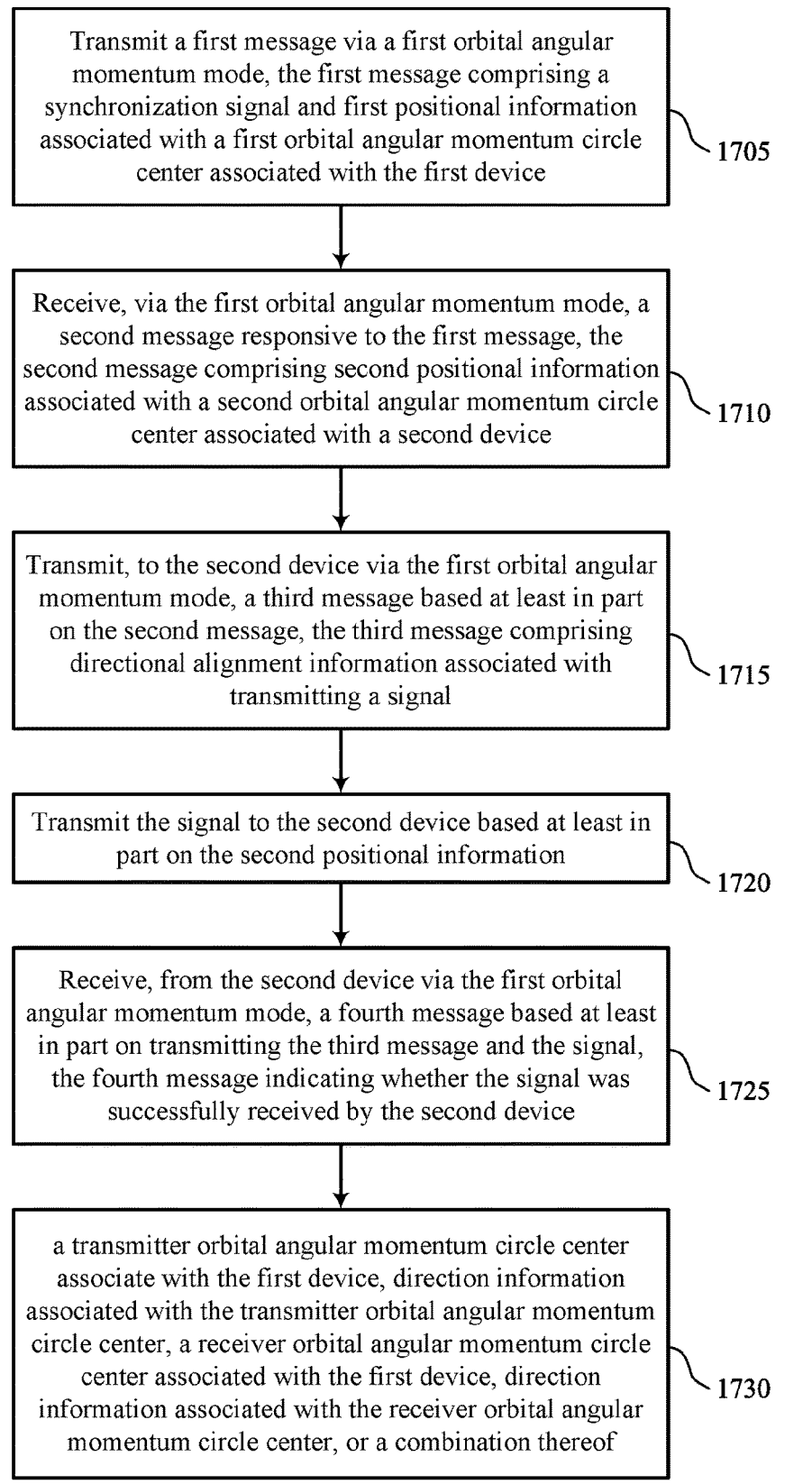

FIG. 17 shows a flowchart illustrating a method 1700 that supports connection setup in OAM-based communication system in accordance with one or more aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include transmitting a first message via a first orbital angular momentum mode, the first message including a synchronization signal and first positional information associated with a first orbital angular momentum circle center associated with the first device. The operations of 1705 may be performed in accordance with examples as disclosed herein. In some examples, aspects of the operations of 1705 may be performed by a first message transmitter 1025 as described with reference to FIG. 10.

At 1710, the method may include receiving, via the first orbital angular momentum mode, a second message responsive to the first message, the second message including second positional information associated with a second orbital angular momentum circle center associated with a second device. The operations of 1710 may be performed in accordance with examples as disclosed herein. In some examples, aspects of the operations of 1710 may be performed by a second message receiver 1030 as described with reference to FIG. 10.

At 1715, the method may include transmitting, to the second device via the first orbital angular momentum mode, a third message based on the second message, the third message including directional alignment information associated with transmitting a signal. The operations of 1715 may be performed in accordance with examples as disclosed herein. In some examples, aspects of the operations of 1715 may be performed by a third message transmitter 1035 as described with reference to FIG. 10.

At 1720, the method may include transmitting the signal to the second device based on the second positional information. The operations of 1720 may be performed in accordance with examples as disclosed herein. In some examples, aspects of the operations of 1720 may be performed by a signal transmitter 1040 as described with reference to FIG. 10.

At 1725, the method may include receiving, from the second device via the first orbital angular momentum mode, a fourth message based on transmitting the third message and the signal, the fourth message indicating whether the signal was successfully received by the second device. The operations of 1725 may be performed in accordance with examples as disclosed herein. In some examples, aspects of the operations of 1725 may be performed by a fourth message receiver 1045 as described with reference to FIG. 10.

At 1730, the method may include a transmitter orbital angular momentum circle center associating with the first device, direction information associated with the transmitter orbital angular momentum circle center, a receiver orbital angular momentum circle center associated with the first device, direction information associated with the receiver orbital angular momentum circle center, or a combination thereof. The operations of 1730 may be performed in accordance with examples as disclosed herein. In some examples, aspects of the operations of 1730 may be performed by a first message transmitter 1025 as described with reference to FIG. 10.

Figure 18:
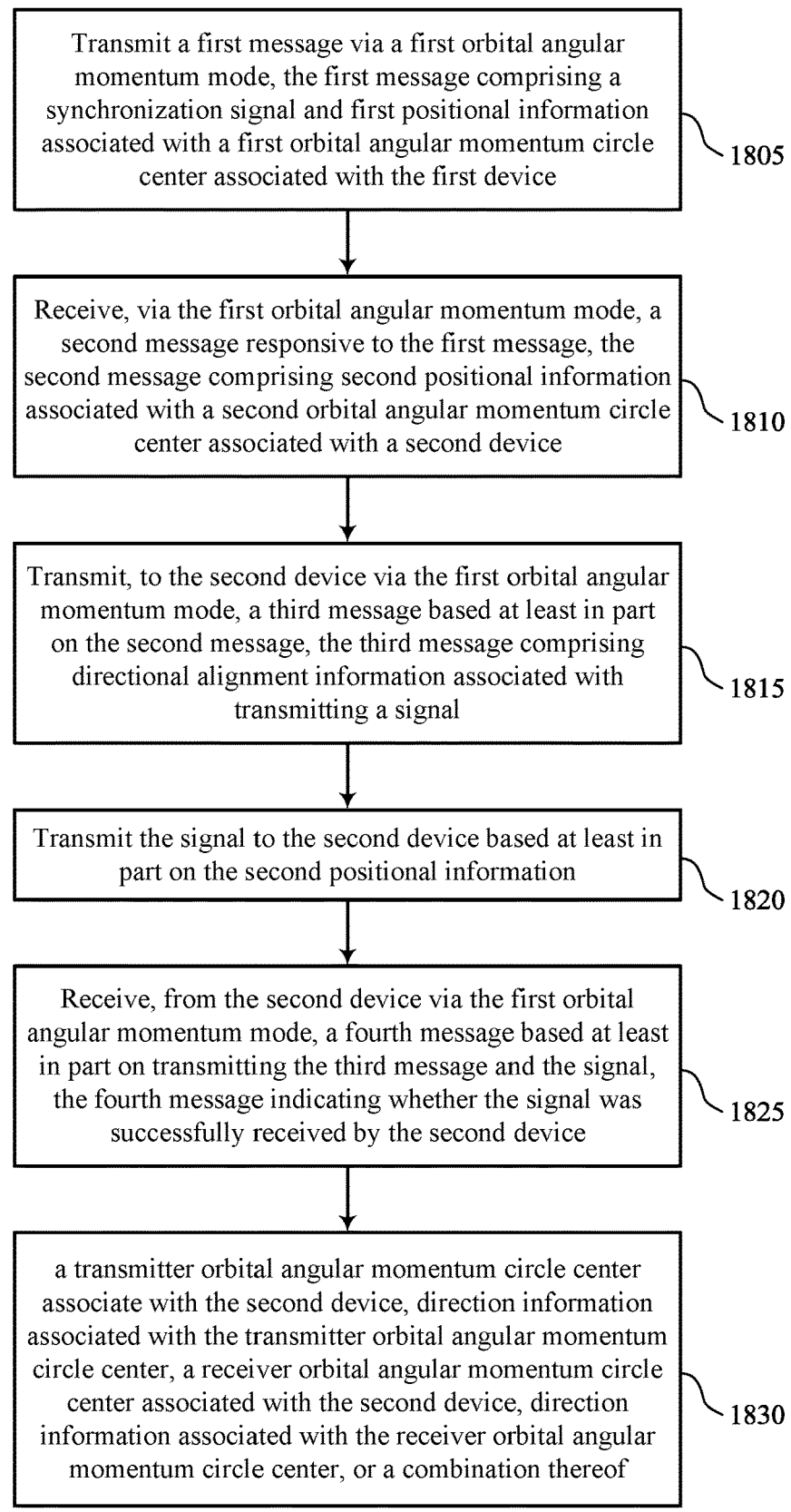

FIG. 18 shows a flowchart illustrating a method 1800 that supports connection setup in OAM-based communication system in accordance with one or more aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include transmitting a first message via a first orbital angular momentum mode, the first message including a synchronization signal and first positional information associated with a first orbital angular momentum circle center associated with the first device. The operations of 1805 may be performed in accordance with examples as disclosed herein. In some examples, aspects of the operations of 1805 may be performed by a first message transmitter 1025 as described with reference to FIG. 10.

At 1810, the method may include receiving, via the first orbital angular momentum mode, a second message responsive to the first message, the second message including second positional information associated with a second orbital angular momentum circle center associated with a second device. The operations of 1810 may be performed in accordance with examples as disclosed herein. In some examples, aspects of the operations of 1810 may be performed by a second message receiver 1030 as described with reference to FIG. 10.

At 1815, the method may include transmitting, to the second device via the first orbital angular momentum mode, a third message based on the second message, the third message including directional alignment information associated with transmitting a signal. The operations of 1815 may be performed in accordance with examples as disclosed herein. In some examples, aspects of the operations of 1815 may be performed by a third message transmitter 1035 as described with reference to FIG. 10.

At 1820, the method may include transmitting the signal to the second device based on the second positional information. The operations of 1820 may be performed in accordance with examples as disclosed herein. In some examples, aspects of the operations of 1820 may be performed by a signal transmitter 1040 as described with reference to FIG. 10.

At 1825, the method may include receiving, from the second device via the first orbital angular momentum mode, a fourth message based on transmitting the third message and the signal, the fourth message indicating whether the signal was successfully received by the second device. The operations of 1825 may be performed in accordance with examples as disclosed herein. In some examples, aspects of the operations of 1825 may be performed by a fourth message receiver 1045 as described with reference to FIG. 10.

At 1830, the method may include a transmitter orbital angular momentum circle center associating with the second device, direction information associated with the transmitter orbital angular momentum circle center, a receiver orbital angular momentum circle center associated with the second device, direction information associated with the receiver orbital angular momentum circle center, or a combination thereof. The operations of 1830 may be performed in accordance with examples as disclosed herein. In some examples, aspects of the operations of 1830 may be performed by a second message receiver 1030 as described with reference to FIG. 10.

Figure 19:
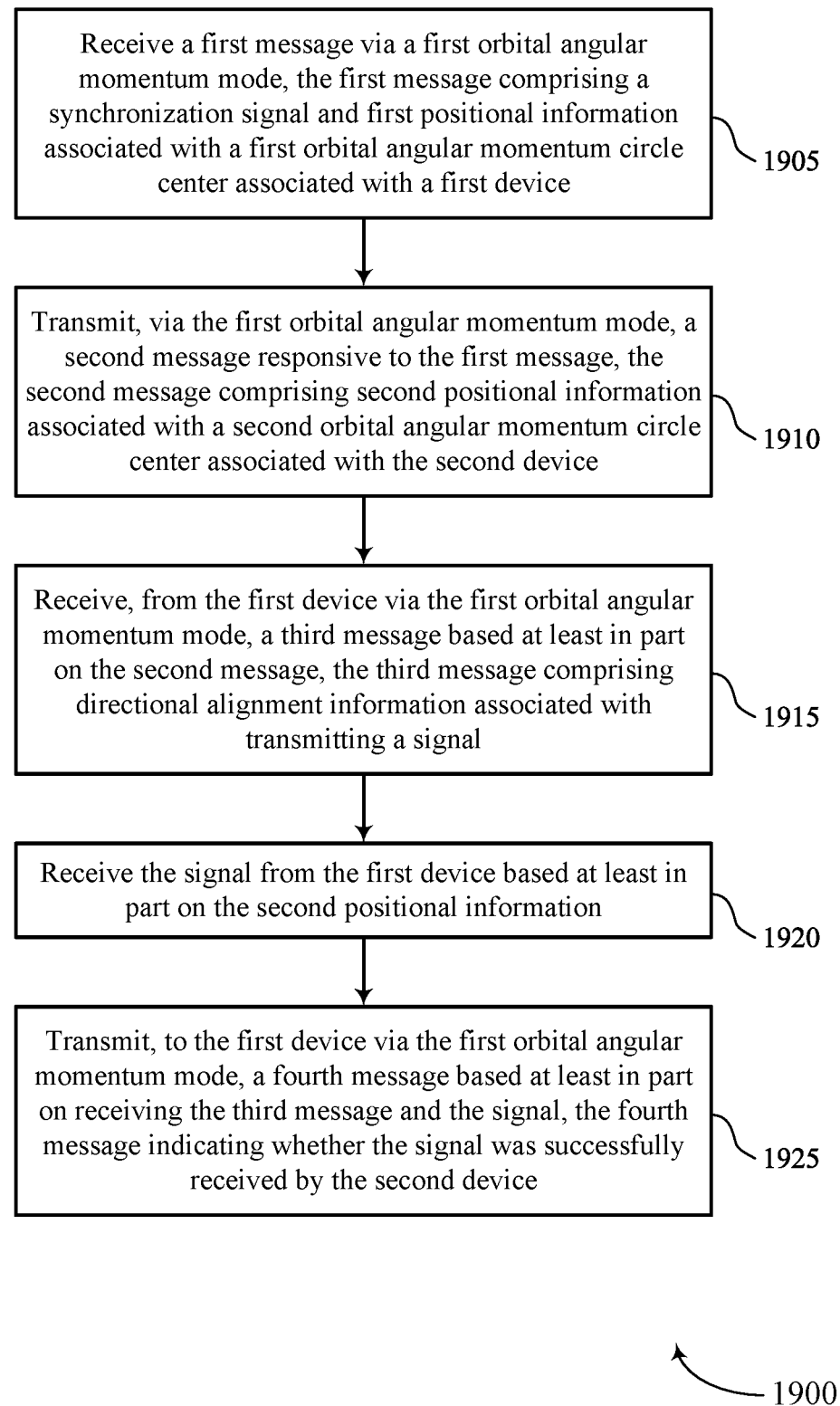

FIG. 19 shows a flowchart illustrating a method 1900 that supports connection setup in OAM-based communication system in accordance with one or more aspects of the present disclosure. The operations of the method 1900 may be implemented by a network entity or its components as described herein. For example, the operations of the method 1900 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 1905, the method may include receiving a first message via a first orbital angular momentum mode, the first message including a synchronization signal and first positional information associated with a first orbital angular momentum circle center associated with a first device. The operations of 1905 may be performed in accordance with examples as disclosed herein. In some examples, aspects of the operations of 1905 may be performed by a first message receiver 1425 as described with reference to FIG. 14.

At 1910, the method may include transmitting, via the first orbital angular momentum mode, a second message responsive to the first message, the second message including second positional information associated with a second orbital angular momentum circle center associated with the second device. The operations of 1910 may be performed in accordance with examples as disclosed herein. In some examples, aspects of the operations of 1910 may be performed by a second message transmitter 1430 as described with reference to FIG. 14.

At 1915, the method may include receiving, from the first device via the first orbital angular momentum mode, a third message based on the second message, the third message including directional alignment information associated with transmitting a signal. The operations of 1915 may be performed in accordance with examples as disclosed herein. In some examples, aspects of the operations of 1915 may be performed by a third message receiver 1435 as described with reference to FIG. 14.

At 1920, the method may include receiving the signal from the first device based on the second positional information. The operations of 1920 may be performed in accordance with examples as disclosed herein. In some examples, aspects of the operations of 1920 may be performed by a signal receiver 1440 as described with reference to FIG. 14.

At 1925, the method may include transmitting, to the first device via the first orbital angular momentum mode, a fourth message based on receiving the third message and the signal, the fourth message indicating whether the signal was successfully received by the second device. The operations of 1925 may be performed in accordance with examples as disclosed herein. In some examples, aspects of the operations of 1925 may be performed by a fourth message transmitter 1445 as described with reference to FIG. 14.

Figure 20:
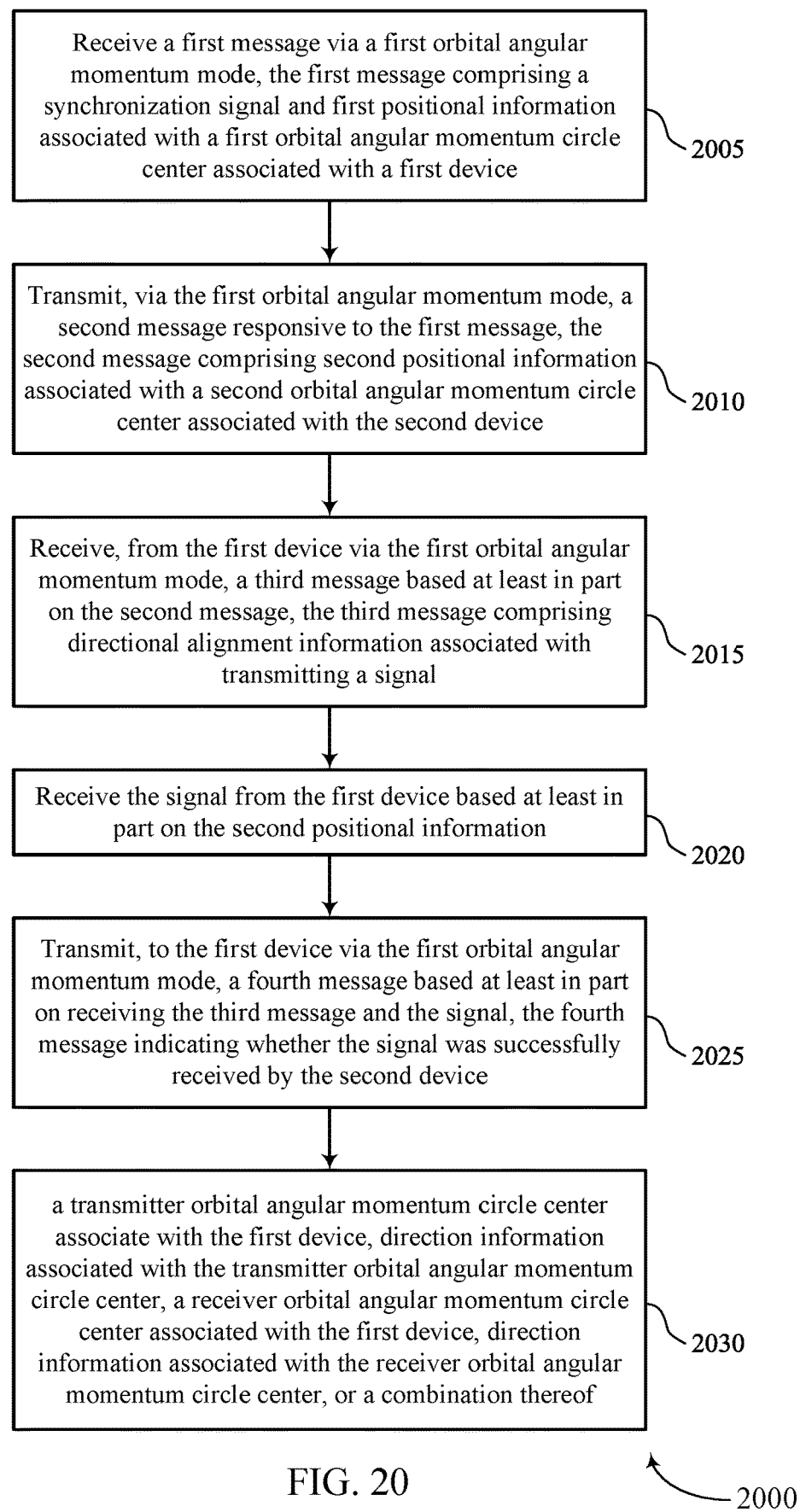

FIG. 20 shows a flowchart illustrating a method 2000 that supports connection setup in OAM-based communication system in accordance with one or more aspects of the present disclosure. The operations of the method 2000 may be implemented by a network entity or its components as described herein. For example, the operations of the method 2000 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2005, the method may include receiving a first message via a first orbital angular momentum mode, the first message including a synchronization signal and first positional information associated with a first orbital angular momentum circle center associated with a first device. The operations of 2005 may be performed in accordance with examples as disclosed herein. In some examples, aspects of the operations of 2005 may be performed by a first message receiver 1425 as described with reference to FIG. 14.

At 2010, the method may include transmitting, via the first orbital angular momentum mode, a second message responsive to the first message, the second message including second positional information associated with a second orbital angular momentum circle center associated with the second device. The operations of 2010 may be performed in accordance with examples as disclosed herein. In some examples, aspects of the operations of 2010 may be performed by a second message transmitter 1430 as described with reference to FIG. 14.

At 2015, the method may include receiving, from the first device via the first orbital angular momentum mode, a third message based on the second message, the third message including directional alignment information associated with transmitting a signal. The operations of 2015 may be performed in accordance with examples as disclosed herein. In some examples, aspects of the operations of 2015 may be performed by a third message receiver 1435 as described with reference to FIG. 14.

At 2020, the method may include receiving the signal from the first device based on the second positional information. The operations of 2020 may be performed in accordance with examples as disclosed herein. In some examples, aspects of the operations of 2020 may be performed by a signal receiver 1440 as described with reference to FIG. 14.

At 2025, the method may include transmitting, to the first device via the first orbital angular momentum mode, a fourth message based on receiving the third message and the signal, the fourth message indicating whether the signal was successfully received by the second device. The operations of 2025 may be performed in accordance with examples as disclosed herein. In some examples, aspects of the operations of 2025 may be performed by a fourth message transmitter 1445 as described with reference to FIG. 14.

At 2030, the method may include a transmitter orbital angular momentum circle center associating with the first device, direction information associated with the transmitter orbital angular momentum circle center, a receiver orbital angular momentum circle center associated with the first device, direction information associated with the receiver orbital angular momentum circle center, or a combination thereof. The operations of 2030 may be performed in accordance with examples as disclosed herein. In some examples, aspects of the operations of 2030 may be performed by a first message receiver 1425 as described with reference to FIG. 14.

Figure 21:
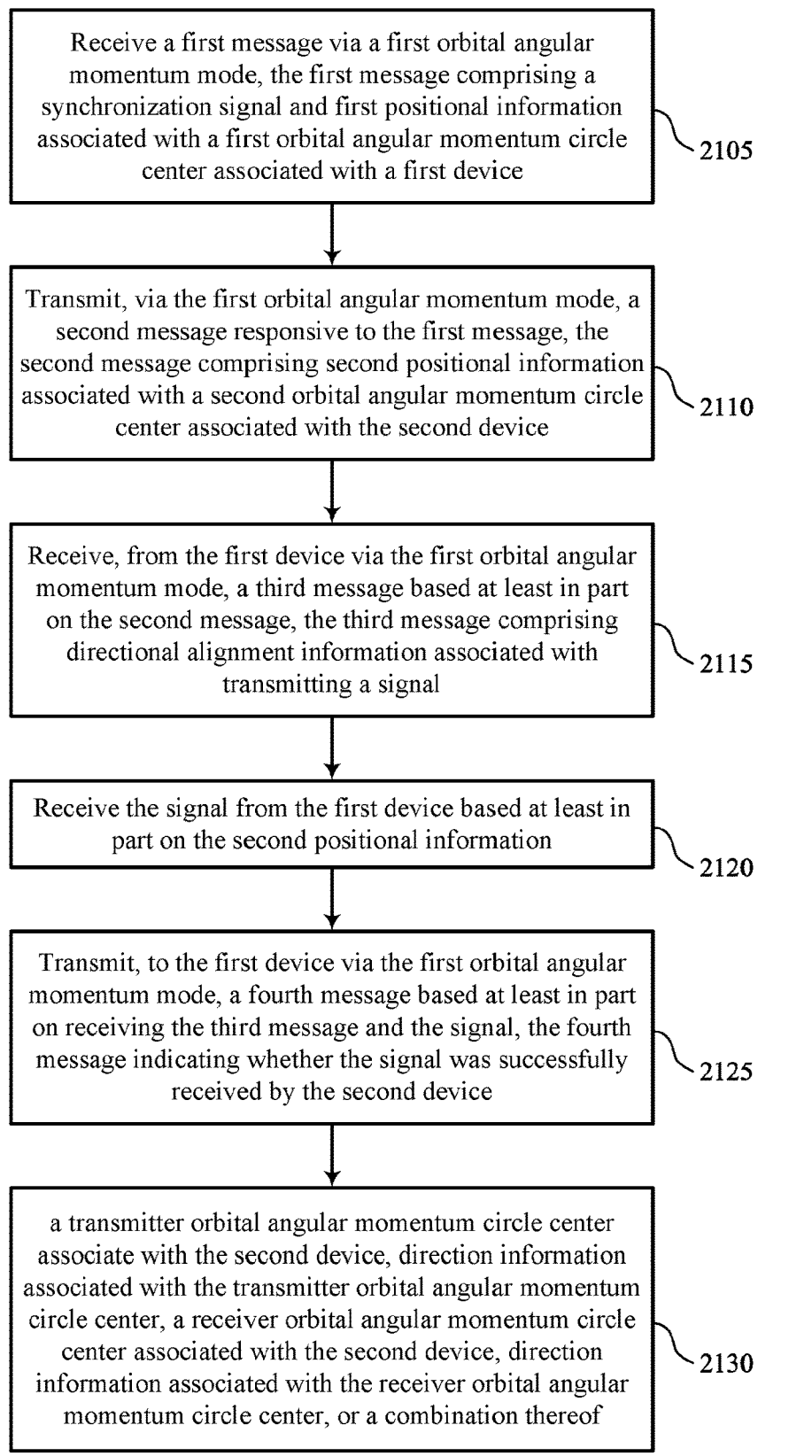

FIG. 21 shows a flowchart illustrating a method 2100 that supports connection setup in OAM-based communication system in accordance with one or more aspects of the present disclosure. The operations of the method 2100 may be implemented by a network entity or its components as described herein. For example, the operations of the method 2100 may be performed by a network entity as described with reference to FIGS. 1 through 7 and 12 through 15. In some examples, a network entity may execute a set of instructions to control the functional elements of the network entity to perform the described functions. Additionally, or alternatively, the network entity may perform aspects of the described functions using special-purpose hardware.

At 2105, the method may include receiving a first message via a first orbital angular momentum mode, the first message including a synchronization signal and first positional information associated with a first orbital angular momentum circle center associated with a first device. The operations of 2105 may be performed in accordance with examples as disclosed herein. In some examples, aspects of the operations of 2105 may be performed by a first message receiver 1425 as described with reference to FIG. 14.

At 2110, the method may include transmitting, via the first orbital angular momentum mode, a second message responsive to the first message, the second message including second positional information associated with a second orbital angular momentum circle center associated with the second device. The operations of 2110 may be performed in accordance with examples as disclosed herein. In some examples, aspects of the operations of 2110 may be performed by a second message transmitter 1430 as described with reference to FIG. 14.

At 2115, the method may include receiving, from the first device via the first orbital angular momentum mode, a third message based on the second message, the third message including directional alignment information associated with transmitting a signal. The operations of 2115 may be performed in accordance with examples as disclosed herein. In some examples, aspects of the operations of 2115 may be performed by a third message receiver 1435 as described with reference to FIG. 14.

At 2120, the method may include receiving the signal from the first device based on the second positional information. The operations of 2120 may be performed in accordance with examples as disclosed herein. In some examples, aspects of the operations of 2120 may be performed by a signal receiver 1440 as described with reference to FIG. 14.

At 2125, the method may include transmitting, to the first device via the first orbital angular momentum mode, a fourth message based on receiving the third message and the signal, the fourth message indicating whether the signal was successfully received by the second device. The operations of 2125 may be performed in accordance with examples as disclosed herein. In some examples, aspects of the operations of 2125 may be performed by a fourth message transmitter 1445 as described with reference to FIG. 14.

At 2130, the method may include a transmitter orbital angular momentum circle center associating with the second device, direction information associated with the transmitter orbital angular momentum circle center, a receiver orbital angular momentum circle center associated with the second device, direction information associated with the receiver orbital angular momentum circle center, or a combination thereof. The operations of 2130 may be performed in accordance with examples as disclosed herein. In some examples, aspects of the operations of 2130 may be performed by a second message transmitter 1430 as described with reference to FIG. 14.

The following provides an overview of aspects of the present disclosure:

Aspect 1: A method for wireless communication at a first device, comprising: transmitting a first message via a first orbital angular momentum mode, the first message comprising a synchronization signal and first positional information associated with a first orbital angular momentum circle center associated with the first device; receiving, via the first orbital angular momentum mode, a second message responsive to the first message, the second message comprising second positional information associated with a second orbital angular momentum circle center associated with a second device; transmitting, to the second device via the first orbital angular momentum mode, a third message based at least in part on the second message, the third message comprising directional alignment information associated with transmitting a signal; transmitting the signal to the second device based at least in part on the second positional information; and receiving, from the second device via the first orbital angular momentum mode, a fourth message based at least in part on transmitting the third message and the signal, the fourth message indicating whether the signal was successfully received by the second device.

Aspect 2: The method of aspect 1, wherein the first positional information is associated with downlink transmissions by the first device, the first positional information comprising a transmitter orbital angular momentum circle center associated with the first device, direction information associated with the transmitter orbital angular momentum circle center, a receiver orbital angular momentum circle center associated with the first device, direction information associated with the receiver orbital angular momentum circle center, or a combination thereof.

Aspect 3: The method of any of aspects 1 through 2, wherein the second positional information is associated with uplink transmissions by the second device, the second positional information comprising a transmitter orbital angular momentum circle center associated with the second device, direction information associated with the transmitter orbital angular momentum circle center, a receiver orbital angular momentum circle center associated with the second device, direction information associated with the receiver orbital angular momentum circle center, or a combination thereof.

Aspect 4: The method of any of aspects 1 through 3, wherein the first message further comprises a first set of orbital angular momentum parameters associated with transmissions by the first device.

Aspect 5: The method of aspect 4, wherein the first set of orbital angular momentum parameters associated with the transmissions by the first device further comprise one or more of a list of candidate orbital angular momentum modes associated with the transmissions by the first device; a quantity of downlink transmitter circles associated with the first device; a radius associated with each of the downlink transmitter circles; a quantity of antenna elements associated with each of the downlink transmitter circles; a quantity of orbital angular momentum modes simultaneously used for one or more of the downlink transmitter circles; a quantity of uplink receiver circles associated with reception of the transmissions by the first device; a radius associated with each of the uplink receiver circles; a quantity of antenna elements associated with each of the uplink receiver circles; or a quantity of orbital angular momentum modes simultaneously used for one or more of the uplink receiver circles.

Aspect 6: The method of any of aspects 1 through 5, wherein the second message comprises a second set of orbital angular momentum parameters associated with transmissions by the second device.

Aspect 7: The method of aspect 6, wherein the second set of orbital angular momentum parameters associated with the transmissions by the second device further comprise one or more of a list of candidate orbital angular momentum modes associated with the transmissions by the second device; a quantity of uplink transmitter circles associated with the second device; a radius associated with each of the uplink transmitter circles; a quantity of antenna elements associated with each of the uplink transmitter circles; a quantity of orbital angular momentum modes simultaneously used for one or more of the uplink transmitter circles; a quantity of downlink receiver circles associated with the first device; a radius associated with each of the downlink receiver circles; a quantity of antenna elements associated with each of the downlink receiver circles; or a quantity of orbital angular momentum modes simultaneously used for one or more of the downlink receiver circles.

Aspect 8: The method of any of aspects 1 through 7, wherein the directional alignment information comprises steering information associated with the signal, the steering information comprising a wavelength of the signal, a polarization of the signal, a laser mode associated with the signal, or a combination thereof.

Aspect 9: The method of any of aspects 1 through 8, wherein the fourth message further comprises an indication of a successful alignment between the first device and the second device, the method further comprising: communicating one or more data transmissions with the second device according to a set of orbital angular momentum modes based at least in part on the successful alignment.

Aspect 10: The method of aspect 9, wherein communicating the one or more data transmissions comprises: transmitting, via the first orbital angular momentum mode, a configuration message associated with one or more downlink channel transmissions, the configuration message indicating a set of configured orbital angular momentum modes for the one or more downlink channel transmissions, wherein the set of configured orbital angular momentum modes comprises two or more orbital angular momentum modes of the set of orbital angular momentum modes.

Aspect 11: The method of any of aspects 1 through 10, further comprising: identifying a set of parameters associated with transmitting the first message, the set of parameters comprising a periodicity associated with transmitting the first message.

Aspect 12: The method of any of aspects 1 through 11, wherein the first message indicates a set of resources allocated for receiving the second message, transmitting the third message, receiving the fourth message, or a combination thereof.

Aspect 13: The method of any of aspects 1 through 12, further comprising: receiving a configuration indicating a set of resources allocated for transmitting the first message, receiving the second message, transmitting the third message, receiving the fourth message, or a combination thereof.

Aspect 14: The method of any of aspects 1 through 13, further comprising: monitoring for a wake-up signal over a set of resources allocated for the wake-up signal, wherein the monitoring is via the first orbital angular momentum mode; and receiving the wake-up signal based at least in part on the monitoring, wherein transmitting the first message is based at least in part on receiving the wake-up signal.

Aspect 15: The method of any of aspects 1 through 14, wherein the signal comprises an optical signal.

Aspect 16: The method of any of aspects 1 through 15, wherein the signal comprises a radio signal.

Aspect 17: The method of any of aspects 1 through 16, wherein the signal comprises a directional signal associated with one or more beams.

Aspect 18: The method of any of aspects 1 through 17, wherein the signal comprises an omnidirectional signal.

Aspect 19: The method of any of aspects 1 through 18, wherein the first orbital angular momentum mode comprises orbital angular momentum mode.

Aspect 20: The method of aspect 19, wherein transmitting the first message, the third message, or both comprises using a center radiator of one or more transmitter circles of the first device or one or more uniform circular array radiators of the one or more transmitter circles of the first device.

Aspect 21: A method for wireless communication at a second device, comprising: receiving a first message via a first orbital angular momentum mode, the first message comprising a synchronization signal and first positional information associated with a first orbital angular momentum circle center associated with a first device; transmitting, via the first orbital angular momentum mode, a second message responsive to the first message, the second message comprising second positional information associated with a second orbital angular momentum circle center associated with the second device; receiving, from the first device via the first orbital angular momentum mode, a third message based at least in part on the second message, the third message comprising directional alignment information associated with transmitting a signal; receiving the signal from the first device based at least in part on the second positional information; and transmitting, to the first device via the first orbital angular momentum mode, a fourth message based at least in part on receiving the third message and the signal, the fourth message indicating whether the signal was successfully received by the second device.

Aspect 22: The method of aspect 21, wherein the first positional information is associated with downlink transmissions by the first device, the first positional information comprising a transmitter orbital angular momentum circle center associated with the first device, direction information associated with the transmitter orbital angular momentum circle center, a receiver orbital angular momentum circle center associated with the first device, direction information associated with the receiver orbital angular momentum circle center, or a combination thereof.

Aspect 23: The method of any of aspects 21 through 22, wherein the second positional information is associated with uplink transmissions by the second device, the second positional information comprising a transmitter orbital angular momentum circle center associated with the second device, direction information associated with the transmitter orbital angular momentum circle center, a receiver orbital angular momentum circle center associated with the second device, direction information associated with the receiver orbital angular momentum circle center, or a combination thereof.

Aspect 24: The method of any of aspects 21 through 23, wherein the first message further comprises a first set of orbital angular momentum parameters associated with transmissions by the first device.

Aspect 25: The method of any of aspects 21 through 24, wherein the signal comprises an optical signal.

Aspect 26: The method of any of aspects 21 through 25, wherein the signal comprises a radio signal.

Aspect 27: The method of any of aspects 21 through 26, wherein the signal comprises a directional signal associated with one or more beams.

Aspect 28: The method of any of aspects 21 through 27, wherein the signal comprises an omnidirectional signal.

Aspect 29: An apparatus, comprising a memory, transceiver, and at least one processor coupled with memory and the transceiver, the at least one processor configured to cause the apparatus to perform a method of any of aspects 1 through 20.

Aspect 30: An apparatus for wireless communication at a first device, comprising at least one means for performing a method of any of aspects 1 through 20.

Aspect 31: A non-transitory computer-readable medium storing code for wireless communication at a first device, the code comprising instructions executable by a processor to perform a method of any of aspects 1 through 20.

Aspect 32: An apparatus, comprising a memory, transceiver, and at least one processor coupled with the memory and the transceiver, the at least one processor configured to cause the apparatus to perform a method of any of aspects 21 through 28.

Aspect 33: An apparatus for wireless communication at a second device, comprising at least one means for performing a method of any of aspects 21 through 28.

Aspect 34: A non-transitory computer-readable medium storing code for wireless communication at a second device, the code comprising instructions executable by a processor to perform a method of any of aspects 21 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first device, comprising:
   transmitting a first message via a first orbital angular momentum mode, the first message comprising a synchronization signal and first positional information associated with a first orbital angular momentum circle center associated with the first device;
   receiving, via the first orbital angular momentum mode, a second message responsive to the first message, the second message comprising second positional information associated with a second orbital angular momentum circle center associated with a second device;
   transmitting, to the second device via the first orbital angular momentum mode, a third message based at least in part on the second message, the third message comprising directional alignment information associated with transmitting a signal;

transmitting the signal to the second device based at least in part on the second positional information; and receiving, from the second device via the first orbital angular momentum mode, a fourth message based at least in part on transmitting the third message and the signal, the fourth message indicating whether the signal was successfully received by the second device.

2. The method of claim 1, wherein the first positional information is associated with downlink transmissions by the first device, the first positional information comprising a transmitter orbital angular momentum circle center associated with the first device, direction information associated with the transmitter orbital angular momentum circle center, a receiver orbital angular momentum circle center associated with the first device, direction information associated with the receiver orbital angular momentum circle center, or a combination thereof.

3. The method of claim 1, wherein the second positional information is associated with uplink transmissions by the second device, the second positional information comprising a transmitter orbital angular momentum circle center associated with the second device, direction information associated with the transmitter orbital angular momentum circle center, a receiver orbital angular momentum circle center associated with the second device, direction information associated with the receiver orbital angular momentum circle center, or a combination thereof.

4. The method of claim 1, wherein the first message further comprises a first set of orbital angular momentum parameters associated with transmissions by the first device.

5. The method of claim 4, wherein the first set of orbital angular momentum parameters associated with the transmissions by the first device comprises one or more of:
 a list of candidate orbital angular momentum modes associated with the transmissions by the first device;
 a quantity of downlink transmitter circles associated with the first device;
 a radius associated with each of the downlink transmitter circles;
 a quantity of antenna elements associated with each of the downlink transmitter circles;
 a quantity of orbital angular momentum modes simultaneously used for one or more of the downlink transmitter circles;
 a quantity of uplink receiver circles associated with reception of the transmissions by the first device;
 a radius associated with each of the uplink receiver circles;
 a quantity of antenna elements associated with each of the uplink receiver circles; or
 a quantity of orbital angular momentum modes simultaneously used for one or more of the uplink receiver circles.

6. The method of claim 1, wherein the second message comprises a second set of orbital angular momentum parameters associated with transmissions by the second device.

7. The method of claim 6, wherein the second set of orbital angular momentum parameters associated with the transmissions by the second device comprises one or more of:
 a list of candidate orbital angular momentum modes associated with the transmissions by the second device;
 a quantity of uplink transmitter circles associated with the second device;
 a radius associated with each of the uplink transmitter circles;
 a quantity of antenna elements associated with each of the uplink transmitter circles;
 a quantity of orbital angular momentum modes simultaneously used for one or more of the uplink transmitter circles;
 a quantity of downlink receiver circles associated with the first device;
 a radius associated with each of the downlink receiver circles;
 a quantity of antenna elements associated with each of the downlink receiver circles; or
 a quantity of orbital angular momentum modes simultaneously used for one or more of the downlink receiver circles.

8. The method of claim 1, wherein the directional alignment information comprises steering information associated with the signal, the steering information comprising a wavelength of the signal, a polarization of the signal, a laser mode associated with the signal, or a combination thereof.

9. The method of claim 1, wherein the fourth message further comprises an indication of a successful alignment between the first device and the second device, the method further comprising:
 communicating one or more data transmissions with the second device according to a set of orbital angular momentum modes based at least in part on the successful alignment.

10. The method of claim 9, wherein communicating the one or more data transmissions comprises:
 transmitting, via the first orbital angular momentum mode, a configuration message associated with one or more downlink channel transmissions, the configuration message indicating a set of configured orbital angular momentum modes for the one or more downlink channel transmissions, wherein the set of configured orbital angular momentum modes comprises two or more orbital angular momentum modes of the set of orbital angular momentum modes.

11. The method of claim 1, further comprising:
 identifying a set of parameters associated with transmitting the first message, the set of parameters comprising a periodicity associated with transmitting the first message.

12. The method of claim 1, wherein the first message indicates a set of resources allocated for receiving the second message, transmitting the third message, receiving the fourth message, or a combination thereof.

13. The method of claim 1, further comprising:
 receiving a configuration indicating a set of resources allocated for transmitting the first message, receiving the second message, transmitting the third message, receiving the fourth message, or a combination thereof.

14. The method of claim 1, further comprising:
 monitoring for a wake-up signal over a set of resources allocated for the wake-up signal, wherein the monitoring is via the first orbital angular momentum mode; and
 receiving the wake-up signal based at least in part on the monitoring, wherein transmitting the first message is based at least in part on receiving the wake-up signal.

15. The method of claim 1, wherein the signal comprises an optical signal.

16. The method of claim 1, wherein the signal comprises a radio signal.

17. The method of claim 1, wherein the signal comprises a directional signal associated with one or more beams.

18. The method of claim 1, wherein the signal comprises an omnidirectional signal.

19. The method of claim 1, wherein the first orbital angular momentum mode comprises orbital angular momentum mode 0.

20. The method of claim 19, wherein transmitting the first message, the third message, or both comprises using a center radiator of one or more transmitter circles of the first device or one or more uniform circular array radiators of the one or more transmitter circles of the first device.

21. A method for wireless communication at a second device, comprising:
receiving a first message via a first orbital angular momentum mode, the first message comprising a synchronization signal and first positional information associated with a first orbital angular momentum circle center associated with a first device;
transmitting, via the first orbital angular momentum mode, a second message responsive to the first message, the second message comprising second positional information associated with a second orbital angular momentum circle center associated with the second device;
receiving, from the first device via the first orbital angular momentum mode, a third message based at least in part on the second message, the third message comprising directional alignment information associated with transmitting a signal;
receiving the signal from the first device based at least in part on the second positional information; and
transmitting, to the first device via the first orbital angular momentum mode, a fourth message based at least in part on receiving the third message and the signal, the fourth message indicating whether the signal was successfully received by the second device.

22. The method of claim 21, wherein the first positional information is associated with downlink transmissions by the first device, the first positional information comprising a transmitter orbital angular momentum circle center associated with the first device, direction information associated with the transmitter orbital angular momentum circle center, a receiver orbital angular momentum circle center associated with the first device, direction information associated with the receiver orbital angular momentum circle center, or a combination thereof.

23. The method of claim 21, wherein the second positional information is associated with uplink transmissions by the second device, the second positional information comprising a transmitter orbital angular momentum circle center associated with the second device, direction information associated with the transmitter orbital angular momentum circle center, a receiver orbital angular momentum circle center associated with the second device, direction information associated with the receiver orbital angular momentum circle center, or a combination thereof.

24. The method of claim 21, wherein the first message further comprises a first set of orbital angular momentum parameters associated with transmissions by the first device.

25. The method of claim 21, wherein the signal comprises an optical signal.

26. The method of claim 21, wherein the signal comprises a radio signal.

27. The method of claim 21, wherein the signal comprises a directional signal associated with one or more beams.

28. The method of claim 21, wherein the signal comprises an omnidirectional signal.

29. An apparatus for wireless communication at a first device, comprising:
a processor of the first device; and
memory in electronic communication with the processor, the memory and the processor configured to:
transmit a first message via a first orbital angular momentum mode, the first message comprising a synchronization signal and first positional information associated with a first orbital angular momentum circle center associated with the first device;
receive, via the first orbital angular momentum mode, a second message responsive to the first message, the second message comprising second positional information associated with a second orbital angular momentum circle center associated with a second device;
transmit, to the second device via the first orbital angular momentum mode, a third message based at least in part on the second message, the third message comprising directional alignment information associated with transmitting a signal;
transmit the signal to the second device based at least in part on the second positional information; and
receive, from the second device via the first orbital angular momentum mode, a fourth message based at least in part on transmitting the third message and the signal, the fourth message indicating whether the signal was successfully received by the second device.

30. An apparatus for wireless communication at a second device, comprising:
a processor of the second device; and
memory in electronic communication with the processor, the memory and the processor configured to:
receive a first message via a first orbital angular momentum mode, the first message comprising a synchronization signal and first positional information associated with a first orbital angular momentum circle center associated with a first device;
transmit, via the first orbital angular momentum mode, a second message responsive to the first message, the second message comprising second positional information associated with a second orbital angular momentum circle center associated with the second device;
receive, from the first device via the first orbital angular momentum mode, a third message based at least in part on the second message, the third message comprising directional alignment information associated with transmitting a signal;
receive the signal from the first device based at least in part on the second positional information; and
transmit, to the first device via the first orbital angular momentum mode, a fourth message based at least in part on receiving the third message and the signal, the fourth message indicating whether the signal was successfully received by the second device.

* * * * *